US009946883B2

(12) United States Patent
Edge et al.

(10) Patent No.: US 9,946,883 B2
(45) Date of Patent: Apr. 17, 2018

(54) METHODS AND APPARATUSES FOR PROTECTING POSITIONING RELATED INFORMATION

(71) Applicant: QUALCOMM Incorporated, San Diego, CA (US)

(72) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/250,824

(22) Filed: Apr. 11, 2014

(65) Prior Publication Data

US 2014/0351886 A1 Nov. 27, 2014

Related U.S. Application Data

(60) Provisional application No. 61/826,467, filed on May 22, 2013, provisional application No. 61/929,828, filed on Jan. 21, 2014.

(51) Int. Cl.

| | |
|---|---|
| *G06F 15/16* | (2006.01) |
| *G06F 17/30* | (2006.01) |
| *H04L 29/06* | (2006.01) |
| *G06F 21/60* | (2013.01) |
| *H04W 12/06* | (2009.01) |
| *H04L 29/08* | (2006.01) |
| *H04W 4/02* | (2018.01) |

(52) U.S. Cl.
CPC ............ *G06F 21/60* (2013.01); *H04L 63/107* (2013.01); *H04L 67/22* (2013.01); *H04W 4/02* (2013.01); *H04W 12/06* (2013.01)

(58) Field of Classification Search
CPC ....... G06F 21/60; H04W 12/06; H04L 63/107
USPC ......... 713/168–174, 182–186, 202; 709/206, 709/225, 229, 249, 389; 726/2–8
See application file for complete search history.

(56) References Cited

U.S. PATENT DOCUMENTS

| | | |
|---|---|---|
| 7,574,215 B1 | 8/2009 | Fan et al. |
| 8,423,768 B2 | 4/2013 | Huang et al. |
| 8,538,458 B2 | 9/2013 | Haney |

(Continued)

FOREIGN PATENT DOCUMENTS

WO     WO-03036919 A2     5/2003

OTHER PUBLICATIONS

International Search Report and Written Opinion—PCT/US2014/038612—ISA/EPO—dated Sep. 1, 2014.

(Continued)

*Primary Examiner* — Evans Desrosiers
(74) *Attorney, Agent, or Firm* — Berkeley Law & Technology Group, LLP

(57) ABSTRACT

Various methods, apparatuses and articles of manufacture are provided which may be implemented to authenticate the provider of a positioning engine provisioned within a mobile station to enable the positioning engine to obtain and use protected positioning assistance data. In certain examples, a relationship between the provider of a location server and the provider of a positioning engine provisioned within a mobile station may be authenticated, and protected positioning data may be obtained from said positioning engine by said location server.

80 Claims, 27 Drawing Sheets

(56) References Cited

U.S. PATENT DOCUMENTS

| | | | |
|---|---|---|---|
| 8,837,733 B2* | 9/2014 | Alpert | H04L 9/0816 380/270 |
| 8,938,621 B2 | 1/2015 | Mao et al. | |
| 9,217,792 B2 | 12/2015 | Wu | |
| 2003/0035544 A1* | 2/2003 | Herle | H04L 63/0428 380/270 |
| 2004/0248551 A1* | 12/2004 | Rowitch | H04W 64/00 455/410 |
| 2007/0086382 A1 | 4/2007 | Narayanan et al. | |
| 2007/0135089 A1 | 6/2007 | Edge et al. | |
| 2007/0200756 A1* | 8/2007 | Saito | G01S 19/09 342/357.64 |
| 2009/0100260 A1* | 4/2009 | Govindarajan | H04L 9/0872 713/155 |
| 2009/0106259 A1 | 4/2009 | Ui et al. | |
| 2010/0007553 A1* | 1/2010 | Kim | G01S 5/0063 342/357.22 |
| 2010/0205435 A1* | 8/2010 | Xie | H04L 9/32 713/168 |
| 2010/0241864 A1* | 9/2010 | Kelley | G01S 19/42 713/179 |
| 2010/0285834 A1 | 11/2010 | Hutchison, IV | |
| 2011/0187593 A1 | 8/2011 | Gaal et al. | |
| 2012/0264448 A1 | 10/2012 | Wachter et al. | |
| 2013/0014231 A1 | 1/2013 | Chu et al. | |
| 2014/0006785 A1* | 1/2014 | Shaliv | H04L 9/088 713/170 |
| 2015/0009066 A1* | 1/2015 | Werner | G01S 19/09 342/357.42 |

OTHER PUBLICATIONS

Kaplan D., et al., "Understanding GPS", Principles and Applications, 2006, pp. 1-3.

\* cited by examiner

METHODS AND APPARATUSES FOR PROTECTING POSITIONING RELATED INFORMATION

CLAIM OF PRIORITY UNDER 35 U.S.C. § 119

This application claims the benefit of and priority, under 35 USC 119, to U.S. Provisional Application No. 61/826,467 filed May 22, 2013, entitled, "METHODS AND SYSTEMS FOR SECURING POSITIONING ASSISTANCE MESSAGES", and to U.S. Provisional Application No. 61/929,828, filed Jan. 21, 2014, entitled, "METHODS AND SYSTEMS FOR SECURING POSITIONING ASSISTANCE MESSAGES", both of which are assigned to the assignee hereof and which are incorporated herein by reference.

BACKGROUND

1. Field

The subject matter disclosed herein relates to electronic devices, and more particularly to methods, apparatuses and articles of manufacture for use by one or more electronic devices in protecting data related to positioning of a mobile device.

2. Information

As its name implies, a mobile station may be moved about, e.g. typically being carried by a user and/or possibly part of a vehicle or other moveable entity. By way of some non-limiting examples, a mobile station may take the form of a cellular telephone, a smart phone, a tablet computer, a laptop computer, a wearable computer, a navigation and/or tracking device, an asset tag etc.

A position and/or movement of a mobile station may be determined, at least in part, by a positioning and/or navigation capability (which may be provided/supported in some manner by a positioning engine (PE)) that may be provisioned within the mobile station. Certain positioning capabilities may be based on one or more wireless signals transmitted by one or more transmitter devices and acquired by a mobile station. By way of example, certain wireless signal-based positioning capabilities make use of wireless signals acquired from a satellite positioning system (SPS), such as, e.g., the global positioning system (GPS), etc.

In another example, certain wireless signal-based positioning capabilities make use of wireless signals acquired from terrestrial-based wireless transmitter devices, such as, e.g., a dedicated positioning Beacon transmitter device, an access point (AP) device which may be part of a wireless local area network, a base transceiver station which may be part of a cellular telephone system, and/or the like or some combination thereof. In certain implementations, a positioning capability may make use of one or more electronic files, such as, e.g., an electronic map, a routability graph, a radio heatmap, a base station almanac, SPS navigation data and/or the like or some combination thereof, to determine a position and/or other movements of the mobile station within a particular environment.

In some situations positioning information related to a mobile station (e.g. location, a location history) and/or data used to assist a mobile station to obtain its location (e.g. a base station almanac) may be confidential and may need to be protected from accidental or intentional disclosure to unauthorized persons and entities. For example, the user or owner of a mobile station may not want the location of the mobile station (and thus possibly the location of the user) being disclosed to other users. Similarly, the operator of a network may not want the locations and characteristics of base stations and access points in the network, which may for example comprise a base station almanac, from being disclosed to other network operators or to other location service providers. There may thus be a value to methods that protect positioning related information from being disclosed to unauthorized persons and entities.

SUMMARY

In accordance with one aspect, a method may be provided which comprises, at a mobile station: exchanging one or more messages with a location server to authenticate a positioning engine provisioned within the mobile station; receiving protected positioning assistance data based on an authentication of the positioning engine; and providing the protected positioning assistance data to the positioning engine.

In accordance with another aspect, an apparatus for use in a mobile station may comprise: means for exchanging one or more messages with a location server to authenticate a positioning engine provisioned within the mobile station; means for receiving protected positioning assistance data based on an authentication of the positioning engine; and means for providing the protected positioning assistance data to the positioning engine.

In accordance with yet another aspect, a mobile station may comprise: a positioning engine; a communication interface; and a processing unit to: exchange one or more messages with a location server via the communication interface to authenticate the positioning engine; receive protected positioning assistance data via the communication interface based on an authentication of the positioning engine; and provide the protected positioning assistance data to the positioning engine.

In accordance with still other aspects, an article of manufacture may be provided which comprises a non-transitory computer readable medium having stored therein computer implementable instructions executable by a processing unit in a mobile station, comprising: code for participating in an exchange of one or more messages with a location server to authenticate a positioning engine provisioned within the mobile station; code for receiving protected positioning assistance data based on an authentication of the positioning engine; and code for providing the protected positioning assistance data to the positioning engine.

In accordance with other aspects, a method may be provided which comprises, at a location server: exchanging one or more messages with a mobile station to authenticate a positioning engine provisioned within the mobile station; and, based on an authentication of said positioning engine, enabling the mobile station to obtain protected positioning assistance data for the positioning engine.

In accordance with still other aspects, an apparatus for use in a location server may comprise: means for exchanging one or more messages with a mobile station to authenticate a positioning engine provisioned within the mobile station; and, means for enabling the mobile station to obtain protected positioning assistance data for the positioning engine, based on an authentication of said positioning engine.

In accordance with some aspects, a location server may comprise: a communication interface; and a processing unit to: initiate an exchange of one or more messages with a mobile station, via the communication interface, to authenticate a positioning engine provisioned within the mobile station; and, based on an authentication of said positioning engine, enable the mobile station to obtain protected positioning assistance data for the positioning engine.

In accordance with certain aspects, an article of manufacture may be provided which comprises a non-transitory computer readable medium having stored therein computer implementable instructions executable by a processing unit in a location server, comprising: code for initiating an exchange of one or more messages with a mobile station to authenticate a positioning engine provisioned within the mobile station; and, code for enabling the mobile station to obtain protected positioning assistance data for the positioning engine, based on an authentication of said positioning engine.

In accordance with an aspect, a method may be provided which comprises, at a mobile station: exchanging one or more messages with a location server to authenticate a relationship between a provider of the location server and a provider of a positioning engine provisioned within the mobile station; obtaining protected positioning data generated by and/or from the positioning engine; and transmitting the protected positioning data to the location server.

In accordance with some other aspects, an apparatus for use in a mobile station may comprise: means for exchanging one or more messages with a location server to authenticate a relationship between a provider of the location server and a provider of a positioning engine provisioned within the mobile station; means for obtaining protected positioning data generated by and/or from the positioning engine; and means for transmitting the protected positioning data to the location server.

In accordance with one more aspect, a mobile station may comprise: a positioning engine; a communication interface; and a processing unit to: exchange one or more messages with a location server to authenticate a relationship between a provider of the location server and a provider of the positioning engine; obtain protected positioning data generated by and/or from the positioning engine; and transmit the protected positioning data to the location server via the communication interface.

In accordance with yet another aspect, an article of manufacture may comprise a non-transitory computer readable medium having stored therein computer implementable instructions executable by a processing unit in a mobile station, comprising: code for exchanging one or more messages with a location server to authenticate a relationship between a provider of the location server and a provider of a positioning engine provisioned within the mobile station; code for obtaining protected positioning data generated by and/or from the positioning engine; and code for initiating transmission of the protected positioning data to the location server.

In accordance with yet other aspects, a method may be provided which comprises, at a location server: exchanging one or more messages with a mobile station to authenticate a relationship between a provider of the location server and a provider of a positioning engine provisioned within the mobile station; and receiving protected positioning data obtained from the positioning engine.

In accordance with still one other aspect, an apparatus for use in a location server may comprise: means for exchanging one or more messages with a mobile station to authenticate a relationship between a provider of the location server and a provider of a positioning engine provisioned within the mobile station; and means for receiving protected positioning data obtained from the positioning engine.

In accordance with certain further aspects, a location server may comprise: a communication interface; and a processing unit to: initiate an exchange of one or more messages with a mobile station, via the communication interface, to authenticate a relationship between a provider of the location server and a provider of a positioning engine provisioned within the mobile station; and receive protected positioning data obtained from the positioning engine via the communication interface.

In accordance with one further aspect, an article of manufacture may comprise a non-transitory computer readable medium having stored therein computer implementable instructions executable by a processing unit in a location server, comprising: code for initiating an exchange of one or more messages with a mobile station to authenticate a relationship between a provider of the location server and a provider of a positioning engine provisioned within the mobile station; and code for receiving protected positioning data obtained from the positioning engine.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
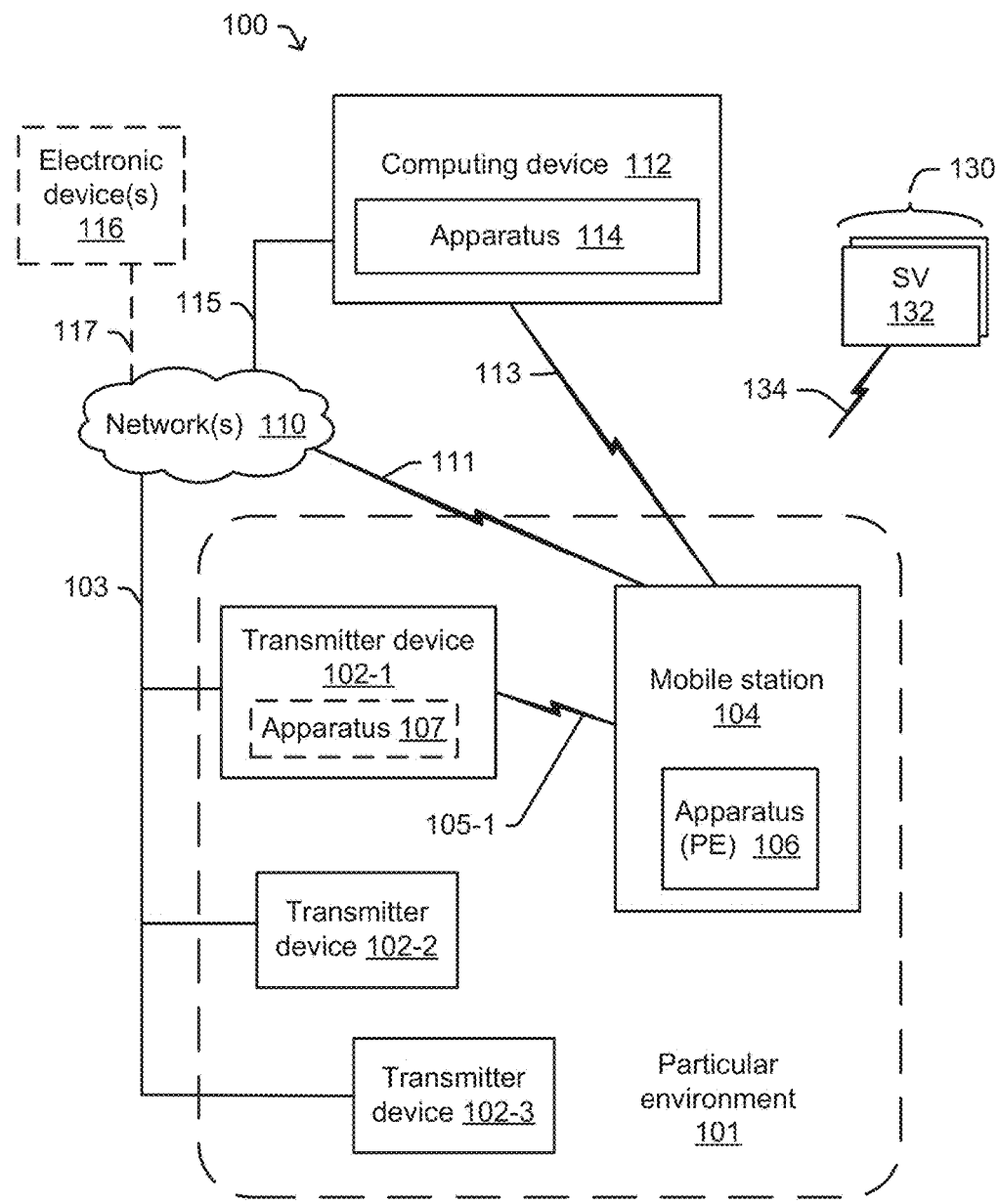
FIG. 1 is a schematic block diagram illustrating an arrangement of representative electronic devices including one or more electronic devices for use in protecting positioning data, in accordance with an example implementation.

A mobile station, such as a cellphone, personal digital assistant, smartphone, tablet etc., may be referred to as a mobile device, a user equipment (UE), a terminal, a device, a SUPL Enabled Terminal (SET) or by some other name. A mobile station may be configured to receive location based services through the use of location determination technology including Satellite Positioning System (SPS), indoor location determination technologies and/or the like. In particular implementations, a mobile station may be provided with positioning assistance data by a location server to enable a positioning engine (PE) provisioned within the mobile station to acquire signals from and make location related measurements (e.g. of signal strength or signal timing) from terrestrial transmitters such as base stations, femtocells and access points and/or from SPS systems such as GPS, Glonass and Galileo. The positioning assistance data may also or instead assist the mobile station to estimate its location from measurements of different transmitters using one or more positioning techniques or technologies.

In certain instances some positioning related data may comprise information that is proprietary and/or otherwise considered confidential to an entity (e.g., a network operator, a location services provider or the user of a mobile station). Accordingly, there may be a need to protect such information from unauthorized access and/or dissemination, whether accidental or deliberate. By way of an example, certain positioning assistance data for use by a PE within a mobile station may comprise protected positioning assistance data (PPAD) such as locations and/or transmission characteristics of base stations and access points. In another example, certain positioning data generated, at least in part, by a PE within a mobile device may comprise protected positioning data (PPD) such as a location of the mobile device or location measurements of certain base stations and access points made by the mobile device. As described herein, various methods and apparatuses are provided which may be implemented to protect various types of positioning data which may be transmitted directly or indirectly between different electronic devices. For example, in certain implementations an authentication process may be performed to ensure that a particular PE within a mobile station is authorized to obtain PPAD directly or indirectly from a particular location server (LS). Here, for example, a certain PPAD may be indicative of a confidential (possibly very precise) location information regarding one or more transmitter devices (e.g., access point devices, etc.). In another example, in certain implementations an authorization process may be performed to insure that a particular LS is authorized to obtain PPD directly or indirectly from a particular PE within a mobile station. Here, for example, a certain PPD may be indicative of confidential location information regarding one or more transmitter devices, and/or the mobile device itself.

Attention is now drawn to FIG. 1, which is a schematic block diagram illustrating an example arrangement 100 comprising various example electronic devices, one or more of which may be configured for use in protecting one or more forms of positioning data, in accordance with an example implementation.

Example arrangement 100 comprises a plurality of transmitter devices (102-1, 102-2 and 102-3) which may represent various access point devices, location beacon devices, cellular base stations, femtocell devices, blue tooth devices, and/or the like, which may transmit signals that a mobile device 104 may acquire. For example, as illustrated transmitter device 102-1 may transmit a wireless signal over link 105-1 to a mobile station 104. In certain instances, mobile station 104 may also transmit a wireless signal over link 105-1 to transmitter device 102-1. The transmitter devices in arrangement 100 are illustrated as being within a particular environment 101, which may represent all or part of an indoor environment, all or part of a network (e.g. a WLAN), and/or simply a region of space or an area in which applicable wireless communication between at least one transmitter device and the mobile station may be provided (e.g., where the communicating devices are within a particular range of one another).

As further illustrated in example arrangement 100, mobile station 104 may transmit messages to and/or receive messages from a computing device 112. For example, in certain instances a direct path via communication link 113 may be established. In certain instances, an indirect path may be provided via network(s) 110, e.g., via wired link 115 and wireless link 111, and/or possibly through one or more transmitter devices, e.g., such as transmitter device 102-1 via wired link 103 and wireless link 105-1.

Computing device 112 may be representative of one or more computing platforms provisioned in one or more electronic devices and may function as a location server that may provide location assistance data to mobile station 104, receive location related information from mobile station 104 and/or configure information in mobile station 104 related to protection of positioning related information. As described herein, various techniques may be implemented via computing device 112 and/or an apparatus 114 provisioned therein which may be used to protect positioning related information. For example, apparatus 114, which may correspond to a particular LS provider, may exchange one or more messages with mobile station 104 and/or apparatus 106 provisioned therein as part of an authentication process. In certain instances, such an authentication process may verify whether PPAD may be provided to a PE provisioned within mobile station 104. In certain instances, such an authentication process may verify whether PPD may be provided by mobile station 104 to computing device 112 and/or apparatus 114. In certain example implementations, an authentication process may verify the identity of a particular LS provider and/or the identity of a particular PE provider that may allow verification that a business relationship exists between the LS provider and PE provider that allows for an exchange of protected positioning related information. In some implementations, a business relationship between an LS provider and a PE provider may imply a trust relationship between the LS provider and PE provider.

Mobile station 104 is intended to represent any mobile electronic device that may comprise a positioning engine. Thus, for example, mobile station 104 may take the form of a cellular telephone, a smart phone, a tablet computer, a laptop computer, a wearable computer, a tracking device, etc. Apparatus 106, which may be configured to provide and/or support in some manner all or part of one or more of the techniques provided herein, may comprise hardware/firmware components, or possibly a combination of hardware/firmware and software components. Apparatus 106 may correspond to a process, program or a separate physical component of mobile station 104 (e.g. a modem or an application processor), part or all of which may be dedicated to supporting positioning of mobile station 104 wherein obtaining an accurate location estimate for mobile device 104 at periodic intervals and/or when requested by applications on mobile device 104 or the user of mobile device 104 may be a principal part. Apparatus 106 is referred to generically herein as a positioning engine (PE) 106 though other names such as a positioning process, positioning processor, positioning program may also be used. PE 106 may be provided (e.g. manufactured or configured) by a vendor or other provider who may be the same as the vendor or provider of mobile station 104 or may be different. The provider of PE 106 may have a business relationship with the provider of computing device 112 or apparatus 114 to protect certain positioning related information such as PPAD and/or PPD.

Computing device 112 may be located within, nearby, or remotely from particular environment 101. Apparatus 114, which may be configured to provide and/or support in some manner all or part of one or more of the techniques provided herein, may comprise hardware/firmware components, or possibly a combination of hardware/firmware and software components.

In certain implementations, an apparatus 107 may be provisioned within a transmitter device (e.g., as shown in transmitter device 102-1). Apparatus 107, which may be configured to provide and/or support in some manner all or part of one or more of the techniques provided herein, may comprise hardware/firmware components, or possibly a combination of hardware/firmware and software components.

Network(s) 110 is intended to represent all or part of one or more other electronic devices and/or communication facilities and/or resources capable of supporting wired and/or wireless electronic communication. Thus for example, network(s) 110 may comprise all or part of a telephone network, a cellular telephone network, a wireless communication network, a WLAN, an intranet, the Internet, and/or the like or some combination thereof. In an embodiment, transmitter devices 102-1, 102-2 and 102-3 may be part of network(s) 110. In another embodiment, computing device 112 may be part of network(s) 110.

Although certain communication links are illustrated in FIG. 1 as being either wireless communication links or wired communication links, it should be kept in mind that some communication links may comprise wired and/or wireless communication links, and/or even other intervening and/or supporting devices, etc. For example, in some implementations communication links 115 and/or 117 (e.g., shown as providing communication to/from one or more other electronic devices 116) may comprise wireless communication links, etc. In certain example implementations, computing device 112 may be capable of directly communicating with one or more other devices via communication link 113.

As further illustrated, in certain implementations arrangement 100 may comprise one or more satellite positioning systems (SPS) 130, which may transmit applicable wireless signals that may, at times, be acquired by various electronic devices (e.g., mobile stations) and used, at least in part, to support a positioning function (e.g., provided by a PE within a mobile station) under certain conditions. A positioning function may, for example, determine one or more position/location parameters, and/or otherwise support certain navigation capabilities (e.g., based on routing, course prediction, speed, velocity, trajectory, electronic maps, routing graphs, etc.) Here, for example, SPS 130 may comprise a plurality of satellite vehicles (SVs) 132, each of which may transmit one or more SPS signals 134. SVs 132 may be from one global navigation satellite system (GNSS), such as the GPS or Galileo satellite systems. SPS 130 may represent multiple GNSS such as, but not limited to, GPS, Galileo, Glonass, or Beidou (Compass) satellite systems, and/or any one of several regional navigation satellite systems (RNSS) such as, for example, Wide Area Augmentation System (WAAS), European Geostationary Navigation Overlay Service (EG-NOS), Quasi-Zenith Satellite System (QZSS), just to name a few examples.

In certain example implementations, a mobile station 104 may estimate its position/location (e.g., obtain a position fix or portions thereof) by measuring ranges to a plurality of terrestrial-based transmitter devices 102 (e.g. as may be provisioned as part of or supporting network(s) 110). Such ranges may be measured, for example, by obtaining a cell ID or MAC ID address and/or the like from wireless signals received from such transmitting devices and obtaining range measurements to the transmitting devices by measuring one or more characteristics of wireless signals received therefrom, such as, e.g., a received signal strength indication (RSSI), a signal to noise ratio (S/N), a round trip time (RTT), an angle of arrival (AOA), a signal time of arrival (TOA), a signal time difference of arrival (TDOA) and/or the like or some combination thereof.

In certain implementations, a mobile station 104 may obtain an indoor position fix by applying characteristics of acquired wireless signals to a radio heatmap, which may indicate expected RSSI and/or RTT values at particular locations in particular environment 101 or portion(s) thereof. In particular implementations, a radio heatmap may associate identities of certain transmitter devices 102, expected RSSI from wireless signals transmitted by the identified transmitting devices 102, an expected RTT from the identified transmitter devices 102, and possibly standard deviations from these expected RSSI or RTT. It should be understood, however, that these are merely examples of values that may be stored in a radio heatmap and/or the like which may be provided to a mobile station 104 via some form of assistance data (e.g. by computing device 112 or apparatus 114), and that claimed subject matter is not limited in this respect.

In certain example implementations, a mobile station 104 (or PE 106) may receive some assistance data for positioning purposes from one or more electronic devices such as computing device 112 or apparatus 114. For example, some assistance data may include one or more radio heatmaps, locations and identities of transmitting devices 102 positioned at known or determinable locations to enable measuring ranges to these transmitting devices based, at least in part, on a measured RSSI and/or RTT, for example. Other assistance data to aid positioning operations may include locations, identities and transmission characteristics (e.g. transmission power, transmission timing, antenna gain) of transmitters 102, routeability graphs, just to name a few examples. Other assistance data received by the mobile station 104 may include, for example, one or more electronic maps of all or part of environment 101, some of which may be rendered and or otherwise presented via a display device and/or possibly other input/output device, e.g., to aid in navigation, etc. In certain instances, all or part of an electronic map and/or other assistance data (e.g. locations of transmitters 102) may be provided to a mobile station 104 while approaching and/or upon entering a particular portion of environment 101 (e.g., a structure). In certain instances, an electronic map may be indicative of various features such as doors, hallways, entry ways, walls, etc., points of interest such as bathrooms, pay phones, room names, stores, etc. By obtaining and possibly displaying such map information, a mobile station may overlay its estimated location and possibly an uncertainty seceded there with for a user to view, and possibly interact with as part of a positioning operation.

In an example implementation, a routeability graph and/or the like may assist a mobile station 104 in defining feasible areas for navigation within environment 101, e.g., subject to physical obstructions (e.g., walls) and passage ways (e.g., doorways in walls). Here, by defining feasible areas for navigation, a mobile station 104 may apply constraints to aid in the application of filtering measurements for estimating locations and/or motion trajectories according to a motion model (e.g., according to a particle filter and/or Kalman filter). In addition to measurements obtained from the acquisition of wireless signals from various transmitting devices 102, according to a particular embodiment, a mobile station 104 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a position/location or motion state.

In certain implementations, computing device 112 may function as a SUPL Location Platform (SLP) and mobile station 104 may function as a SUPL Enabled Terminal (SET). In this case, computing device 112 and mobile station 104 may support the SUPL location solution defined by OMA and may exchange messages with one another as part of a SUPL session according to the SUPL Userplane Location Protocol (ULP). ULP may be used to establish and release SUPL sessions between computing device 112 and mobile station 104, transfer assistance data including PPAD from computing device 112 to mobile station 104, transfer location information including PPD from mobile station 104 to computing device 112 and/or enable other aspects of secure transfer of PPAD and PPD as described further on herein. As part of a SUPL session between computing device 112 and mobile station 104, one or more positioning protocols may be used whose messages may be embedded inside SUPL messages (e.g. inside SUPL POS and SUPL POS INIT messages) and transferred as part of the SUPL session. The positioning protocol messages may be used in some embodiments to transfer PPAD and PPD. The positioning protocols may comprise the 3GPP defined LTE Positioning Protocol (LPP), the OMA defined LPP Extensions (LPPe) protocol, the 3GPP defined Radio Resource Control (RRC) protocol, the 3GPP defined Radio Resource LCS Protocol (RRLP) and the 3GPP2 defined IS-801 or C.S0022 protocol.

In certain environments (e.g., in some indoor venues), locations of transmitter devices 102 (e.g., comprising precise coordinates of WLAN/WiFi Access Points (APs) and/or Femtocells) and/or additional information related to environment 101 (e.g. floor plans, transmitter device 102 transmission characteristics, heat maps etc.) may be transferred to a mobile station 104 (or to PE 106) by a computing device 112 or an apparatus 114 via a point to point (P2P) communication link, or via point to multipoint broadcast, to enable mobile station 104 (or PE 106) to perform UE based location determination. As such positioning information may be confidential, security may be applied at mobile station 104 and/or at PE 106 to prevent unauthorized entities such as Apps on mobile station 104 provisioned by or associated with competitor location service providers or entities external to mobile station 104 from gaining access to such information. For example, to keep PPAD such as received AP locations or other like confidential positioning information secure, a mobile station 104 or PE 106 may: (i) retain PPAD in a secure manner and not provide PPAD to or make PPAD accessible to Apps and/or a user; (ii) not provide PPAD to Apps indirectly in the form of a UE location that has been approximated by a nearby AP location; (iii) keep PPAD in secure memory (e.g., possibly in ciphered form) such that Apps and/or a user cannot access it; and/or (iv) discard some or all PPAD after mobile station 104 leaves a venue (e.g. environment 101) and/or after some period of time following provision by computing device 112 or apparatus 114.

Certain Apps (e.g., trusted Apps associated with an indoor venue location provider such as a provider for computing device 112 or apparatus 114) may be allowed to receive/access some or all PPAD such as AP locations, floor plans or other like confidential positioning information. However, some mobile stations or PE's may not be able to discriminate between trusted and untrusted Apps and hence may simply not provide such information to any App.

A PE 106 or mobile station 104 that supports protection of PPAD as described above 21 may be considered trusted by an LS such as computing device 112 and thus the LS may be willing to provide PPAD to such as trusted PE 106 or mobile station 104. The techniques provided herein may allow the LS to verify that a PE 106 or mobile station 104 is trusted.

In certain instances, it may also be useful to support a trusted LS (e.g. an LS such as computing device 112) for some scenarios. Possible trusted LS characteristics may, for example, include the secure treatment of crowd-sourced location measurements (e.g. location measurements of transmitters 102) provided to the LS by a mobile station 104 or PE 106, e.g., which may be in the form of PPD. Secure treatment of PPD by an LS may include usage to obtain locations of transmitters 102 (e.g. WiFi APs and/or Femtocells) on behalf of a location services provider with some business relationship to mobile station 104 or PE 106 (e.g. such as being the provider of mobile station 104 or PE 106 or being a provider with a business relationship to the provider of mobile station 104 or PE 106). Secure treatment of PPD may also include not providing PPD to untrusted providers and/or not using PPD to locate or track mobile station 104 or to compile a location history of mobile station 104.

In certain instances, it may be useful to provide certain UEs (e.g. a mobile station 104 or PE 106) with a method of restoring accuracy to locations of APs and/or Femtocells that are broadcast to all UEs with a certain level of added coarsening (obfuscation). Here, for example, an LS with access to highly accurate AP locations may add error terms to the locations prior to broadcast so that most UEs will receive less accurate AP locations, which may still be usable for approximate self-location but less useful for accurate self-location. However, certain trusted (e.g., authorized) UEs may be allowed to obtain such confidential positioning information, e.g., restoring location accuracy by determining and removing the error terms. By way of an example, if there is a convention on determining the error terms for a particular LS provider (e.g., which may involve using a secret ciphering key by a UE when interacting with an LS to obtain the information needed to remove the error terms), a preferred UE may determine whether an LS is able to provide such information by verifying that the LS is associated with a trusted or preferred provider. In still other example implementations, additional location services and/or other like processes (e.g. certain assistance data) may be provided to certain UEs (e.g., using proprietary signaling) by certain LSs if a UE is able to determine that an LS can provide such services supported by the UE. In certain other implementations, a mobile station 104 or PE 106 that is able to authenticate the provider of an LS as being trustworthy, may consider that some or all location assistance data provided by the LS to mobile station 104 or PE 106 is more reliable and/or more accurate than if the LS is not associated with a trusted provider. This may enable mobile station 104 or PE 106 to determine the location of mobile station 104 more accurately and/or more reliably.

The examples described previously show that an LS (such as computing device 112) may need to verify the identity of the provider of a mobile station 104 or PE 106 in order to know, from an existing business relationship, that any assistance data (e.g. PPAD) sent by the LS will be treated securely by the mobile device 104 or PE 106. Similarly, a mobile device 104 or PE 106 may need to verify the identity of a provider of an LS (e.g. computing device 112) in order to know that an location information (e.g. PPD) sent to the LS by mobile station 104 or PE 106 will be treated securely and/or to know that the LS can send certain useful or reliable types of assistance data to mobile station 104 or PE 106 such as error corrections for AP locations or accurate and reliable assistance data. The identity of the provider of an LS or the provider of a PE may be a name (e.g. a printable character string), a decimal number, a sequence of decimal digits, a sequence of hexadecimal digits, a sequence of characters, a binary number or some other value and may be standardized (e.g. by ISO, ITU, 3GPP, IETF) or may be proprietary.

According to an example implementation, a provider (e.g., manufacturer) of one or more LSs and a provider of PEs (and/or mobile stations) may form a partnership (e.g., a relationship) to provide trusted services to one another. Trusted PE (or mobile station) services may, for example, include secure treatment of received AD (e.g., PPAD), such as AP location information. Trusted LS services may, for example, include secure treatment of crowd-sourced measurement data (e.g., PPD) and provision of useful or reliable assistance data (e.g. to enable accurate AP locations to be obtained from obfuscated AP locations). Although location solutions like the Open Mobile Alliance (OMA) Secure User Plane Location (SUPL) enable the individual identities of LSs to be provided and authenticated by UEs and the identities of UEs to be provided and authenticated by LSs, such authentication does not reveal or authenticate the providers (which may have many LSs or UEs). In particular, while an LS may obtain and authenticate the identity of a UE, it may not know or not reliably know the vendor or provider of the UE or PE because the UE (or PE) identity may only be associated with the individual user or individual UE (e.g. may be a public user identity, a private user identity or a device identity) and may not be associated with the provider of the UE or PE. Thus, the LS may not know whether the UE or PE is trusted to receive PPAD, Similarly, a UE or PE may be able to obtain and authenticate the identity or an LS but may not be able to determine the provider of the LS and thus whether the LS can be trusted to receive PPD and to send special assistance data like AP location error corrections or other reliable assistance data. Instead, provider IDs and/or the like may need to be revealed and authenticated separately—e.g. in addition to providing and authenticating individual UE and LS identities. An LS and PE that engage in a positioning session (e.g., using SUPL) may then provide trusted services to one another once their respective provider IDs and/or the like are revealed and authenticated. The basis of such example authentication can be a shared secret key (or keys) known only to an LS provider and PE provider with some business relationship.

Figure 2:
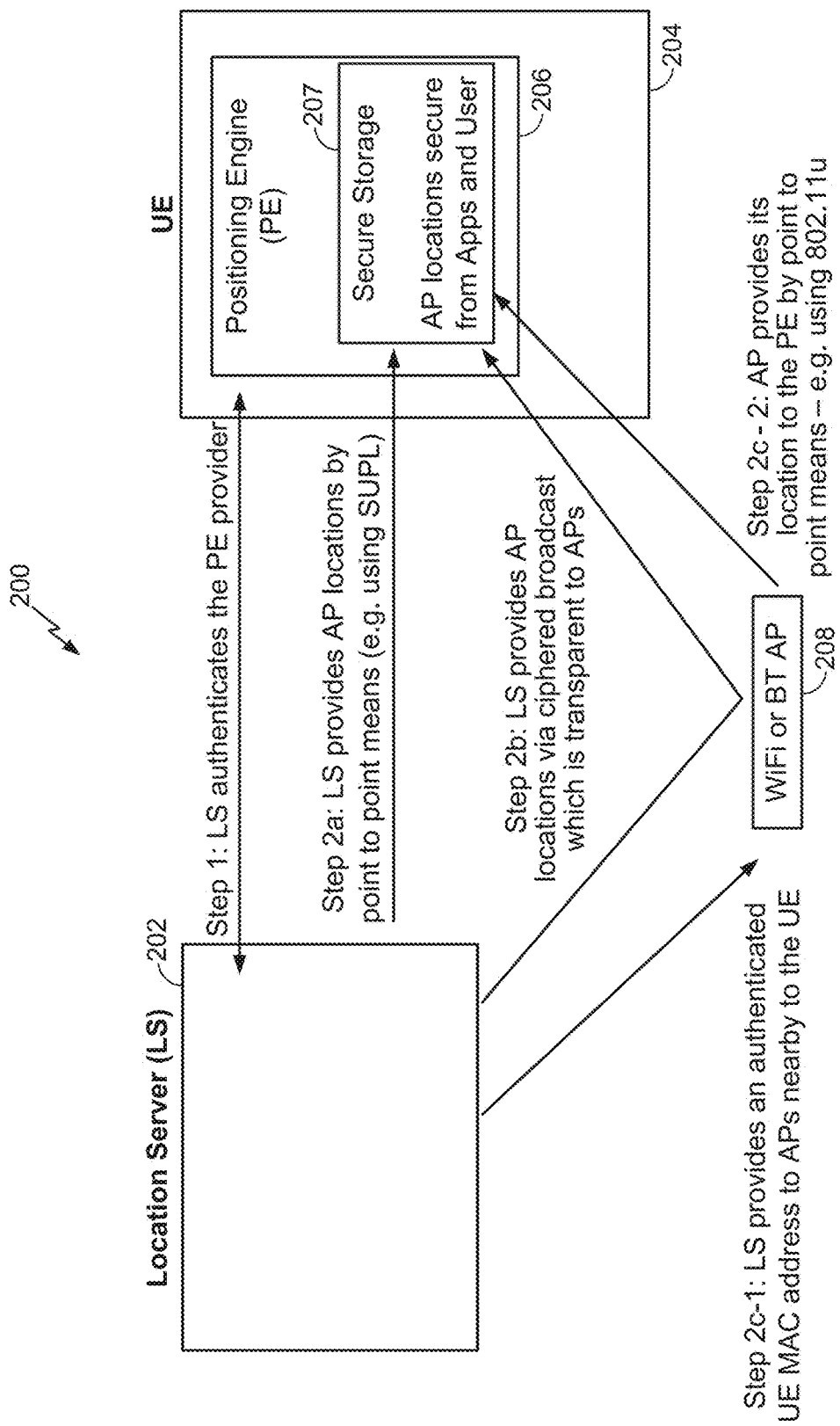
FIG. 2 is a schematic diagram of a system for use in providing protected positioning assistance data from a location server (LS) to a positioning engine (PE) provisioned in a mobile station, e.g., user equipment (UE), in accordance with an example implementation.

Attention is drawn next to FIG. 2, which is a schematic diagram of a system 200 for use in providing protected positioning assistance data (PPAD) from a location server (LS) 202 (which may be implemented in computing device 112 of FIG. 1) to a positioning engine (PE) 206 provisioned in user equipment (UE) 204 (e.g., mobile station 104 of FIG. 1), in accordance with an example implementation.

In example system 200, PPAD may be provided to (authorized) PE 206, in several different ways, in accordance with various implementations. By way of example, FIG. 2 shows three different ways in which PPAD may be provided by LS 202 to PE 206. As illustrated, at a step 1, an exchange of one or more messages between LS 202 and PE 206 may be implemented to support an authentication process in which LS 202 may determine whether PE 206 is to obtain PPAD. The messages exchanged between LS 202 and PE 206 in step 1 (and other messages exchanged between LS 202 and PE 206 such as those described later for step 2a) may be transferred via an AP, such as AP 208, or via another AP or base station not shown in FIG. 2 and may be received by or sent from PE 206 via other parts of UE 204 (e.g. a transceiver and an antenna) that may or may not be part of PE 206. However, the messages may be produced and consumed by PE 206 and not be interpreted or affected by other parts of UE 204. The exchange of message may comprise or form part of a SUPL location session between LS 202 and PE 206. As a consequence of the exchange of messages at step 1, LS 202 may learn and verify (e.g. authenticate) the identity of a provider of (and/or other identifying information about) PE 206. The identity of the provider of PE 206 may be a name, a number, a string of characters, octets, bits or decimal or hexadecimal digits or some other designation and may follow some national or international standard or may be proprietary to some set of providers (e.g. the LS 202 provider and PE 206 provider). A provider (e.g. manufacturer) of PE 206 may, for example, be the same as or may be distinct from a provider of UE 204. As an example, PE 206 may comprise a process, program, firmware or software supported on a silicon chip that supports wireless modem and location functions for UE 204. The manufacturer of the silicon chip and its constituent software and firmware may be the provider of such a PE and may or may not be the same as the manufacturer (i.e., provider) of other components of UE 204.

Having discovered and verified (e.g. using an authentication technique such as that supported using a private authentication key or a public-private key pair) the identity of the provider of PE 206, LS 202 may determine whether this provider is trusted to receive PPAD. For example, LS 202 may be configured with the identities of one or more trusted providers of PEs. If the discovered and verified provider of PE 206 matches ones of these configured identities, LS 202 may assume that PE 206 was implemented by the provider of PE 206 to securely support reception of PPAD as described earlier herein. Accordingly, LS 202 may determine that PPAD may be sent to PE 206.

PE 206 may then, for example, receive PPAD at a step 2 using any one of alternative example techniques 2a through 2c as illustrated in system 200. Thus, for example, at example step 2a, PE 206 may receive PPAD in the course of a point-to-point session between PE 206 and LS 202. The point to point session may be the same one used in step 1 to authenticate the provider of PE 206 or may be a separate session. The point to point session used in step 2a may be a SUPL session and the PPAD may be transferred within SUPL ULP messages and/or within positioning protocol messages (e.g. for LPP, LPPe, RRC, RRLP or IS-801) that are carried within SUPL ULP messages. The PPAD transferred may be ciphered (e.g. using ciphering supported in SUPL) to prevent unauthorized access by other UEs. As illustrated, in certain example implementations, PPAD obtained by PE 206 in step 2a may be placed in some form of secure storage 207 that may be accessed by PE 206 but not by other entities in UE 204 such as some or all applications or by the user of UE 204. In certain example implementations, secure storage 207 may be provided as part of a circuit/component of PE 206, e.g., in the form of local memory. In certain example implementations, secure storage 207 may comprise some form of ciphered or otherwise protected data stored in memory—e.g. where data is ciphered and later deciphered by PE 204 using a cipher key that is not accessible to other elements of UE 204 (e.g. a cipher key that is hardcoded in firmware or configured in secure memory on PE 206 or is derived in some secure manner from data available to PE 206 but where the data used for the derivation or the manner of derivation is not known to users or other elements of UE 204).

At example step 2b which provides an alternative form of PPAD transfer to step 2a, PE 206 may obtain PPAD via a ciphered broadcast signal. For example, LS 202 may provide PPAD (possibly already ciphered) to a number of transmitter devices (e.g. all APs in a building, venue, town or city) including an AP 208 (e.g., shown here as a WiFi or Bluetooth (BT) AP), which may broadcast the PPAD in a ciphered form to multiple UEs, including authorized UE 204. Following step 1 but prior to step 2b and not shown in FIG. 2, PE 206 may receive a deciphering key from LS 202 after LS 202 determines that PE 206 is authorized to receive the PPAD. For example, the deciphering key may be transferred by point to point means (e.g. using OMA SUPL combined with the OMA LPPe positioning protocol) to enable the PE to decipher the ciphered broadcast signal of step 2b and obtain the PPAD. LS 202 may provide the deciphering key as a consequence of authenticating the provider of PE 206, e.g., in step 1 or following step 1. In certain implementations, PPAD may comprise different types of data, some of which may correspond to different levels of trust (trust levels). Accordingly, different PEs may obtain different PPAD from a ciphered broadcast signal. For example, different portions of PPAD may be ciphered using different ciphering keys and then broadcast. Depending on the level of trust, a PE 206 may receive some but not all corresponding deciphering keys and thereby be able to receive and decipher some but not all of the PPAD. For example, precise locations of APs may be part of PPAD and receive a high level of protection whereas less precise locations of APs may also be part of PPAD and receive a lower level of protection. For example, a PE 206 may receive a deciphering key to receive and decipher less accurate AP locations but not to receive and decipher more accurate AP locations. In an implementation, deciphering keys may be transferred from LS 202 to PE 206 using SUPL or LPPe and PPAD may be broadcast to PE 206 using LPPe version 1.1 or version 2.0 in which support of broadcast of assistance data and ciphering of broadcast of assistance data is a supported feature.

When step 2c is used to transfer PPAD instead of step 2a or step 2b, LS 202 may first at a step 2c-1 provide a MAC address or other identity for a UE 204 associated with an authenticated and trusted PE 206 to one or more APs such as AP 208 that may be nearby to UE 204. The provision of the MAC address or other identity for UE 204 may be used to authorize recipient APs (e.g. AP 208) to provide PPAD to the UE associated with the provided identity—in this case UE 204. The PPAD may contain data already known to an AP (e.g. AP 208) such as information configured in the AP or transferred to the AP some time previously by LS 202 and may include the location of the AP, the locations of other nearby APs, transmission characteristics for the AP and/or other APs etc. The recipient APs may wait until the identified UE is detected or until the UE establishes an association with an AP and then either transfer the PPAD or wait until a request is received from the UE for the PPAD before transferring the PPAD. The transfer may be via point to point means and may employ ciphering to prevent unauthorized access to the PPAD by other UEs. In the case of a WiFi AP, the transfer may use protocols belonging to the IEEE 802.11 family. For example, in the case of AP 208 and UE 204, at example step 2c-2, AP 208 may transfer the PPAD to UE 204 with the PPAD going directly to PE 206 inside UE 204 as a consequence of PE 206 supporting the communication with AP 208 or having configured UE 204 to direct this particular communication to PE 206.

The transfer of PPAD according to steps 2c-1 and 2c-2 above may be made more secure in an embodiment. A PE 206 whose provider ID is obtained and authenticated by LS 202 may provide all or part of the following (additional) information to LS 202 to enable more secure transfer of PPAD according to steps 2c-1 and 2c-2 above: the MAC address (or some other identity) of UE 204; identification of WiFi APs that can be detected by UE 204 (or by PE 206); and/or an approximate location of UE 204. LS 202 may then, for example, configure the provided UE 204 MAC address (or other identity for UE 204) in APs nearby to UE 204, or that UE 204 has detected, such as AP 208 in FIG. 2 and authorize these APs (e.g. AP 208) to provide PPAD (e.g. comprising AP locations) to UE 204 or to the PE 206 component of UE 204 (e.g. using IEEE 802.11u or 802.11v signaling in the case of a WiFi AP) in a point to point manner. The authorization of the APs (e.g. AP 208) by LS 202 may also have a limited duration after which APs (e.g. AP 208) may no longer transfer PPAD to UE 204 even when UE 204 is detected. The limited authorization of APs may enable LS 202 to re-authenticate the provider of PE 206 and/or obtain a new set of WiFi APs detected by UE 204 or a new approximate location for UE 204 after which LS 202 may authorize the same or other APs to send PPAD to UE 204. This extension to steps 2c-1 and 2c-2 may restrict PPAD provision to PE 206 just to APs nearby to UE 204 and reduce the risk that APs distant from UE 204 are spoofed by a different unauthorized UE into sending PPAD to this different unauthorized UE.

For the examples described above for FIG. 2, the provider of LS 202 and the provider of PE 206 may have a business relationship in which the PE 206 provider agrees to treat PPAD received from the LS 202 provider in a secure manner (e.g. as described earlier). Thus, for example, once a provider identity (ID) for PE 206 has been obtained and authenticated by LS 202, LS 202 may assume that PE 206 will treat the received PPAD (e.g. comprising the locations of one or more APs) in a secure manner and not provide some or all of the PPAD to the user of UE 204 or to any Apps on UE 204 that are not known to be associated with the provider of LS 202. In addition, LS 202 may assume that PE 206 will keep received PPAD securely such that an external entity (e.g. App on UE 204, user of UE 204 or some application or client accessing UE 204 via a wireless network and the Internet) cannot access the PPAD. Finally, LS 202 may assume that PE 206 will erase the PPAD after some agreed time period and/or erase the PPAD when UE 204 leaves some area supported by LS 202 such as a particular building, venue, town or city (and assuming PE 206 can be aware of when this occurs).

Further, although FIG. 2 refers to obtaining and authenticating a PE provider ID and to transferring PPAD from an LS to the PE, the authentication may be applicable to the UE provider and the AD transfer may be applicable to the UE if the PE provider and UE provider are the same—e.g. if the PE is an integral part of the UE and not supplied by a different vendor than the UE vendor. It should be understood, however, that these are merely examples of techniques that may be used to securely provide PPAD to a PE or UE, and claimed subject matter is not limited in this respect.

Provision of a PE provider ID to an LS in advance of providing the PE with PPAD by the LS may be supported in other ways. For example, in certain implementations, an LS (e.g., SLP) and PE may exchange their provider IDs (e.g. as part of a SUPL session) without performing authentication of the IDs and trust that the IDs were not spoofed. If such provider IDs are kept confidential and comprise a significant number of apparently random bits, octets, digits or characters, other providers may have difficulty in associating the IDs with the real providers and hence in determining the IDs of providers and which providers have partnerships to transfer PPAD. For example, if a PE for a provider A transfers its provider ID to an LS as part of a SUPL session, the LS may not be able to determine just from the ID, that the provider is provider A, if the LS provider does not have a business association with provider A. Hence the association of the provider ID to the provider A may not be compromised and thus cannot be used by another PE for a different provider B to masquerade as a PE for the provider A and obtain unauthorized PPAD from an LS whose provider has a business association with PE provider A. Hence, attempts to masquerade as another provider may be rare. Further, since with the SUPL solution the individual SLP and SET identities can be mutually provided and authenticated, an SLP or PE that was discovered to masquerade as belonging to another provider may be identified. This may suggest that when SUPL is used to transfer provider IDs, any authentication capability for a PE provider or LS provider can be optional and used at the discretion of two providers in certain instances. However, since an LS may not always be able to obtain and authenticate the individual identity of a UE (e.g. as can be the case for a D-SLP with the SUPL solution), there may still be value in being able to obtain and authenticate a PE provider as exemplified in FIG. 2.

A PE provider ID may be authenticated by an LS using any one of several techniques. For signaling between a PE and LS that is not secure (e.g. which may be intercepted by a third party as in the case of certain WiFi signaling), various known methods of authentication may be used (e.g., Message Digest 5 (MD5), Hash Message Authentication Code (HMAC), Cipher-based Message Authentication Code (CMAC), etc.), in which case a common secret key may be used, which may be hidden and not signaled openly. The common secret key may be agreed by the LS provide and the PE provider in the case that a business relationship exists between both providers and may be configured in each PE manufactured by the PE provider and each LS belonging to or operated by the LS provider. Thereafter, the secret key may be used to authenticate the PE provider to the LS and/or the LS provider to the PE. If signaling between a PE and LS is secure (e.g., as may occur within a SUPL session), a common secret key may be used as a password and transferred openly from the PE to the LS since it cannot be intercepted by other parties. But an LS or PE from a rival provider may make use of this to obtain the key by masquerading as an LS or PE from a preferred provider. Even if keys are not signaled openly, a rival provider might still mount a successful replay attack if authentication is not fully secure, as shown in the following example. Assume that a PE A for a provider 1 wants to obtain trusted location service (e.g. receipt of AP locations) from an LS B for a rival provider 2. LS B may send an authentication challenge to PE A containing a random value (RV). PE A may signal RV to an LS C that also belong to provider 1. LS C may be currently in communication with a PE D for provider 2 and, masquerading as belonging to provider 2, may send an authentication challenge to PE D containing the same random value RV (which LS C has received from PE A). PE D may return an authentication response RES believing LS C belongs to provider 2. LS C may transfer the response RES to PE A who returns it to LS B. LS B may now believe that PE A belongs to provider 2 and may provide trusted services such as providing AP locations and other PPAD to PE A.

In accordance with certain example implementations, authentication keys and other items to facilitate authentication of PE providers and/or LS providers may be configured at a PE/UE and an LS using any one of several techniques. For example, authentication keys and other parameters (e.g., provider IDs and Key IDs) may be agreed between an LS provider and a PE provider, and configured in their respective LSs and PEs. LS configuration may occur rapidly (e.g. over the Internet) by secure means (e.g. HTTPS) and configured data may be kept securely in an LS provided the LS only runs software and programs provided or approved by the LS provider.

A PE configuration may be delayed, may not be secure and the configured data may be subject to unauthorized access by users or by Apps not approved by the PE provider. For example, a delay in configuration may occur if a PE can only be configured at some later time when the PE accesses some LS belonging to the PE provider to obtain location service (e.g. such as requesting GNSS assistance data). A configuration for a particular PE provider A may be insecure if a PE belonging to a rival provider B is able to masquerade as a PE for the provider A while accessing an LS for the provider A. Configured data in a PE may also not be secure if stored in memory accessible to Apps or other SW on a UE or if a user can hack into PE or UE memory. In some embodiments, insecurity in PE configuration may be overcome or mitigated, In a particular implementation, delay in configuring keys in PEs may mean that a common key agreed between an LS provider and PE provider is configured in LSs belonging to the LS provider before being configured in PEs belonging to the PE provider, which may lead to an authentication failure (e.g. when an LS that has received the common key attempts to authenticate the PE provider for a PE that has not yet received the common key). Here, a PE may not be able to obtain trusted services (e.g. receive PPAD) from an LS for a partner provider until configured with the agreed secret key.

According to an embodiment, an insecure configuration of a PE may be overcome using one or more secret encryption keys. A secret key K1 may be embedded in a PE by (or on behalf of) a particular PE provider 1 during chip manufacture. A second secret key K2 may be agreed between the PE provider 1 and an LS provider 2 who have a business relationship. A third secret key, K3, may be obtained as K3=F(K1) (K2) where F(K1) is some ciphering function based on key K1 that is applied to key K2. PEs belonging to the PE provider 1 may download and store K3 (e.g. from a server belonging to PE provider 1). A PE that receives K3 may then obtain the key K2 as $F^{-1}$ (K1) (K3) where $F^{-1}$ (K1) is the inverse of F(K1) (i.e. a deciphering based on the key K1) applied to key K3. Here, a PE from a different provider 2 masquerading as a PE from provider 1 may obtain K3 but may not recover K2 due to not knowing the key K1.

According to an embodiment, a key K2 recovered at a PE (e.g. as described above) may not be stored but instead obtained by the PE as needed. For example, a PE may store the key K3 received from PE provider 1 in the previous example and only obtain key K2 (using key K1) when needed to support authentication of the PE. If at least the key K1 is stored securely, for example, an App or user may not be able to determine K2 even if the stored key K3 can be obtained (e.g. by hacking into PE or UE memory). Also, even when K1 may be accessed, the function $F^{-1}$(K1) may be kept secret and difficult to access due, for example, to being part of firmware or software running on the PE.

Figure 3:
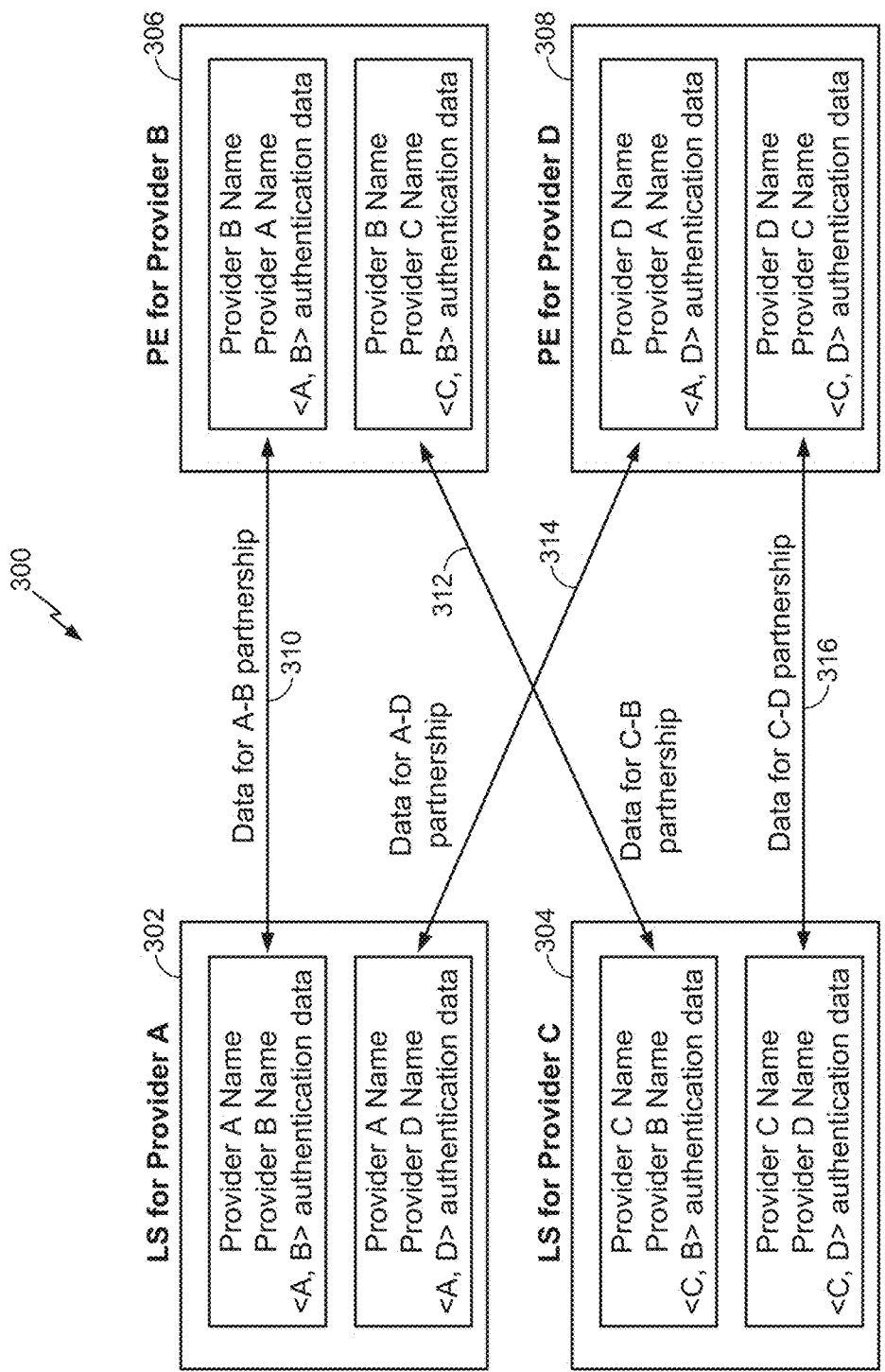
FIG. 3 is an illustration of application of an authentication process based on different relationships among or between LS providers and PE providers, in accordance with an example implementation.

FIG. 3 is an illustration of application 300 of authentication data based on different relationships among or between entities in accordance with an implementation. As illustrated, an LS 302 may be for an LS provider A, an LS 304 may be for an LS provider C, a PE 306 may be for a PE provider B, and a PE 308 may be for a PE provider D. In an example, each LS provider shown in FIG. 3 may have a business relationship with each PE provider shown in FIG. 3. Thus, in this example, LS provider A and LS provider C each have a business relationship with each of PE providers B and D. Data associated with these business relationships may be configured in each LS and PE. Furthermore, for each business relationship, there may be specific data configured in an LS and corresponding data for the same business relationship configured in a PE. The corresponding pairs of configured data are shown in FIG. 3 using the double arrows where the data at each end of the same double arrow are for the same business relationship. For example, in the case of LS 302 for provider A and PE 306 for provider B, data is configured in LS 302 and in PE 306 to support the business relationship between LS provider A and PE provider B. The data in LS 302 and the data in PE 306 for this business relationship are shown by the double arrow 310 in FIG. 3.

FIG. 3 illustrates that an LS or PE may each contain separate configured data for each business relationship with another provider that the provider of the LS or PE has established. Furthermore, the configured data may be used to obtain and authenticate a provider ID. For example, in the case of the relationship between the providers of LS 302 and PE 306, the configured data may be used by LS 302 to obtain and authenticate the ID of provider B for PE 306 and/or may be used by PE 306 to obtain and authenticate the ID of provider A for LS 302. Data that is configured in an LS and PE to support a business relationship between the provider of the LS and the provider of the PE may include the name and/or ID of each provider and data needed to authenticate each provider—e.g. a shared secret authentication key. Thus, as shown in the example of FIG. 3, in the case of LS 302 and PE 306 which each have configured data indicated by the double arrow 310 to support the business relationship between provider A and provider B, the data configured in LS 302 and in PE 306 may include the name of the providers A and B and authentication data needed to allow LS 302 to receive and authenticate the name of provider B from PE 306 and/or to allow PE 306 to receive and authenticate the name of provider A from LS 302. Data configured for other pairs of providers shown in FIG. 3 may be analogous.

Configured data, as exemplified in FIG. 3, may be different for each pair of providers who have a business relationship or may be partly in common. When a common secret key is used for authentication between two providers, the key may be unique for the two providers and not used for any other pair of providers. When a public-private key pair is used to authenticate one provider A, the provider A may configure the private key in its own PEs or LSs and provide the public key to all other providers with which there is a business relationship. In this case, the same public-private key pair may be used for all partners of the provider A without any security risk since the private key is only configured in PEs or LSs belonging to the provider A.

Figure 4:
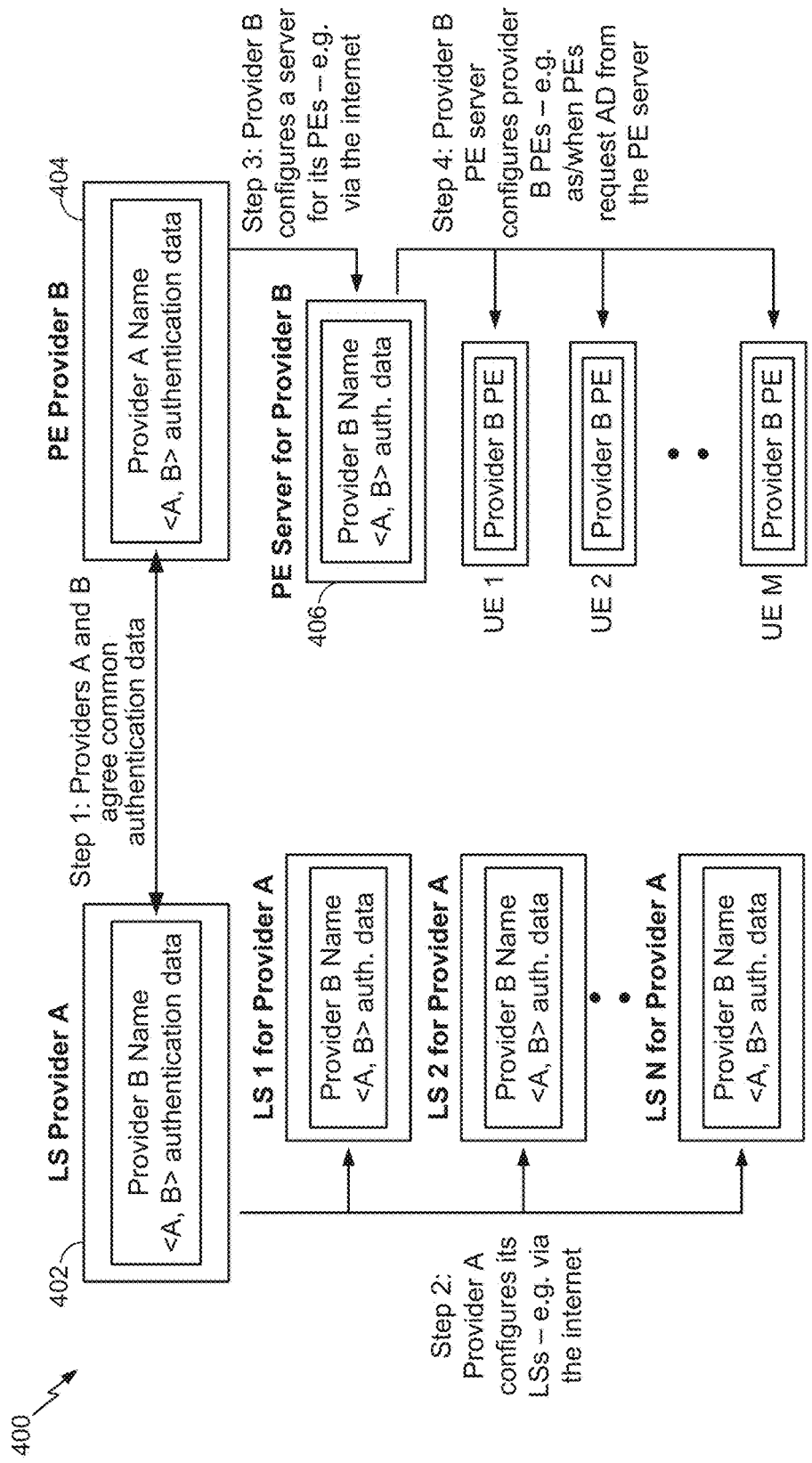
FIG. 4 is an illustration of a process for distributing authentication data, in accordance with an example implementation.

FIG. 4 is an illustration of a distribution 400 of authentication data for a pair of providers who have a business relationship in accordance with an example implementation. Here, an LS provider A 402 is illustrated, along with corresponding LSs (LS 1 through LS N) that may be owned and/or operated by LS provider A 402. A PE provider B 404 is also illustrated along with a corresponding PE server 406 that may be owned and/or operated by PE provider B 404 and PEs (PEs in each of UEs 1 through M) that may have been manufactured or provided in some way (e.g. via software, firmware and/or hardware) by PE provider B 404. As illustrated at example step 1, LS provider A 402 and PE provider B 404 may establish a business relationship to provide location services or location support to one another's LSs and PEs—e.g. via provision of PPAD from any of LSs 1 to N for LS provider A 402 to any of PEs for PE provider B 404 in UEs 1 to M and/or via provision of PPD from any of PEs for PE provider B 404 in UEs 1 to M to any of LSs 1 to N for LS provider A 402. As part of step 1, LS provider A 402 and PE provider B 404 may agree on (e.g. may exchange) common authentication data that may include names or identities for both providers and authentications keys to be used for authenticating the names or identities. LS provider A 402 may, at example step 2, communicate with the LSs 1 to N that it supports to configure the common authentication data agreed and/or exchanged at step 1 (e.g., using a web service or other Internet-based protocol). Similarly, PE provider B 404, at example step 3, may communicate with PE server 406 (e.g., using a web service or other Internet-based protocol) to configure common authentication data agreed and/or exchanged at step 1 which may be the same authentication data provided by LS provider A 402 to LSs 1 to N at step 2 or may be different (e.g. may contain a public authentication key instead of a private authentication key). At example step 4, PE server 406 may configure PEs of PE provider B 404 in UEs 1 to M. The configuration in step 4 may occur at different times for different PEs—e.g. in response to a requests for assistance data (AD) from each PE to PE server 406 operated by PE provider B 404. The configuration at step 4 may make use of wireless communication to and from each PE and/or employ a web service or other Internet-based protocol.

According to certain embodiments, a PE provider ID may be authenticated by an LS or an LS provider ID may be authenticated by a PE using any one of several example techniques to enable the LS or PE, respectively, to verify that a business relationship exists with the provider of the PE or LS, respectively, and that therefore confidential data such as PPAD or PPD may be sent to the PE or LS, respectively. For example, public and private keys may be agreed and configured (e.g. as exemplified in FIG. 4) to perform RSA authentication. Here, an entity that is to be authenticated (e.g. an LS) may be configured with a private key and an entity that is to perform authentication of the other entity (e.g., a PE) may be configured with a matching public key. This may entail derivation of public-private key pairs which may not be trivial and thus may be a problem if private keys are compromised and need replacement. Also, this technique may be limited to application in a single direction (e.g. for authentication of an LS provider by a PE but not for authentication of a PE provider by an LS)—possibly entailing establishing another public key-private key pair for authentication in the other direction.

In certain example implementations, an LS provider and PE provider may establish a common secret key. The common secret key can then be used to authenticate entities (i.e. LSs and PEs) belonging to both providers or just entities belonging to one provider. Authentication may be based on producing a Message Authentication Code (MAC) using a secret key which may not be processor intensive. A secret key may employ any value and may be easily replaced when a key has been compromised.

Use of a shared secret key for authentication of a PE provider by an LS may provide certain particular advantages. For example, a shared secret key may be easily replaced if confidentiality is lost and the processing needed to perform the authentication may be low. According to an embodiment, techniques described herein to authenticate a PE to receive PPAD may be implemented at least in part using a SUPL (Secure User Plane Location) location solution as set forth in publicly available documents from the Open Mobile Alliance (OMA). For example, an LS may be configured in whole or in part as a SUPL location platform (SLP) and a UE containing a PE may be configured in whole or in part as a SUPL enabled terminal (SET). In one implementation, PE provider authentication may be employed by an SLP once only, after which the SLP may store the SET identity and an indication of whether the PE provider for the SET was authenticated as being a trusted PE provider. For later SUPL sessions, the SLP may authenticate the SET identity as may be normal for any SUPL session, after which the SLP may retrieve from its own storage the indication of whether the PE provider for the SET was authenticated and is trusted. However, if an SLP either does not store SET identities or does not authenticate a SET identity at the start of a SUPL session, the SLP may need to obtain and authenticate the PE provider for a SET for every SUPL session with the SET where PPAD may need to be provided to the PE on the SET.

According to an embodiment, authentication of the provider of an SLP using a public-private key method may enhance security since a PE may only need to authenticate the provider of an SLP once. Here, a PE may receive and authenticate the provider name or identity for an SLP during one SUPL session and store the result of the authentication in association with the SLP server identity. For later SUPL sessions between the PE and the SLP, the PE may not need to perform re-authentication of the SLP provider, since the SLP server identity (as opposed to the SLP provider identity) may be authenticated as part of any SUPL session. The PE may then verify from stored information that the SLP provider for the authenticated SLP server had been previously authenticated due to its association with the authenticated SLP server identity. A PE may only receive (e.g. be configured with) the public key (but not the private key) of the public-private key pair so security may not be compromised if another PE, or an App or the user is able to obtain the public key since this will not enable the SLP provider to be spoofed (which would require possession of the private key). The same public-private key pair may be used by the LS provider for all PE providers with whom the LS provider has partnerships which may enable an LS for the LS provider to authenticate itself to any PE without (initially) knowing the PE provider.

Use of a shared secret key instead of a public-private key pair to perform authentication may reduce implementation if the same authentication method is used to authenticate both an LS provider by a PE and a PE provider by an LS, but the method may be less secure because the shared secret key must be configured in both LSs and PEs, whereas with a public-private key pair, the private key only needs to be configured in LSs or PSs, but not both. However, public-private key and/or shared secret key methods may be used without deviating from claimed subject matter.

According to particular implementations, any one of several techniques for shared secret key authentication may be used. For example, hash message authentication code (HMAC) defined in IETF RFC 2104 and NIST FIPS-198-1 may be used for authentication. HMAC operates by computing a hash over a set of data as follows:

HMAC=Hash (F(secret key)||data) (where || indicates concatenation);

where Hash may be MD5 (RFC 1321), SHA-1 or SHA-256 (NIST SP-800-107) or some other Hash function;

F is a simple transformation of a secret key (e.g. (key XOR opad) || (key XOR ipad)); and data could comprise: the PE provider ID, LS provider ID, a random string and/or a date/time stamp.

The value of HMAC may be computed and provided along with a message (e.g. containing the provider IDs, the random string and the date/time stamp) from the entity (LS or PE) whose provider ID is to be authenticated to the entity (PE or LS) that will authenticate the provider ID and is then verified by this entity for the other provider. An HMAC value may comprise 128 bits when obtained using MD5, 160 bits when obtained using SHA-1 and 256 bits when obtained using SHA-256.

Alternatively, Advanced Encryption Standard (AES) Cipher based Message Authentication Code (CMAC) may be used for authentication. AES CMAC operates by providing a cipher based message authentication code using cipher block chaining mode with AES ciphering (NIST SP 800-38B) over a set of data (e.g., the data described above for HMAC). AES CMAC is defined, for example, in NIST SP 800-38B and IETF RFC 4493. A resulting CMAC value may be 128 bits. In another alternative embodiment, AES CMAC may be used as a default method although other methods could be used in a proprietary manner by some pair of providers.

Authentication of a PE provider may, for example, be implemented using SUPL using any one of several techniques. A PE provider and/or LS provider may be authenticated as part of a SUPL session between the LS (functioning as an SLP) and PE (functioning as part a SET). The SUPL session may be established by the PE or by the LS for a variety of reasons such as to obtain the location of the PE (or of the mobile device for the PE) by the LS or by the PE, to request and receive assistance data at the PE from the LS, or to transfer crowdsourcing location information (e.g. containing measurement data and/or locations for APs and base stations) from the PE to the LS. As part of the SUPL session, the PE may need to determine whether the LS belongs to a trusted LS provider (e.g. an LS provider with whom the provider of the PE has a business relationship) and/or the LS may need to determine whether the PE belongs to a trusted PE provider (e.g. a PE provider with whom the provider of the LS has a business relationship). This may be needed in order for an LS to decide whether to send PPAD to the PE and/or in order for the PE to decide whether to send PPD to the LS. The determination of the PE and/or LS providers may be accompanied by authentication of the PE and/or LS provider names or identities as described previously herein.

Authentication of a PE provider and/or an LS provider using SUPL may occur at the start of a SUPL session, for example using a method A or a method B. With method A, new parameters to support authentication may be added to existing SUPL messages such as a SUPL INIT, SUPL RESPONSE, SUPL POS INIT and SUPL TRIGGERED RESPONSE. With method B, a new SUPL message (e.g. a SUPL INFO message) may be exchanged between an SLP and a SET (or between and SLP and a PE) containing authentication related parameters to support authentication of a PE provider and/or an LS provider. In an embodiment of method B, embedded messages for an authentication protocol like the Extensible Authentication Protocol (EAP defined in IETF RFC 3748 and RFC 5247) may carried by the new SUPL message to authenticate a PE provider and/or an SLP provider. Method B could also be used by a SUPL Positioning Center (SPC) to authenticate the provider of a PE during a SUPL POS interaction.

Authentication of a PE provider by an LS and/or of an LS provider by a PE may occur instead later within a SUPL session during a SUPL POS interaction (in the SUPL session) between the PE and LS, for example using a method C, method D or method E. With method C, new authentication parameters may be added to a SUPL POS message to perform authentication of a PE provider and/or an LS provider. With method D, messages for an embedded protocol (e.g. Extensible Authentication Protocol (EAP) defined in IETF RFC 3748 and RFC 5247) may be carried in SUPL POS messages to be used for authentication instead of positioning and may enable authentication of a PE provider and/or LS provider. With method E, authentication capability may be added to an existing positioning protocol (e.g. OMA LPPe) using new parameters or new messages inside this protocol, with messages for the positioning protocol (carrying authentication data) being transferred between an SLP and a SET (or between an SLP and PE) inside SUPL POS messages. The embedded messages for the authentication protocol may enable authentication of a PE provider and/or an LS provider.

To transfer authentication related data between the LS and PE when authentication of an LS provider and/or PE provider occurs as part of a SUPL session, the authentication data may be transferred using an existing authentication protocol, such as IETF EAP. This may fit methods B and D described above. Alternatively, the authentication data may be transferred using customized new parameters in SUPL or in a positioning protocol used with SUPL such as LPPe which may fit methods A, C and E described above.

When SUPL is used to support and provide location services, an SLP may be split into a SUPL Location Center (SLC) which may support SUPL session establishment and some service functions and a SUPL Positioning Center (SPC) which may support positioning of a SET and provision of assistance data to a SET. In a particular implementation, an SLC may obtain and authenticate the provider of a PE and determine whether the PE is trusted (e.g. belongs to a PE provider with whom the SLC provider has a business relationship). The PE trustworthiness may then be conveyed by the SLC to an SPC (e.g. an SPC associated with the same LS provider as the SLC). This may be efficient when the SLC is more easily able than an SPC to authenticate the PE provider for a PE and when an SPC is separate from the SLC and not initially aware of whether the PE provider is trustworthy but needs to know this in order to decide whether to send PPAD to the PE. If an SPC instead performs PE provider authentication itself, the SPC may directly know whether the PE is trusted.

According to some embodiments, method A described above may be used to authenticate a PE provider for a SET by an SLP and may comprise a SUPL based solution using new Information Elements (IEs) including a PE authentication request IE (e.g., SLP to SET) followed by a PE authentication Response IE (e.g., SET to SLP). The PE authentication request IE may be sent by an SLP to a SET (or by an SLP to a PE) to request the PE provider ID for the SET and data to enable the SLP to authenticate the PE provider for the SET. The PE authentication response IE may be sent by a SET (or by a PE) to an SLP in response to receiving a PE authentication request IE and may transfer the PE provider ID for the SET and data to enable the SLP to authenticate the PE provider ID for the SET. The PE Authentication Request IE may be implemented using an optional new IE in SUPL INIT, SUPL RESPONSE and SUPL TRIGGERED RESPONSE messages and may convey any or all of the following data to a SET: (i) SLP Provider ID (e.g. octet string); (ii) SLP Fully Qualified Domain Name (FQDN); (iii) an SLP computed digital signature on the rest of the PE Authentication Request IE which may enable a PE to authenticate the SLP Provider ID in (i); (iv) a public key ID (e.g. an octet string) which may identify (e.g. via a name) though not explicitly provide a key needed to verify any digital signature included in (iii); (v) a random value (RV1) (e.g. an octet string) which may be included when the SLP is requesting authentication of the PE provider ID; (vi) the current date and time which may be included when a PE digital signature is included in (iii) and may ensure the digital signature is unique and cannot be reused; and (vii) LS provider proprietary data (e.g. an octet string) which may, for example, convey a time limit on PPAD retention by the PE. The PE Authentication Request IE may be included in a SUPL INIT message as described later for step C in message flow 500 or in a SUPL RESPONSE message as described later for step D in message flow 600.

According to an embodiment, a PE authentication Response IE may comprise an optional new IE in a SUPL POS INIT message. This IE may be included by the PE if the PE provider and SLP provider (e.g. provided to the PE by the SLP using the PE authentication Request IE and possibly authenticated by the PE) have a business relationship and possibly when the PE has received a PE Authentication Request IE from the SLP carrying an RV1 parameter. The PE Authentication Response IE may convey any or all of the following from the PE to the SLP: (i) the PE provider ID (e.g. an octet string); (ii) a key ID (e.g. an octet string) which may identify (e.g. using a name) though not explicitly provide a PE authentication key for the PE digital signature in (iv); (iii) a random value (RV2) (e.g. an octet string); (iv) a PE Digital Signature computed by the PE on either the rest of the PE Authentication Response IE or on the values of RV1 and/or RV2; (v) the current date and time which may help ensure that any digital signature in (iv) is unique and cannot be reused; and (v) PE provider proprietary data (e.g. an octet string) which may, for example, be used to convey a SET WiFi MAC address and/or other SET address. The PE Authentication Response IE may be included in a SUPL POS INIT message as described later for step E in message flow 500 and step E in message flow 600.

Figure 5:
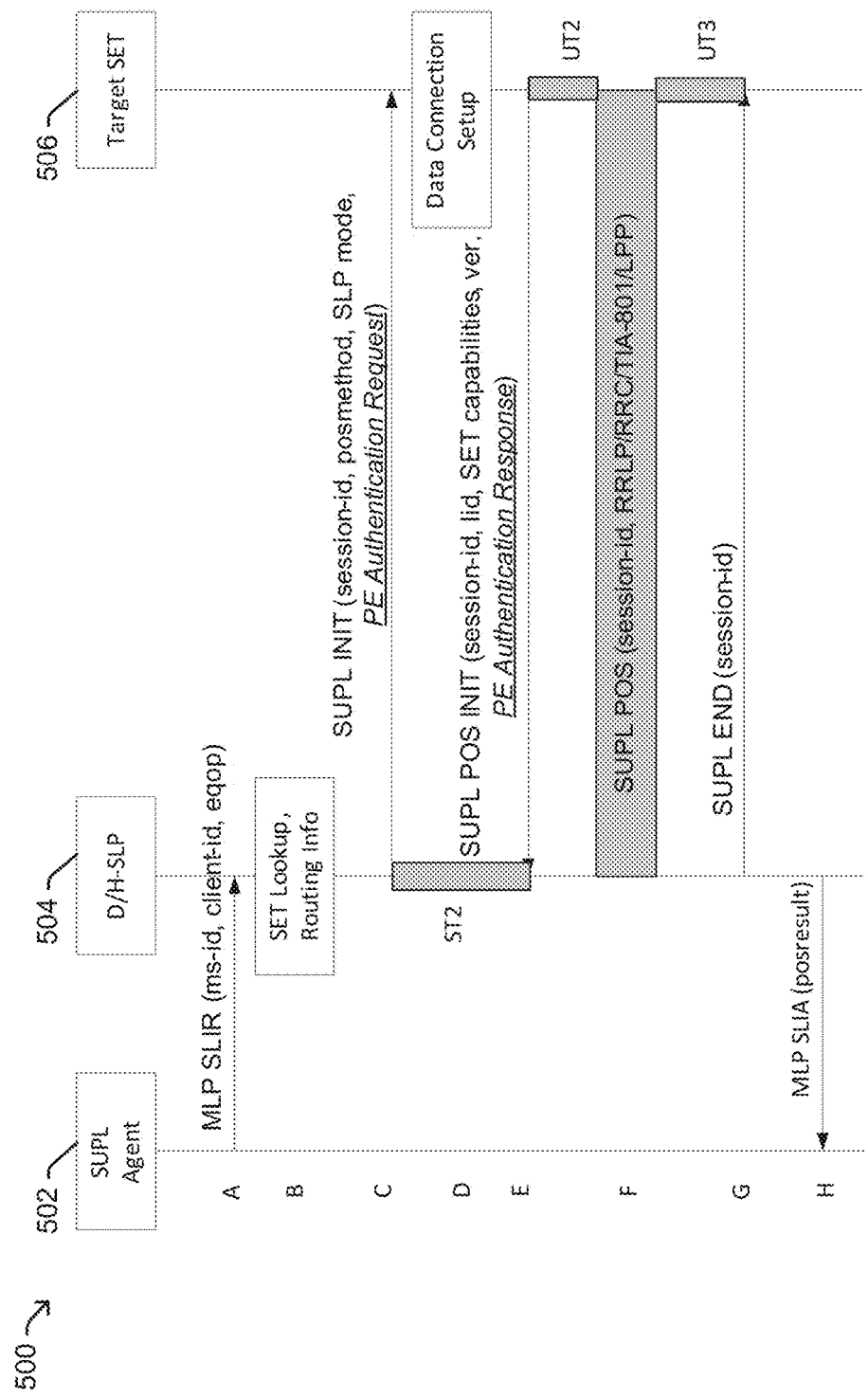
FIG. 5 is a diagram illustrating a message flow for authentication of a Secure User Plane Location (SUPL) Enabled Terminal (SET) for a network initiated session, in accordance with an example implementation.

FIG. 5 is a diagram illustrating an example message flow 500 for authentication of the PE provider for a SUPL Enabled Terminal (SET) for a network initiated SUPL session in accordance with an implementation. Message flow 500 may employ the method A for PE provider authentication described earlier herein using the PE Authentication Request IE and PE Authentication Response IE described earlier. Message flow 500 may be the same message flow as defined in the SUPL ULP standard to enable an external client, such as SUPL agent 502 in FIG. 5, to obtain the current location and optionally the velocity of a mobile station 104, such as target SET 506 in FIG. 5. SUPL agent 502 may send a request for the location (and optionally the velocity) of target SET 506 to a Discovered SLP or a Home SLP (referred to herein as a D/H-SLP) 504 at a step A using an OMA MLP Standard Location Immediate Request (SLIR) message. D/H-SLP 504 may then instigate a SUPL session with SET 506 and obtain the location of SET 506 and optionally the velocity of SET 506 at steps B through G which may be steps normally used to obtain SET location and optionally velocity using a SUPL session. In order to verify whether the PE in SET 506 can be trusted to receive PPAD (e.g. to verify whether the provider of D/H-SLP 504 has a business relationship with the provider of the PE in SET 506 or possibly with the provider of SET 506 if the provider of the PE for SET 506 is also the provider for SET 506), D/H-SLP 504 may include the PE Authentication Request IE described above in the SUPL INIT message sent to SET 506 at step C. SET 506 (or a PE in SET 506) may then include the PE Authentication Response IE described above in the SUPL POS INIT message sent to D/H-SLP 504 at step E. The inclusion of the PE Authentication Response IE in step E may allow D/H-SLP 504 to obtain and authenticate the PE provider ID for SET 506. If the PE provider for SET 506 is considered as trusted by D/H-SLP 504, then D/H-SLP 504 may send PPAD to SET 506 in one or more SUPL POS messages sent as part of step F. For example, the PPAD may include location coordinates, transmission characteristics and/or RF heatmaps for certain base stations and/or WiFi APs. The PPAD may be included in positioning protocol messages (e.g. for RRLP, RRC, LPP, LPPe, IS-801) contained within SUPL POS messages sent by D/H-SLP 504 during step F. The PPAD may only be sent to SET 506 when D/H-SLP 504 is able to obtain and authenticate the PE provider ID for SET 506 and verify that the PE provider is trusted and may not be sent otherwise. The PPAD may have been requested by SET 506 in the SUPL POS INIT message sent at step E or in a SUPL POS message sent by SET 506 during step F (e.g. may be requested using a positioning protocol message for RRLP, RRC, LPP, LPPe or IS-801 included in the SUPL POS INIT message sent at step E or in a SUPL POS message sent during step F). The PPAD may enable SET 506 (or a PE in SET 506) to obtain accurate location measurements and/or an location estimate during step F which may result in an improved location estimate and optionally an improved velocity estimate being returned to SUPL Agent 502 at step H. Alternatively or in addition, D/H-SLP 504 may record that the PE provider for SET 506 has been obtained, authenticated and found to be trusted and may use this record to send PPAD to SET 506 at a later time or times during other SUPL sessions between D/H-SLP 504 and SET 506. In another embodiment, once D/H-SLP 504 has verified that the PE provider for SET 506 is trusted, D/H-SLP 504 may provide information to the PE in SET 506, such as broadcast deciphering keys, to enable the PE in SET 506 to receive PPAD via broadcast from certain APs as described earlier in association with step 2*b* in FIG. 2. In a further embodiment, D/H-SLP 504 may provide a MAC address or other identity for SET 506 to one or more APs to authorize these APs to convey PPAD to SET 506 as described in association with steps 2*c*-1 and 2*c*-2 in FIG. 2. In an embodiment, the message flow 500 may correspond to step 1 and optionally to step 2*a* in FIG. 2.

Figure 6:
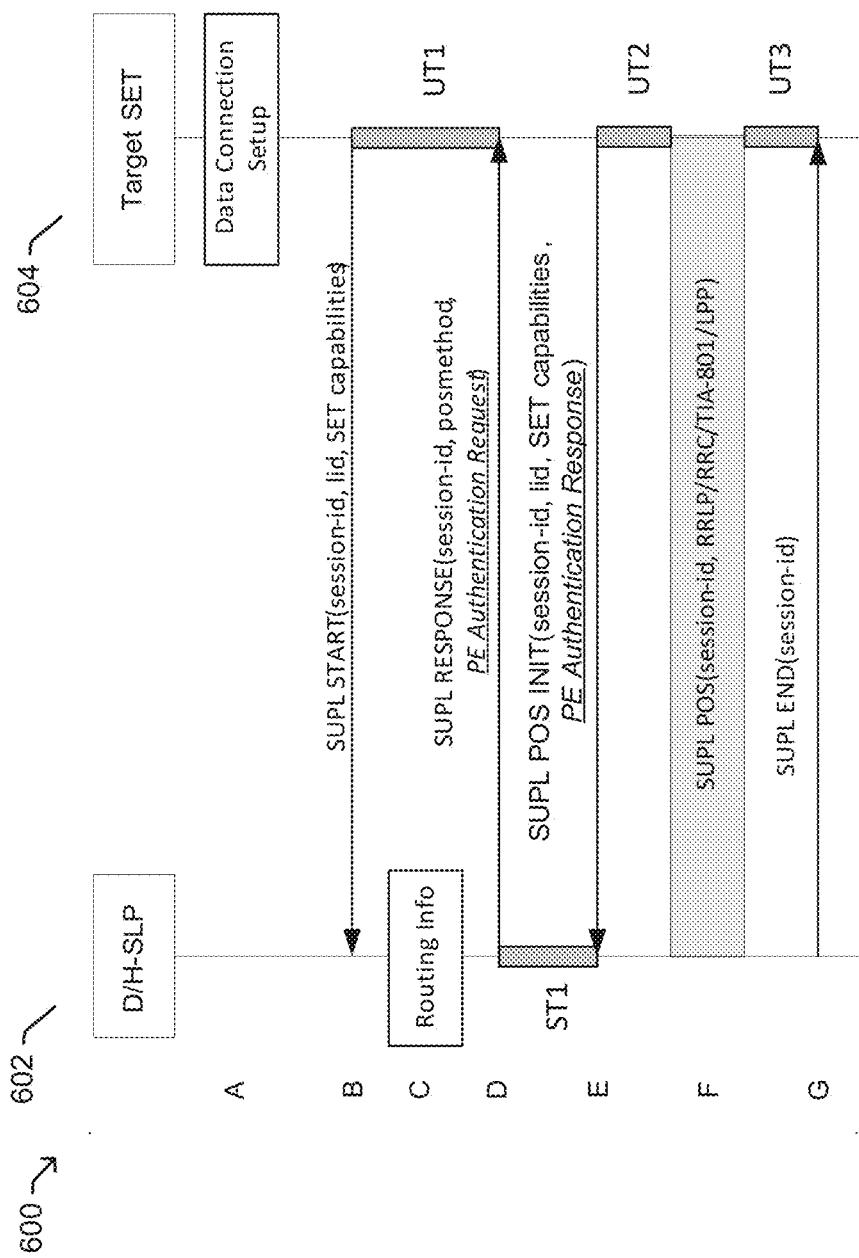
FIG. 6 is a diagram illustrating a message flow for authentication of a SET for a SET initiated session, in accordance with an example implementation.

FIG. 6 is a diagram illustrating an example message flow 600 for authentication of the PE provider for a SET for a SET initiated SUPL session in accordance with an implementation. Message flow 600 may employ the method A for PE provider authentication described earlier herein using the PE Authentication Request IE and PE Authentication Response IE described earlier. Message flow 600 may be the same message flow used in SUPL to enable an application in a mobile station 104 or a user of a mobile station 104 to obtain the current location and optionally the velocity of the mobile station 104. The application or the user may correspond to a SUPL Agent and the mobile station 104 may correspond to the SET 604 in message 600. SET 604 or a PE in SET 604 may initially establish a secure TCP/IP data connection to a Discovered SLP or a Home SLP (D/H-SLP) 602 for SET 604 at a step A and may then start a SUPL session by sending a SUPL START message to D/H-SLP 602 at a step B. The SUPL session may continue through steps C through G as defined by the SUPL ULP standard to support a SET initiated request for the SET location and/or for assistance data to enable SET 604 or a PE in SET 604 to obtain the location and optionally the velocity of SET 604 at the current time and/or at a later time. In order to verify whether the PE in SET 604 can be trusted to receive PPAD (e.g. to verify whether the provider of D/H-SLP 602 has a business relationship with the provider of the PE in SET 604 or possibly with the provider of SET 604 if the provider of the PE for SET 604 is also the provider for SET 604), D/H-SLP 602 may include the PE Authentication Request IE described earlier in the SUPL RESPONSE message sent to SET 604 at step D. SET 604 or a PE in SET 604 may then include the PE Authentication Response IE described earlier in the SUPL POS INIT message sent to D/H-SLP 602 at step E. The inclusion of the PE Authentication Response IE in step E may allow the D/H-SLP 602 to obtain and authenticate the PE provider ID for SET 604. If the PE provider for SET 604 is considered as trusted by D/H-SLP 602, then D/H-SLP 602 may send PPAD to SET 604 in one more SUPL POS messages sent as part of step F. For example, the PPAD may include location coordinates, transmission characteristics and/or RF heatmaps for certain base stations and/or WiFi APs. The PPAD may be included in positioning protocol messages (e.g. for RRLP, RRC, LPP, LPPe, IS-801) contained within SUPL POS messages sent by D/H-SLP 602 during step F. The PPAD may only be sent to SET 604 when D/H-SLP 602 is able to obtain and authenticate the PE provider for SET 604 and verify that the PE provider is trusted and may not be sent otherwise. The PPAD may have been requested by SET 604 in the SUPL POS INIT message sent at step E or in a SUPL POS message sent by SET 604 during step F (e.g. may be requested using a positioning protocol message for RRLP, RRC, LPP, LPPe or IS-801 included in the SUPL POS INIT message sent at step E or in a SUPL POS message sent during step F). The PPAD may enable SET 604 to obtain accurate location related measurements and/or an accurate location estimate during step F which may result in an improved location estimate and optionally an improved velocity estimate being returned to the SUPL Agent (e.g. an application in SET 604 or the user of SET 604) after the SUPL session is terminated at step G. Alternatively or in addition, D/H-SLP 602 may record that the PE provider for SET 604 has been obtained, authenticated and found to be trusted and may use this record to send PPAD to SET 604 at a later time or times during other SUPL sessions between D/H-SLP 602 and SET 604. In another embodiment, once D/H-SLP 602 has verified that the PE provider for SET 604 is trusted, D/H-SLP 602 may provide information to the PE in SET 604, such as broadcast deciphering keys, to enable the PE in SET 604 to receive PPAD via broadcast from certain APs as described earlier in association with step 2*b* in FIG. 2. In a further embodiment, D/H-SLP 602 may provide a MAC address and/or other address for SET 604 to one or more APs to authorize these APs to convey PPAD to SET 604 as described in association with steps 2*c*-1 and 2*c*-2 in FIG. 2. In an embodiment, the message flow 600 may correspond to step 1 and optionally to step 2*a* in FIG. 2.

Thus, in certain example implementations, LS provider and PE provider identification and authentication may be used to support trusted services between certain pairs of LSs and PEs (e.g., conveyance of AP locations by an LS to a PE and subsequent secure retention of the AP locations by the PE). As exemplified in message flows 500 and 600, support for PE provider identification and authentication may be enabled for SUPL for both network (SLP) initiated SUPL sessions and SET initiated sessions. This may enable PPAD such as AP locations to be securely distributed by a SUPL SLP to PEs resident within SUPL SETs using point to point communication by an SLP, via broadcast or by APs point to point.

FIGS. 7 through 22 are diagrams illustrating message flows providing particular example implementations of the aforementioned example method A for enabling authentication by an SLP of the provider of a PE that is part of a SET. New parameters may include a "PE Auth Req" IE included in certain SUPL User Location Protocol (ULP) and Internal Location Protocol (ILP) messages and that may correspond to the PE Authentication Request IE described earlier for method A and exemplified in FIGS. 5 and 6. New parameters may also include a "PE Auth Resp" IE included in certain SUPL ULP and ILP messages and that may correspond to the PE Authentication Response IE described earlier for method A and exemplified in FIGS. 5 and 6. New parameters may further include a "PE Trusted Flag" IE that may be used in certain SUPL ILP messages to indicate by a SUPL SLC to a SUPL SPC that the provider of the PE in a SET is trusted (e.g. thereby enabling the SPC to send PPAD to the trusted PE). Variants of these example message flows may be possible (e.g., with different SUPL ILP parameters). The example message flows show how these example parameters may be conveyed in SUPL User Plane Location Protocol (ULP) messages between an SLP and a SET and in SUPL Internal Location Protocol (ILP) messages between an SLC and an SPC. The message flows may be an extension of a SUPL version 2.0 or a SUPL version 2.1 defined by OMA and illustrate support of (i) authentication of the PE provider for a SET by an SLP and (ii) conveyance of the authentication result (e.g. that the PE provider for the SET is either trusted or not trusted) from an SLC to an SPC to enable the SPC to determine whether or not sensitive AD (such as AP locations) may be provided to the PE in a trusted manner. The following sections identify the type of SUPL session exemplified for each figure, where "SI" denotes "SET initiated" and "NI" denotes "Network initiated".

Figure 7:
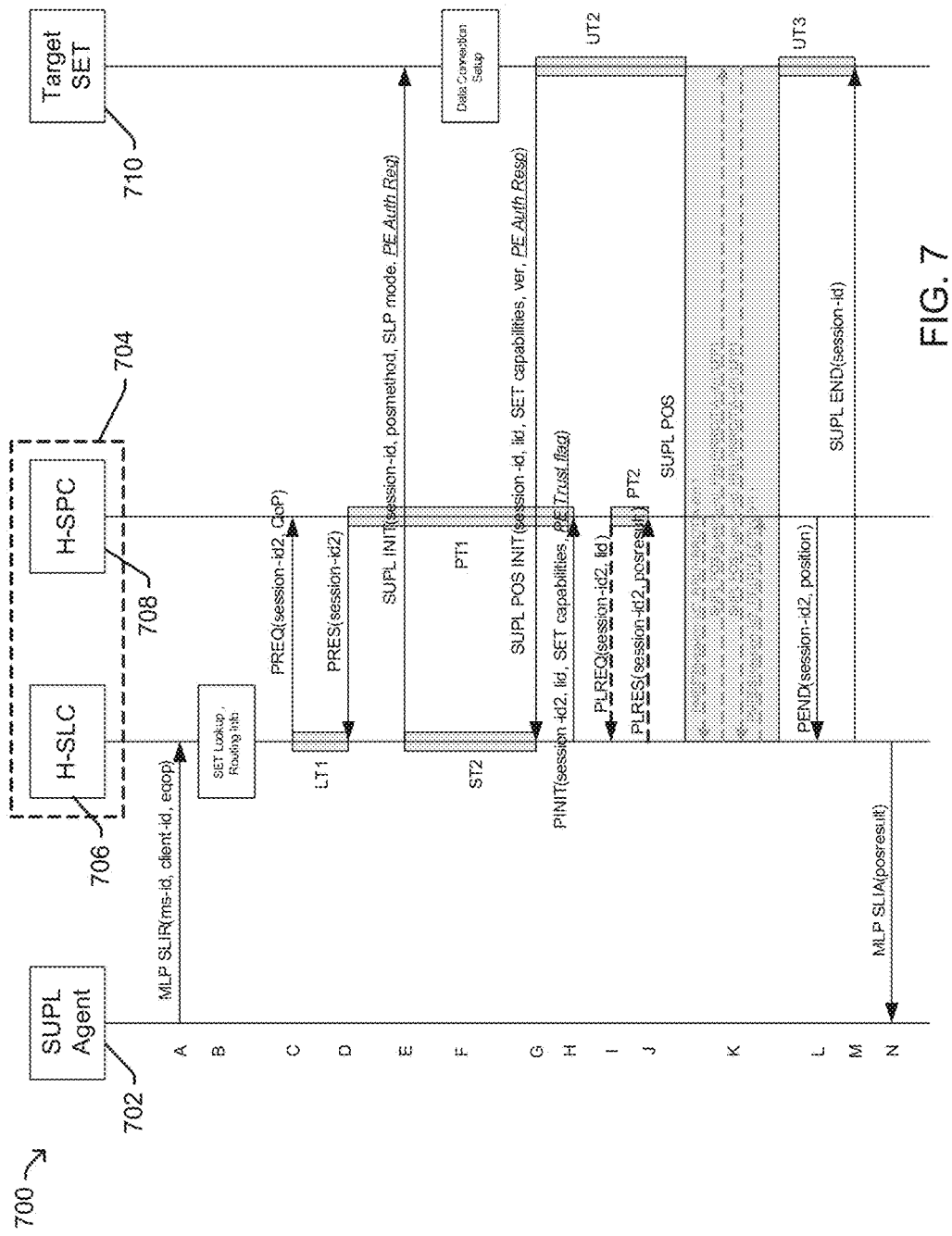
FIGS. 7 through 10 and 15 through 18 are diagrams illustrating message flows for authentication of a SET using network initiated messaging, in accordance with certain example implementations.

FIG. 7 is a diagram illustrating an example message flow 700 for a SUPL 2.1 NI Proxy Non-Roaming session, in accordance with an implementation. Here, for example, a SUPL agent 702, an H-SLP 704 (e.g., which may comprise an H-SLC 706 and H-SPC 708), and a target SET 710 are shown. In this example, a PE Auth Req IE may be sent by H-SLP 704 to SET 710 at event E, a PE Auth Resp IE may be returned by SET 710 to H-SLP 704 at event G, and a PE trust flag IE may be sent by H-SLC 706 to H-SPC 708 at event H. The Home SLP (H-SLP), Home SLC (H-SLC) and Home SPC (H-SPC) shown and described for message flow 700 and for the message flows shown in FIGS. 9, 11, 13, 15, 17, 19, and 21 may be replaced by a Discovered SLP (D-SLP), Discovered SLC (D-SLC) and Discovered SPC (D-SPC), respectively, without changing other aspects of each message flow including the use of the PE Auth Req, PE Auth Resp and PE trust flag IEs.

Figure 8:
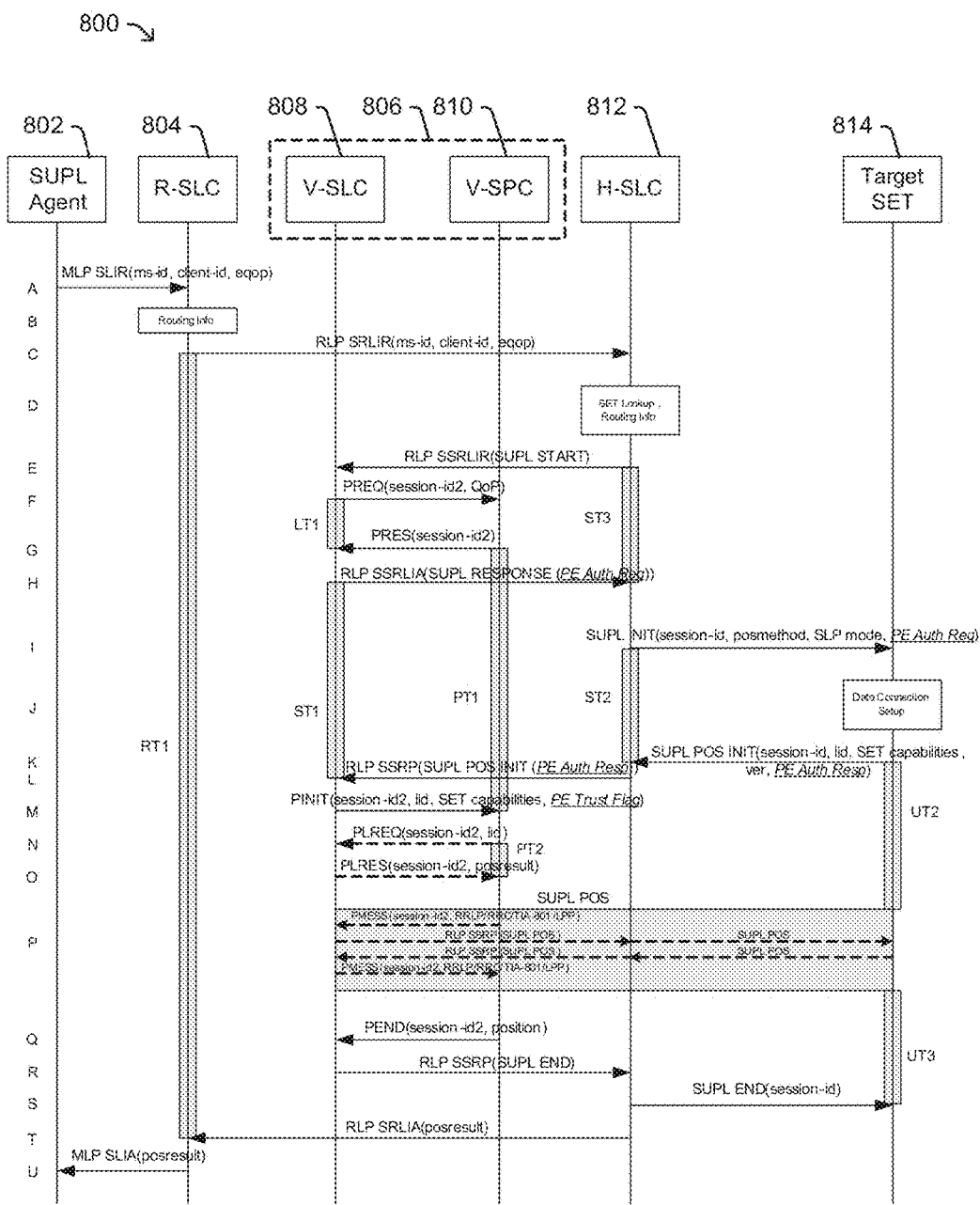

FIG. 8 is a diagram illustrating an example message flow 800 for a SUPL 2.1 NI Proxy Roaming session, in accordance with an implementation. Here, for example, a SUPL agent 802, a Requesting SLC (R-SLC) 804, a Visited SLP (V-SLP) 806 (e.g., which may comprise a Visited SLC (V-SLC) 808 and a Visited SLC (V-SPC) 810), a Home SLC (H-SLC) 812, and a target SET 814 are shown. In this example, V-SLC 808 may obtain and authenticate the PE provider ID for SET 814 by sending a PE Auth Req IE to H-SLC 812 at step H. H-SLC 812 may forward the PE Auth Req IE to SET 814 at step I. SET 814 may return a PE Auth Resp IE to H-SLC 812 at step K and H-SLC 812 may forward the PE Auth Resp IE to V-SLC 808 at step L. V-SLC 808 may then authenticate the PE provider for SET 814 using the information in the PE Auth Resp IE received at step L and may then send a PE Trust IE to V-SPC 810 at step M indicating whether the PE for SET 814 is considered as trusted. If the PE is indicated as trusted in step M, V-SPC 810 may provide PPAD (e.g. AP locations) to SET 814 at step P.

Figure 9:
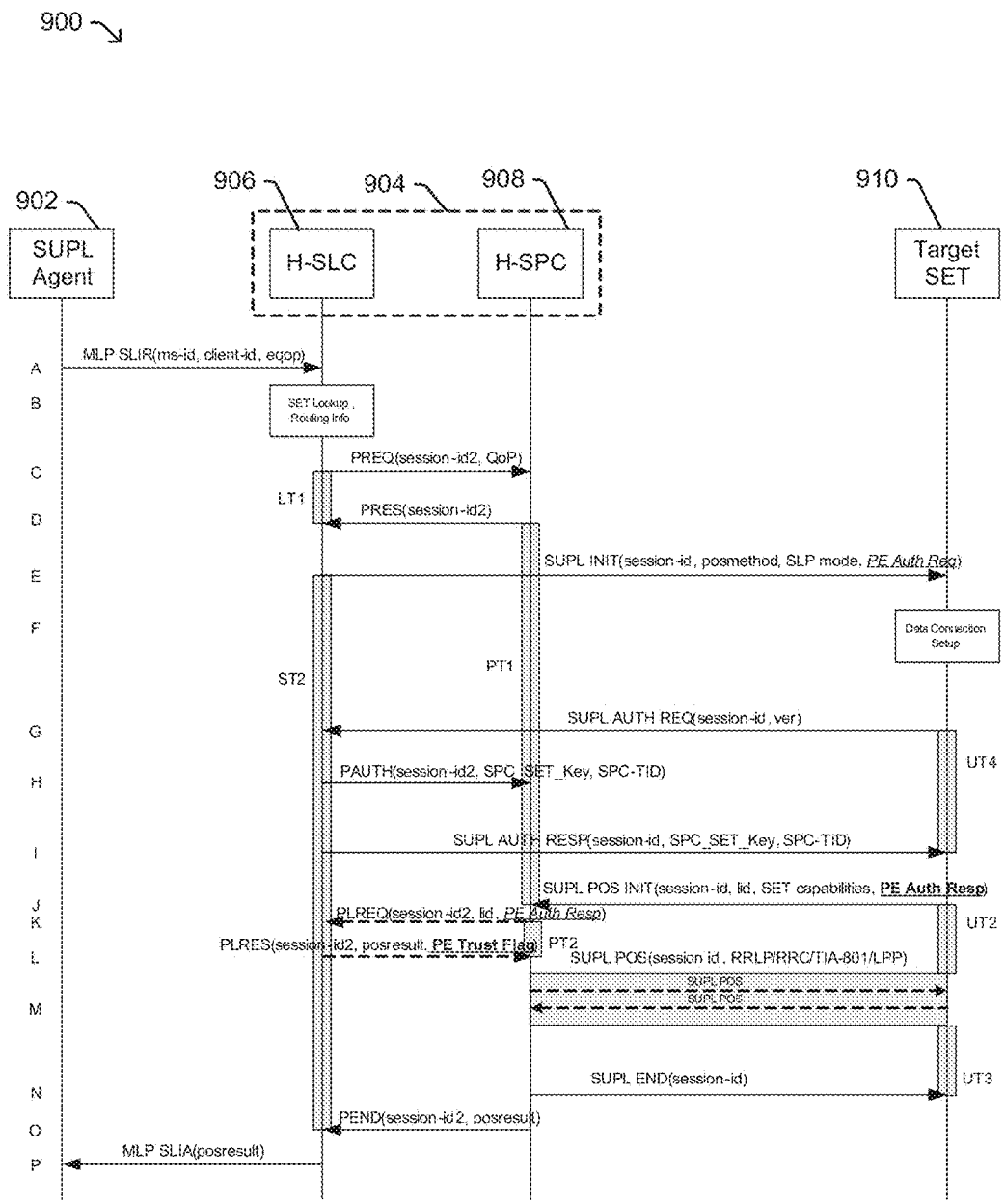

FIG. 9 is a diagram illustrating an example message flow 900 for a SUPL 2.1 NI Non-Proxy Non-Roaming session, in accordance with an implementation. Here, for example, a SUPL agent 902, an H-SLP 904 (e.g., which may comprise an H-SLC 906 and a Home SPC (H-SPC) 908), and a target SET 910 are shown. In this example, a PE Auth Req IE may be sent by H-SLC 906 to SET 910 at step E, a PE Auth Resp IE may be returned by SET 910 to H-SLC 906 at event G, and a PE trust flag IE may be sent by H-SLC 906 to H-SPC 908 at event H which may indicate whether the PE provider for SET 910 is trusted and authorized receive PPAD—e.g. at step M.

Figure 10:
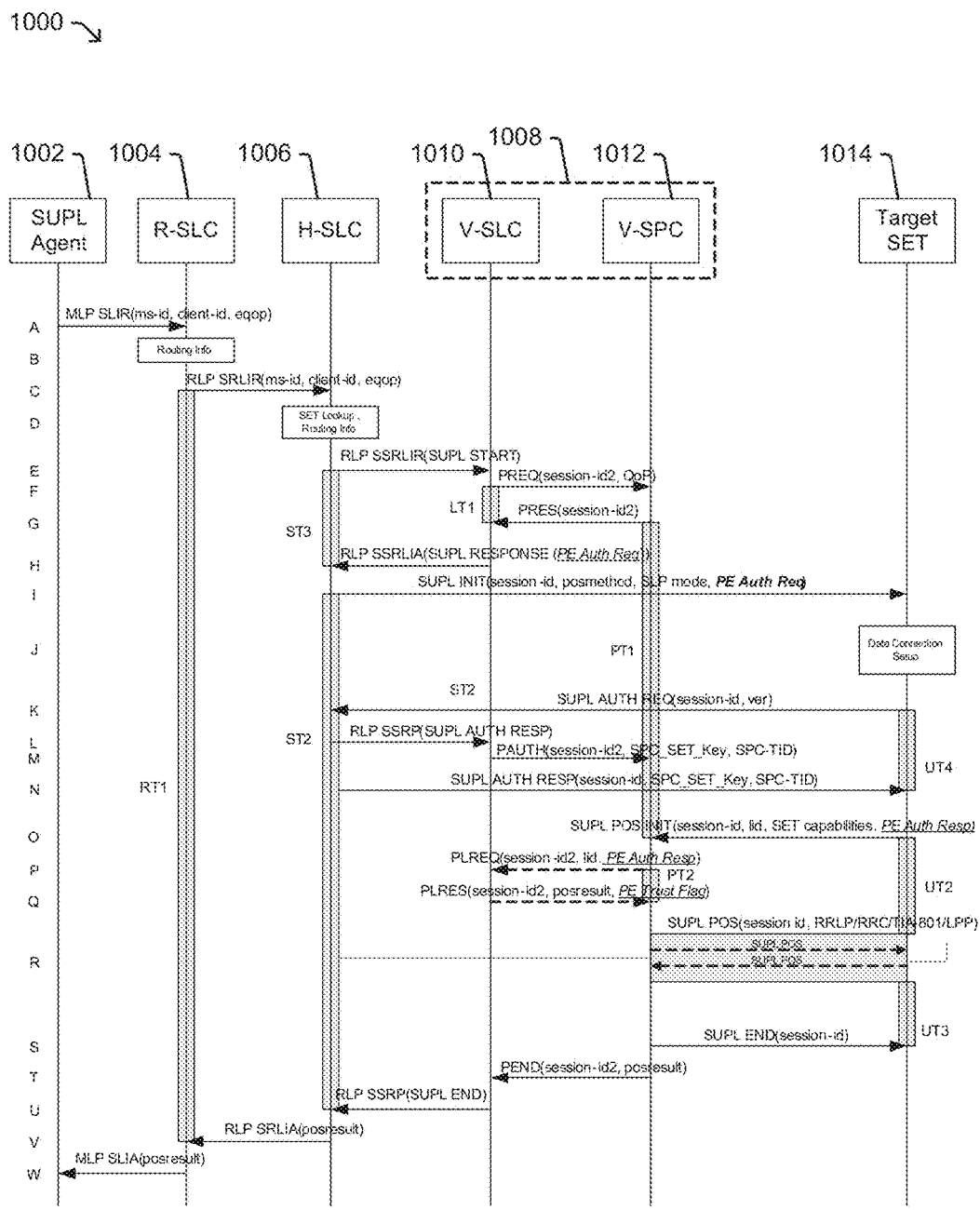

FIG. 10 is a diagram illustrating an example message flow 1000 for a SUPL 2.1 NI Non-Proxy Roaming session, in accordance with an implementation. Here, for example, a SUPL agent 1002, an R-SLC 1004, an H-SLC 1006, a V-SLP 1008 (e.g., which may comprise a V-SLC 1010 and V-SPC 1012), and a target SET 1014 are shown. In this example, V-SLC 1010 may obtain and authenticate the PE provider ID for SET 1014 by sending a PE Auth Req IE to H-SLC 1006 at step H. H-SLC 1006 may forward the PE Auth Req IE to SET 1014 at step I. SET 1014 may return a PE Auth Resp IE to V-SPC 1012 at step O and V-SPC 1012 may forward the PE Auth Resp IE to V-SLC 1010 at step P. V-SLC 1010 may then authenticate the PE provider for SET 1014 using the information in the PE Auth Resp IE received at step P and may then send a PE Trust IE to V-SPC 1012 at step Q indicating whether the PE for SET 1014 is considered as trusted. If the PE is indicated as trusted in step Q, V-SPC 1012 may provide PPAD (e.g. AP locations) to SET 1014 at step R.

Figure 11:
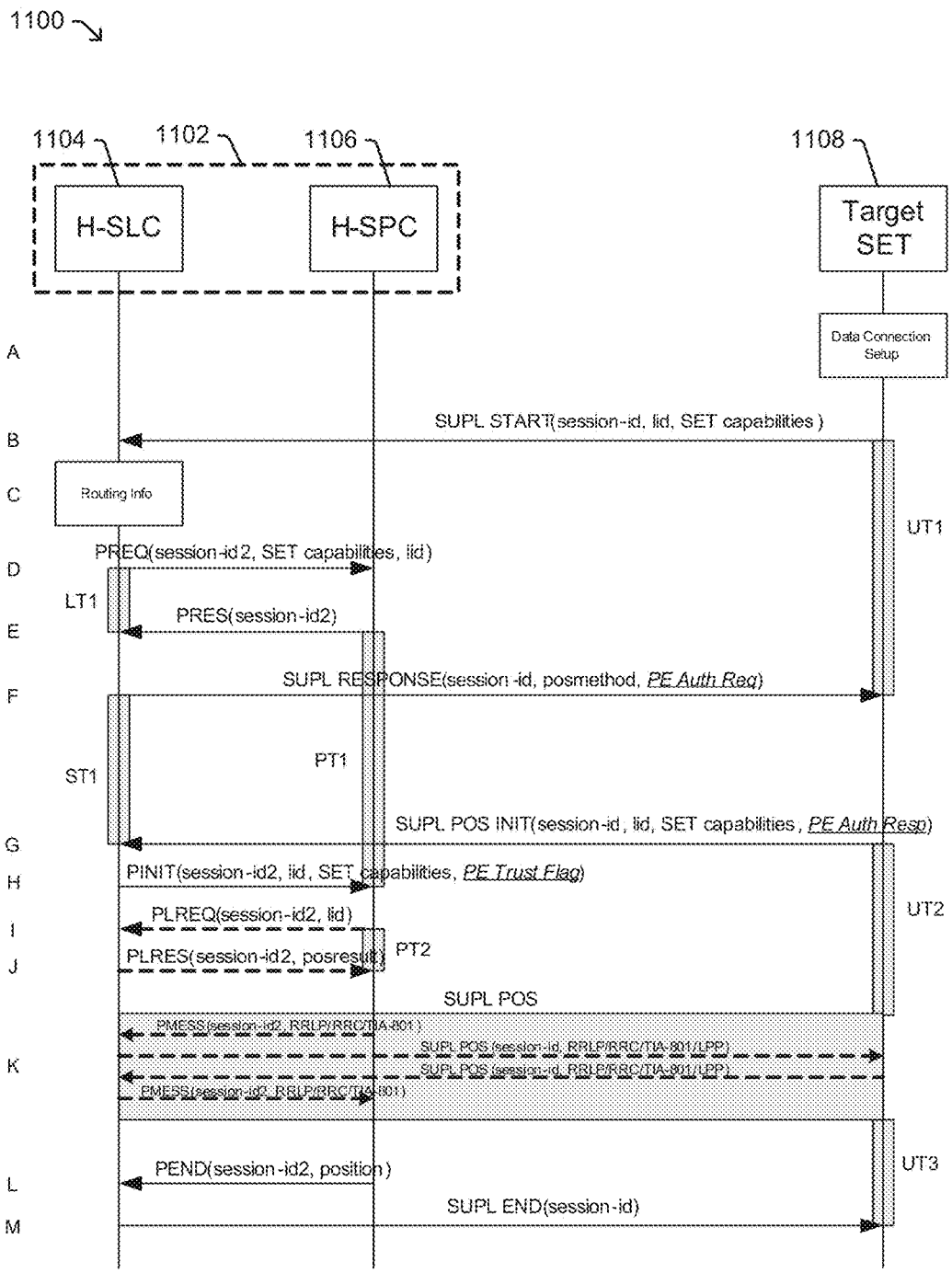
FIGS. 11 through 14 and 19 through 22 are diagrams illustrating message flows for authentication of a SET using a SET initiated messaging, in accordance with certain example implementations.

FIG. 11 is a diagram illustrating an example message flow 1100 for a SUPL 2.1 SI Proxy Non-Roaming session, in accordance with an implementation. Here, for example, an H-SLP 1102 (e.g., which may comprise an H-SLC 1104 and H-SPC 1106) and a target SET 1108 are shown. In this example, a PE Auth Req IE may be sent by H-SLC 1104 to SET 1108 at step F, a PE Auth Resp IE may be returned by SET 1108 to H-SLC 1104 at event G which may enable H-SLC 1104 to authenticate the PE provider for SET 1108. H-SLC 1104 may then send a PE trust flag IE to H-SPC 1106 at step H which may indicate whether the PE provider for SET 1108 is trusted and authorized to receive PPAD from H-SPC 1106—e.g. at step K.

Figure 12:
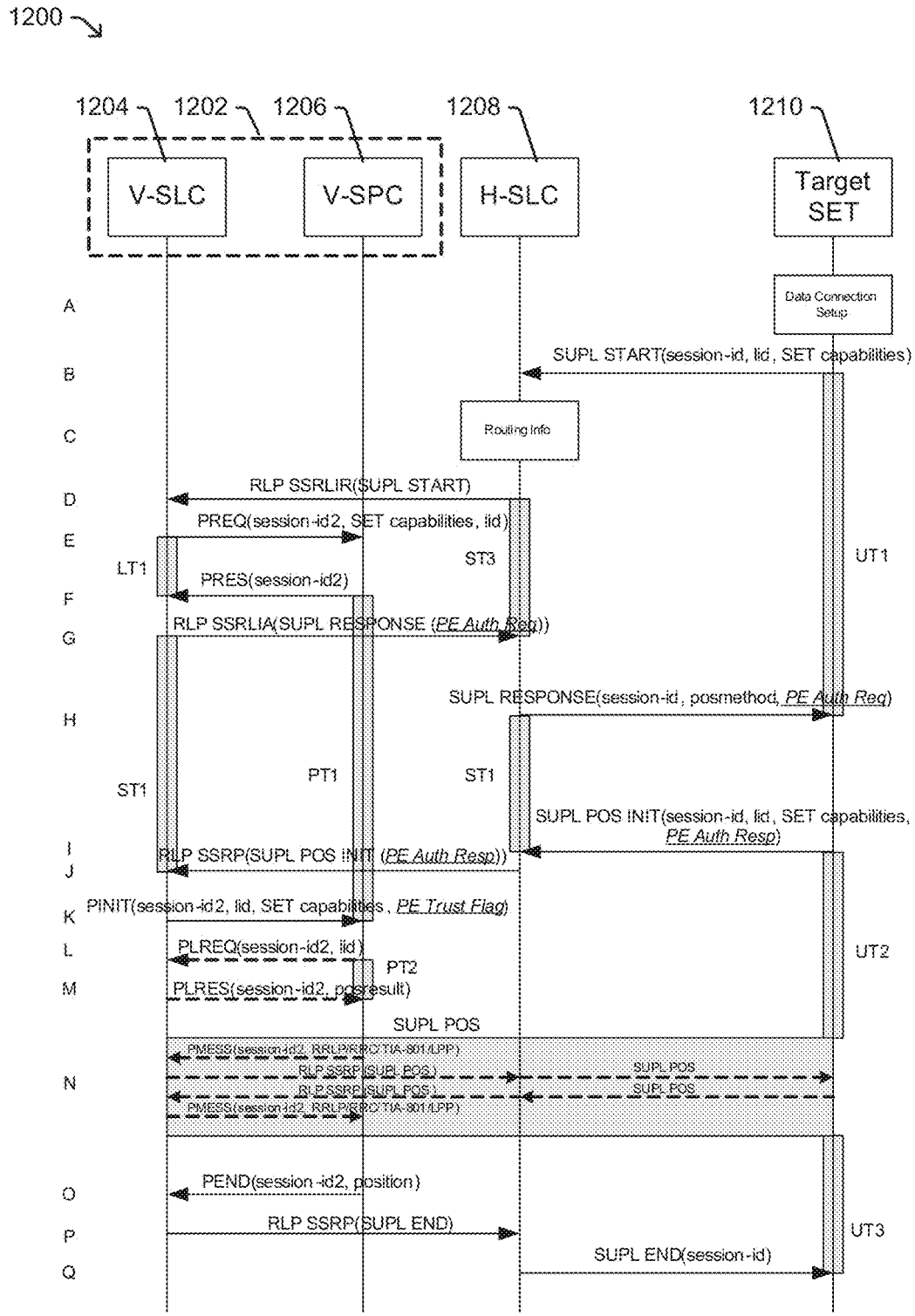

FIG. 12 is a diagram illustrating an example message flow 1200 for a SUPL 2.1 SI Proxy Roaming session, in accordance with an implementation. Here, for example, a V-SLP 1202 (e.g., which may comprise a V-SLC 1204 and V-SPC 1206), an H-SLC 1208, and a target SET 1210 are shown. In this example, V-SLC 1204 may obtain and authenticate the PE provider ID for SET 1210 by sending a PE Auth Req IE to H-SLC 1208 at step G. H-SLC 1208 may forward the PE Auth Req IE to SET 1210 at step H. SET 1210 may return a PE Auth Resp IE to H-SLC 1208 at step I and H-SLC 1208 may forward the PE Auth Resp IE to V-SLC 1204 at step J. V-SLC 1204 may then authenticate the PE provider for SET 1210 using the information in the PE Auth Resp IE received at step J and may then send a PE Trust IE to V-SPC 1206 at step K indicating whether the PE for SET 1210 is considered as trusted. If the PE is indicated as trusted in step K, V-SPC 1206 may provide PPAD (e.g. AP locations) to SET 1210 at step N.

Figure 13:
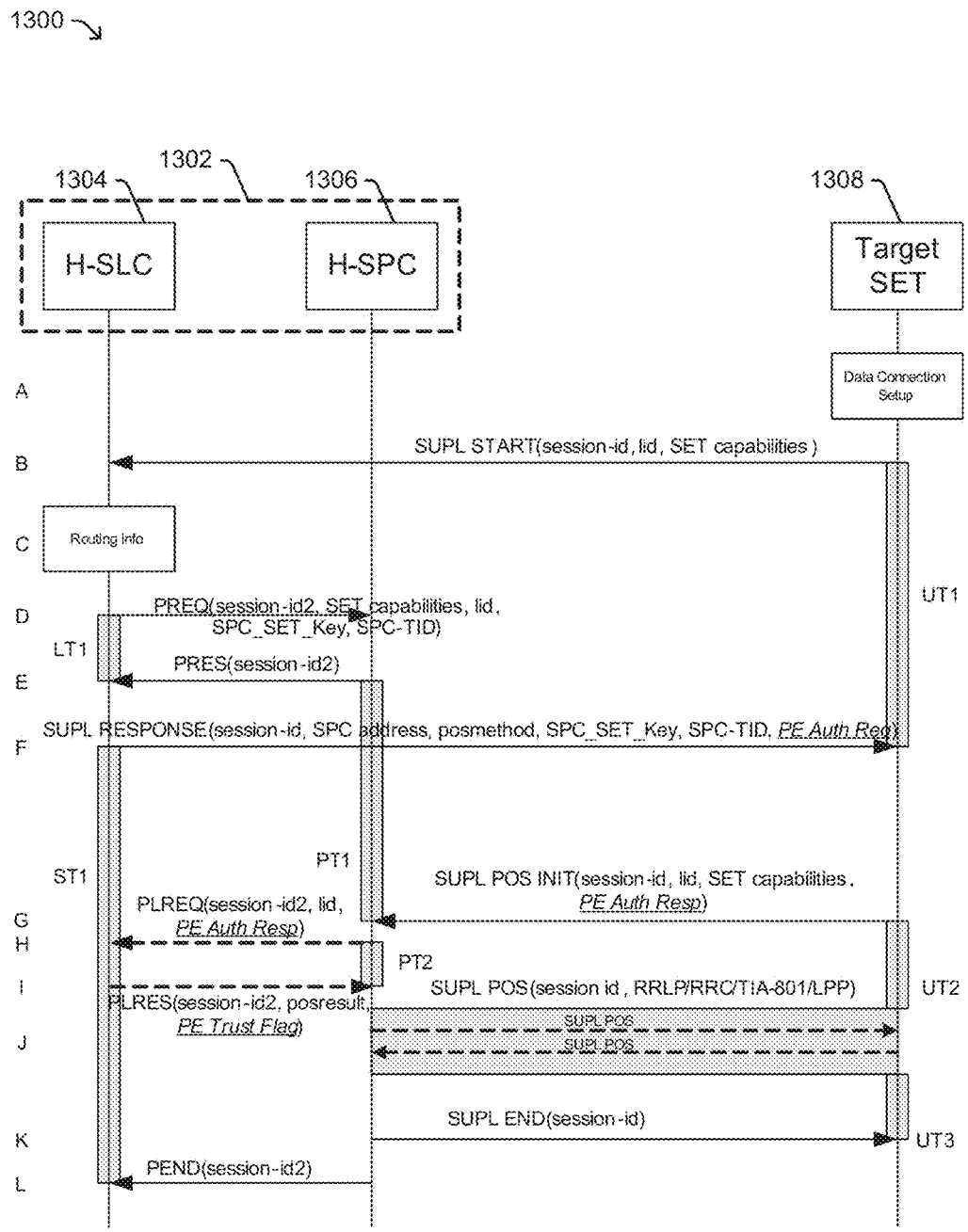

FIG. 13 is a diagram illustrating an example message flow 1300 for a SUPL 2.1 SI Non-Proxy Non-Roaming session, in accordance with an implementation. Here, for example, an H-SLP 1302 (e.g., which may comprise an H-SLC 1304 and H-SPC 1306) and a target SET 1308 are shown. In this example, a PE Auth Req IE may be sent by H-SLC 1304 to SET 1308 at step F and a PE Auth Resp IE may be returned by SET 1308 to H-SPC 1306 at event G. H-SPC 1306 may forward the PE Auth Resp IE to H-SLC 1304 at step H which may enable H-SLC 1304 to authenticate the PE provider for SET 1308. H-SLC 1304 may then send a PE trust flag IE to H-SPC 1306 at step I which may indicate whether the PE provider for SET 1108 is trusted and authorized to receive PPAD from H-SPC 1306—e.g. at step J.

Figure 14:
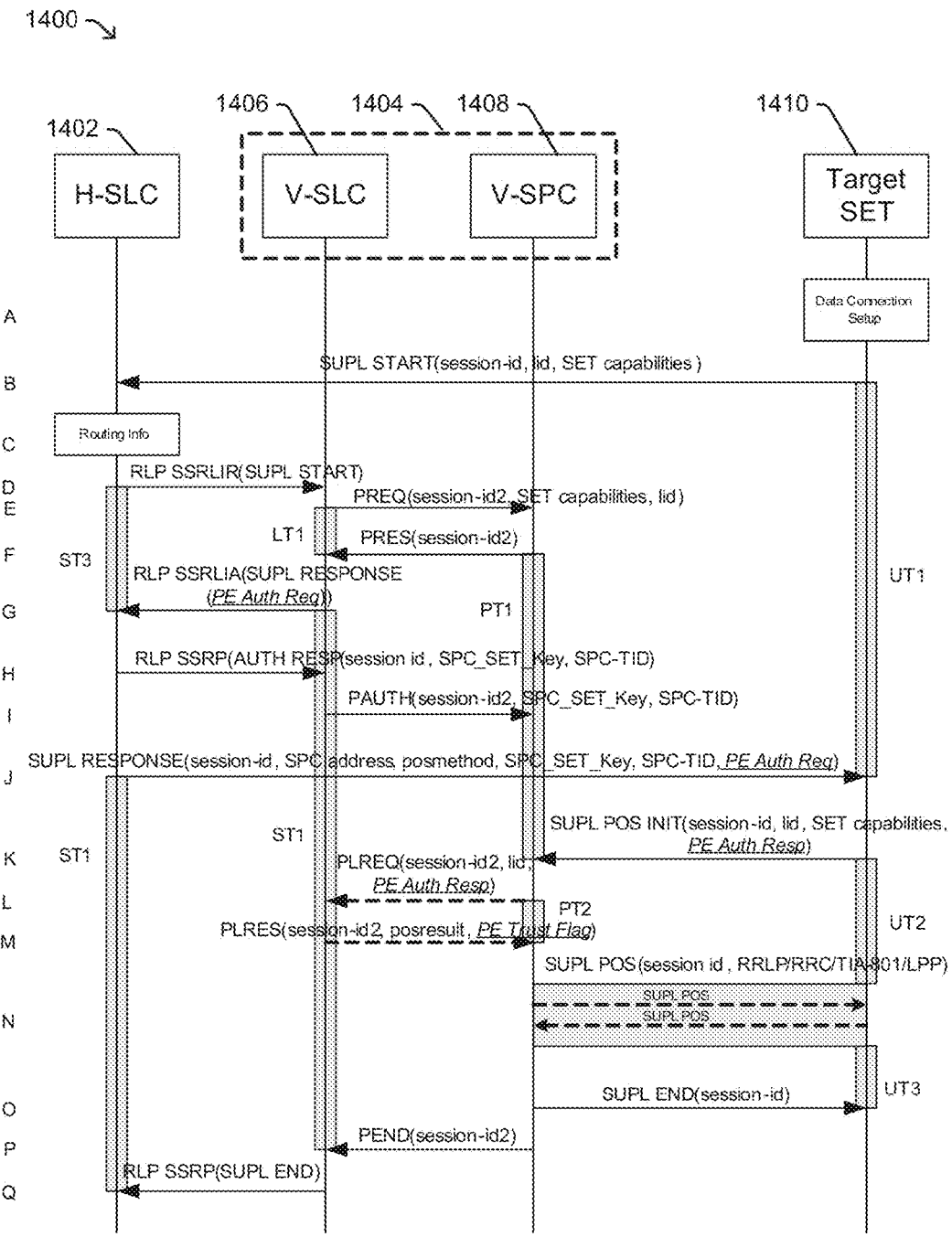

FIG. 14 is a diagram illustrating an example message flow 1400 for a SUPL 2.1 SI Non-Proxy Roaming session, in accordance with an implementation. Here, for example, an H-SLC 1402, a V-SLP 1404 (e.g., which may comprise a V-SLC 1406 and V-SPC 1408), and a target SET 1410 are shown. In this example, V-SLC 1406 may obtain and authenticate the PE provider ID for SET 1410 by sending a PE Auth Req IE to H-SLC 1402 at step G. H-SLC 1402 may forward the PE Auth Req IE to SET 1410 at step J. SET 1410 may return a PE Auth Resp IE to V-SPC 1408 at step K and V-SPC 1408 may forward the PE Auth Resp IE to V-SLC 1406 at step L. V-SLC 1406 may then authenticate the PE provider for SET 1410 using the information in the PE Auth Resp IE received at step L and may then send a PE Trust IE to V-SPC 1408 at step M indicating whether the PE for SET 1410 is considered as trusted. If the PE is indicated as trusted in step M, V-SPC 1408 may provide PPAD (e.g. AP locations) to SET 1410 at step N.

Figure 15:
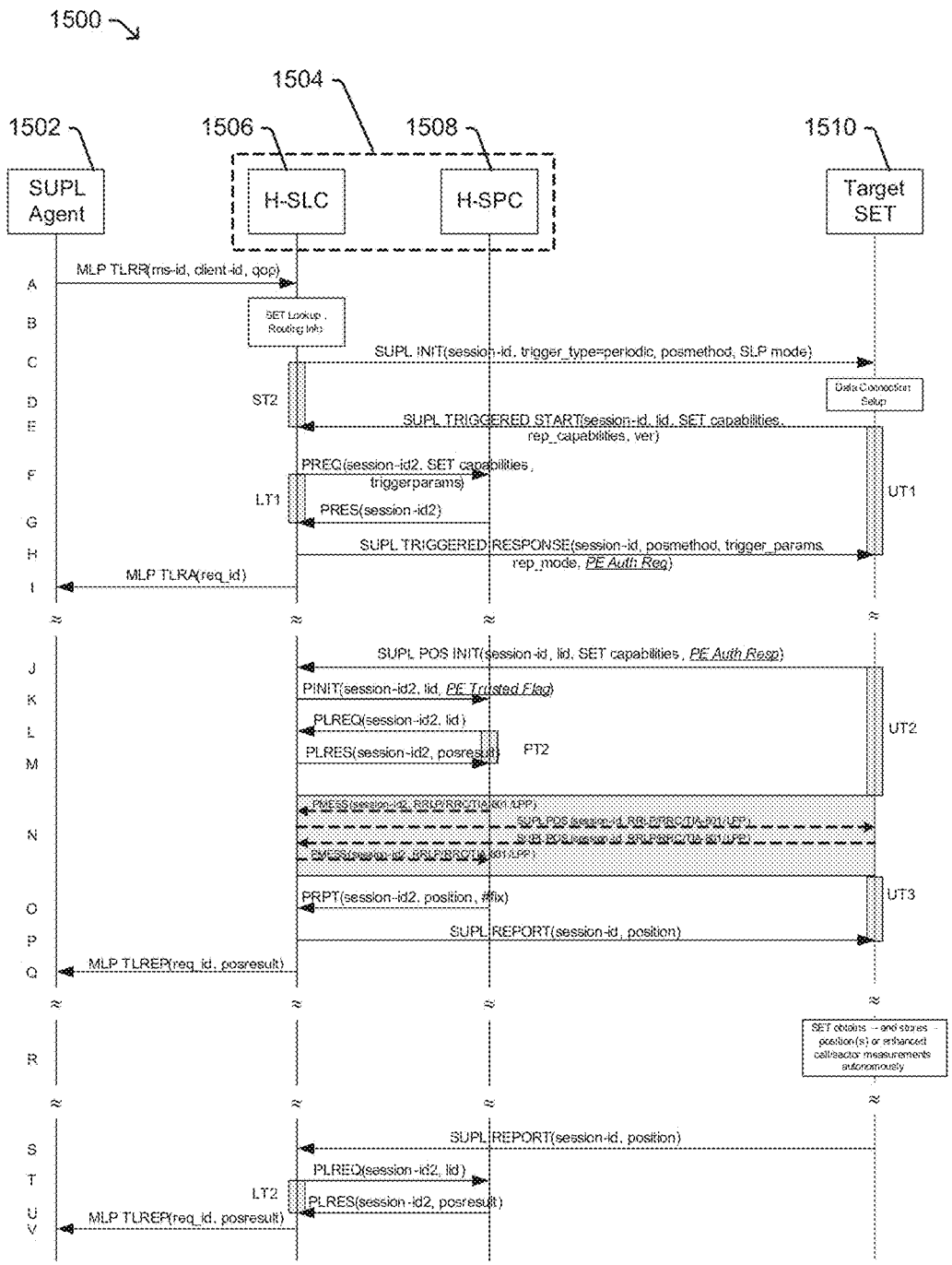

FIG. 15 is a diagram illustrating an example message flow 1500 for a SUPL 2.1 NI Proxy Non-Roaming Periodic Triggered session, in accordance with an implementation. Here, for example, a SUPL agent 1502, an H-SLP 1504 (e.g., which may comprise an H-SLC 1506 and H-SPC 1508) and a target SET 1510 are shown. In this example, a PE Auth Req IE may be sent by H-SLC 1506 to SET 1510 at step H and a PE Auth Resp IE may be returned by SET 1510 to H-SLC 1506 at step J which may enable H-SLC 1506 to authenticate the PE provider for SET 1510. H-SLC 1506 may then send a PE trust flag IE to H-SPC 1508 at step K which may indicate whether the PE provider for SET 1510 is trusted and authorized to receive PPAD from H-SPC 1508—e.g. at step N.

Figure 16:
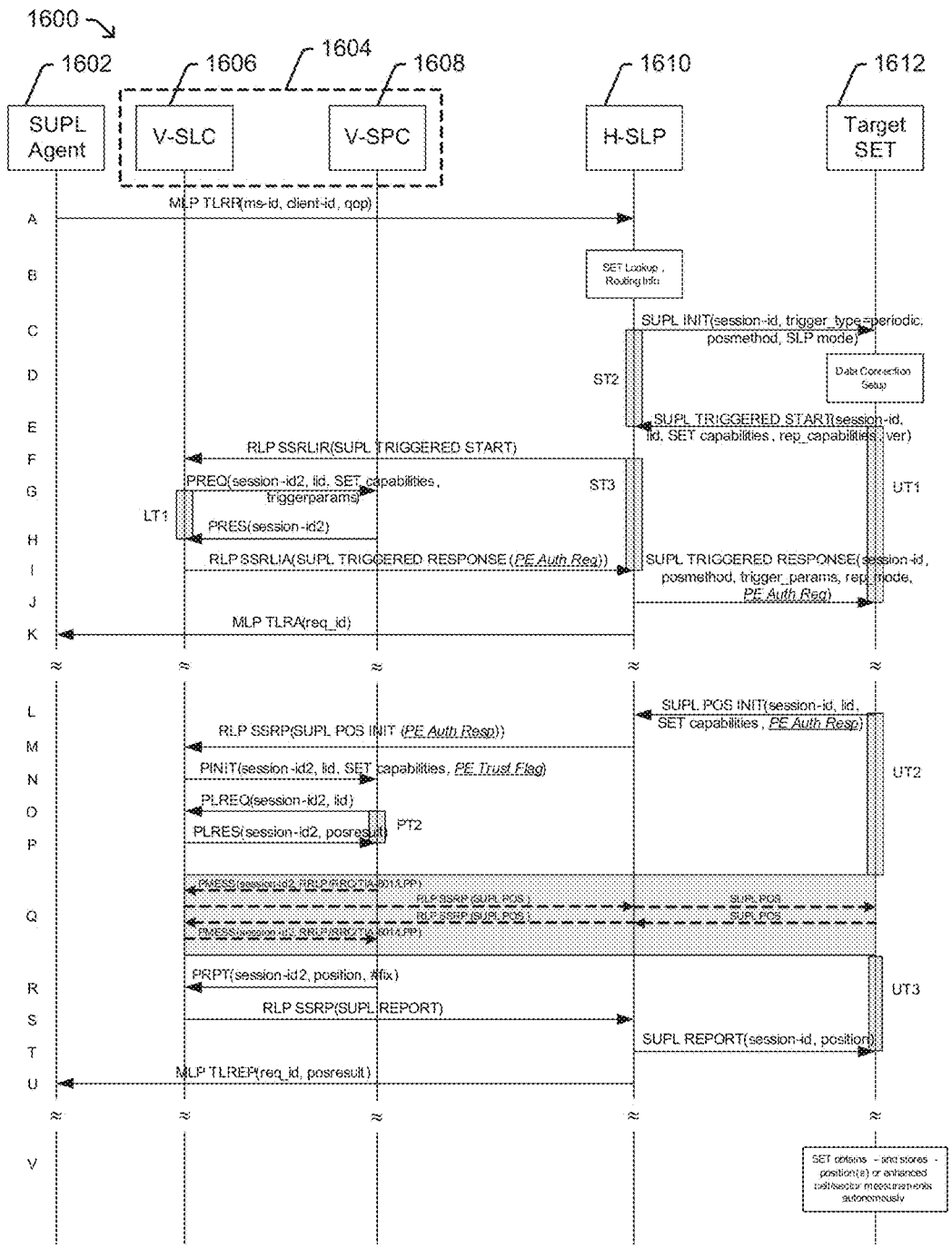

FIG. 16 is a diagram illustrating an example message flow 1600 for a SUPL 2.1 NI Proxy Roaming Periodic Triggered session, in accordance with an implementation. Here, for example, a SUPL agent 1602, a V-SLP 1604 (e.g., which may comprise a V-SLC 1606 and V-SPC 1608), an H-SLP 1610, and a target SET 1612 are shown. In this example, V-SLC 1606 may obtain and authenticate the PE provider ID for SET 1612 by sending a PE Auth Req IE to H-SLP 1610 at step I. H-SLP 1610 may forward the PE Auth Req IE to SET 1612 at step J. SET 1612 may return a PE Auth Resp IE to H-SLP 1610 at step L and H-SLP 1610 may forward the PE Auth Resp IE to V-SLC 1606 at step M. V-SLC 1606 may then authenticate the PE provider for SET 1612 using the information in the PE Auth Resp IE received at step M and may then send a PE Trust IE to V-SPC 1608 at step N indicating whether the PE for SET 1612 is considered as trusted. If the PE is indicated as trusted in step N, V-SPC 1608 may provide PPAD (e.g. AP locations) to SET 1612 at step Q.

Figure 17:
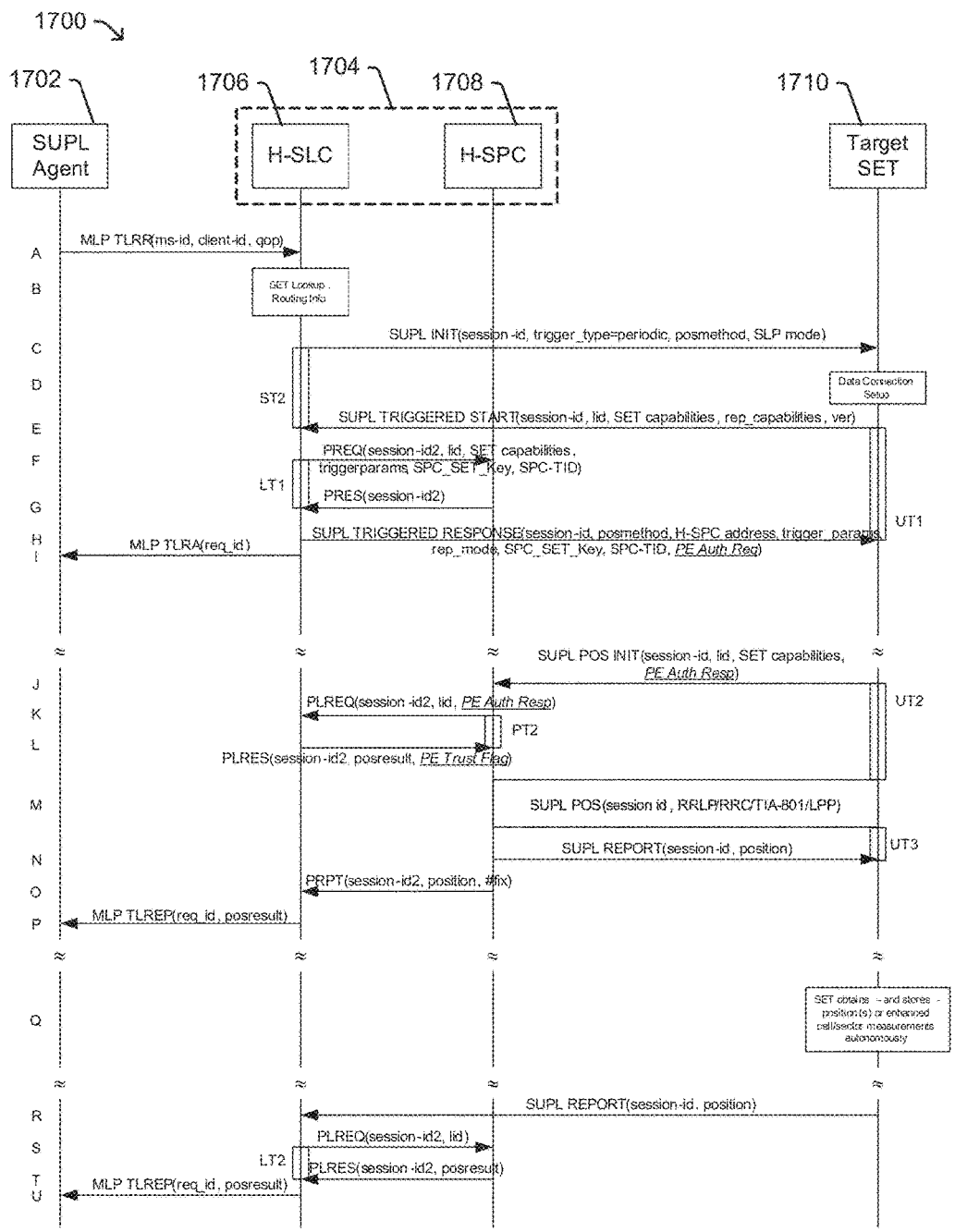

FIG. 17 is a diagram illustrating an example message flow 1700 for a SUPL 2.1 NI Non-Proxy Non-Roaming Periodic Triggered session, in accordance with an implementation. Here, for example, a SUPL agent 1702, an H-SLP 1704 (e.g., which may comprise an H-SLC 1706 and H-SPC 1708) and a target SET 1710 are shown. In this example, a PE Auth Req IE may be sent by H-SLC 1706 to SET 1710 at step H and a PE Auth Resp IE may be returned by SET 1710 to H-SPC 1708 at event J. H-SPC 1708 may forward the PE Auth Resp IE to H-SLC 1706 at step K which may enable H-SLC 1706 to authenticate the PE provider for SET 1710. H-SLC 1706 may then send a PE trust flag IE to H-SPC 1708 at step L which may indicate whether the PE provider for SET 1710 is trusted and authorized to receive PPAD from H-SPC 1708—e.g. at step M.

Figure 18:
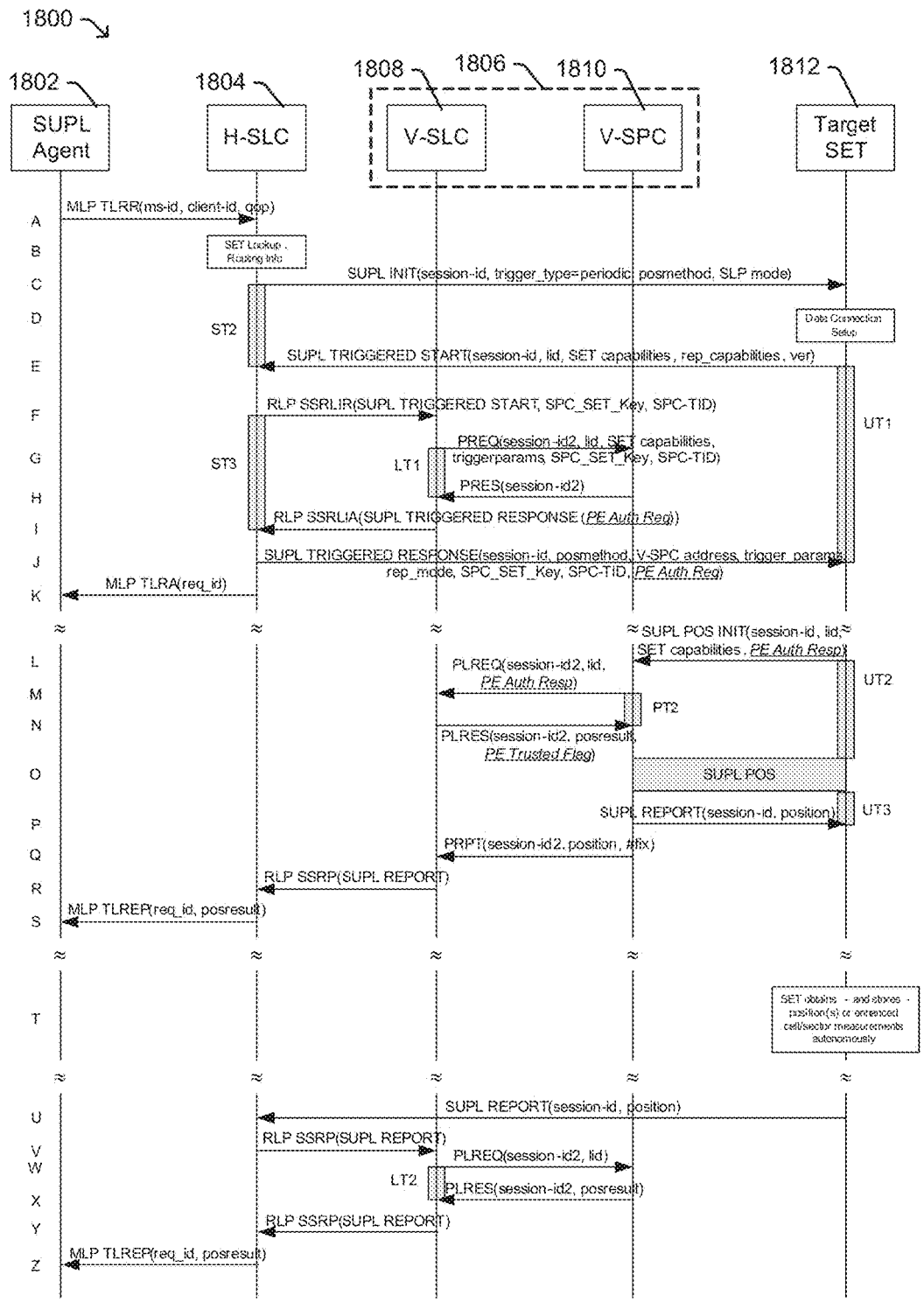

FIG. 18 is a diagram illustrating an example message flow 1800 for a SUPL 2.1 NI Non-Proxy Roaming Periodic Triggered session, in accordance with an implementation. Here, for example, a SUPL agent 1802, an H-SLC 1804, a V-SLP 1806 (e.g., which may comprise a V-SLC 1808 and V-SPC 1810), and a target SET 1812 are shown. In this example, V-SLC 1808 may obtain and authenticate the PE provider ID for SET 1812 by sending a PE Auth Req IE to H-SLC 1804 at step I. H-SLC 1804 may forward the PE Auth Req IE to SET 1812 at step J. SET 1812 may return a PE Auth Resp IE to V-SPC 1810 at step L and V-SPC 1810 may forward the PE Auth Resp IE to V-SLC 1808 at step M. V-SLC 1808 may then authenticate the PE provider for SET 1812 using the information in the PE Auth Resp IE received at step M and may then send a PE Trust IE to V-SPC 1810 at step N indicating whether the PE for SET 1812 is considered as trusted. If the PE is indicated as trusted in step N, V-SPC 1810 may provide PPAD (e.g. AP locations) to SET 1812 at step O.

Figure 19:
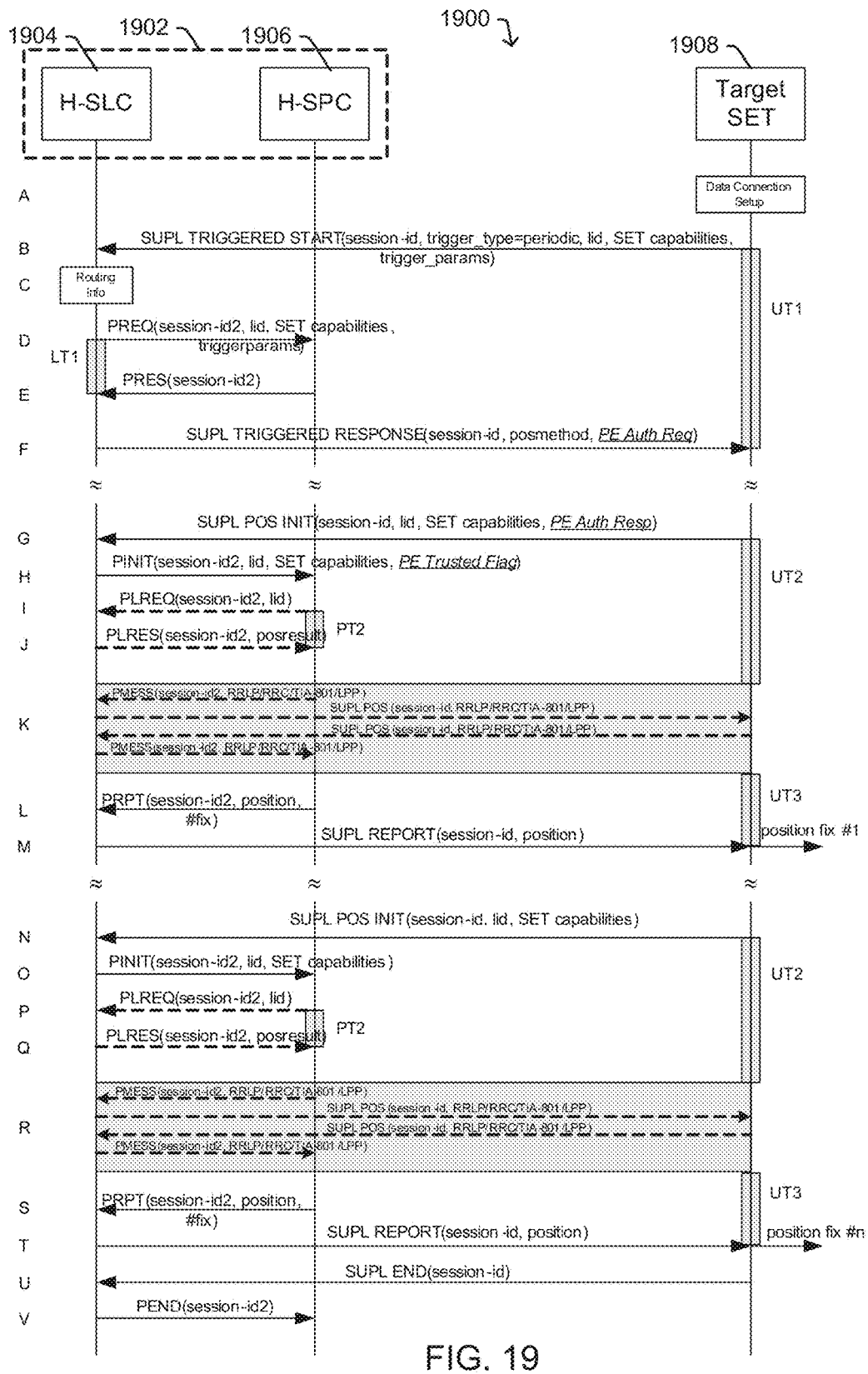

FIG. 19 is a diagram illustrating an example message flow 1900 for a SUPL 2.1 SI Proxy Non-Roaming Periodic Triggered session, in accordance with an implementation. Here, for example, an H-SLP 1902 (e.g., which may comprise an H-SLC 1904 and H-SPC 1906) and a target SET 1908 are shown. In this example, a PE Auth Req IE may be sent by H-SLC 1904 to SET 1908 at step F and a PE Auth Resp IE may be returned by SET 1908 to H-SLC 1904 at step G which may enable H-SLC 1904 to authenticate the PE provider for SET 1908. H-SLC 1904 may then send a PE trust flag IE to H-SPC 1906 at step H which may indicate whether the PE provider for SET 1908 is trusted and authorized to receive PPAD from H-SPC 1906—e.g. at step K and/or at step R.

Figure 20:
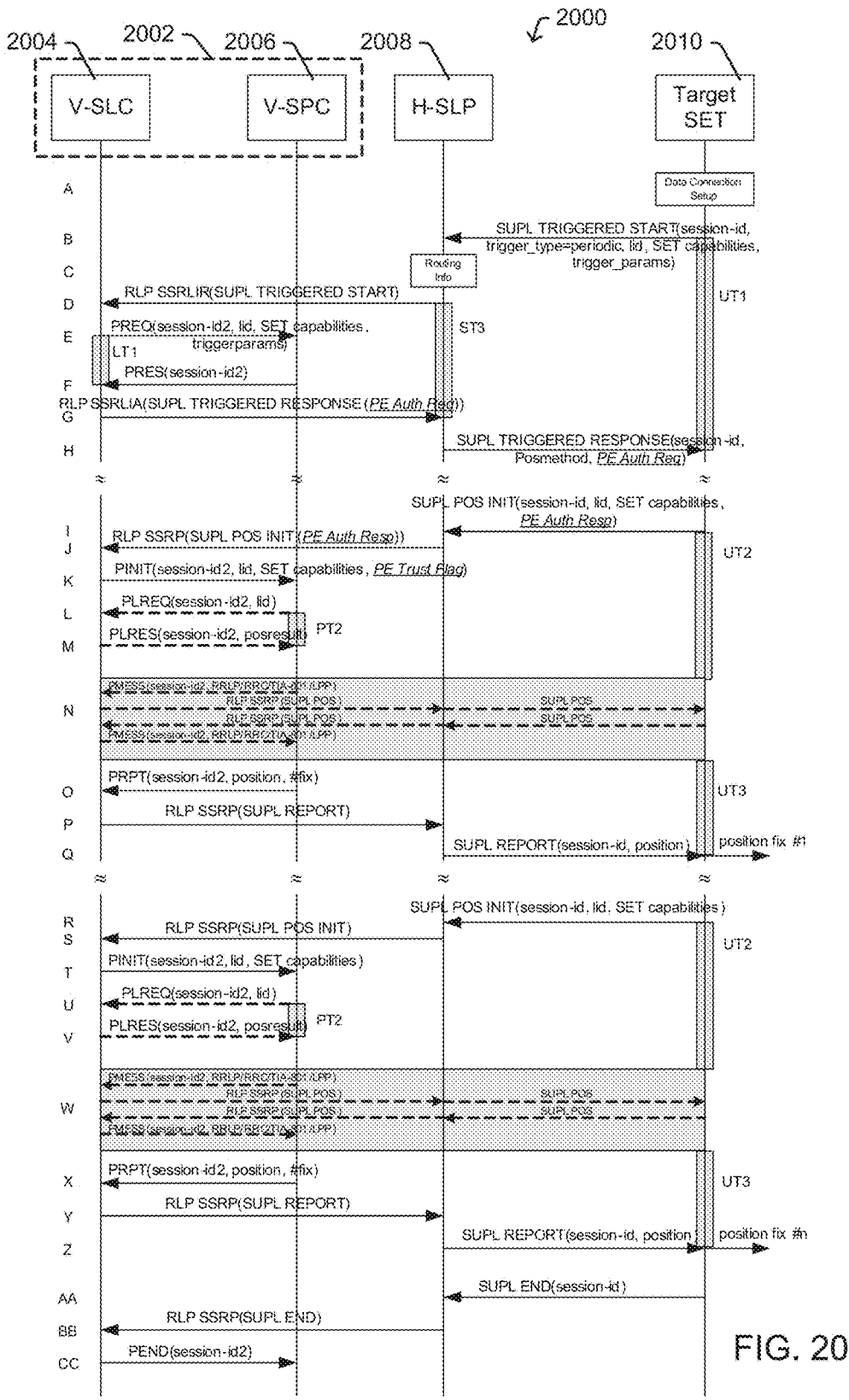

FIG. 20 is a diagram illustrating an example message flow 2000 for a SUPL 2.1 SI Proxy Roaming Periodic Triggered session, in accordance with an implementation. Here, for example, a V-SLP 2002 (e.g., which may comprise a V-SLC 2004 and V-SPC 2006), an H-SLP 2008, and a target SET 2010 are shown. In this example, V-SLC 2004 may obtain and authenticate the PE provider ID for SET 2010 by sending a PE Auth Req IE to H-SLP 2008 at step G. H-SLP 2008 may forward the PE Auth Req IE to SET 2010 at step H. SET 2010 may return a PE Auth Resp IE to H-SLP 2008 at step I and H-SLP 2008 may forward the PE Auth Resp IE to V-SLC 2004 at step J. V-SLC 2004 may then authenticate the PE provider for SET 2010 using the information in the PE Auth Resp IE received at step J and may then send a PE Trust IE to V-SPC 2006 at step K indicating whether the PE for SET 2010 is considered as trusted. If the PE is indicated as trusted in step K, V-SPC 2006 may provide PPAD (e.g. AP locations) to SET 2010 at step N and/or at step W.

Figure 21:
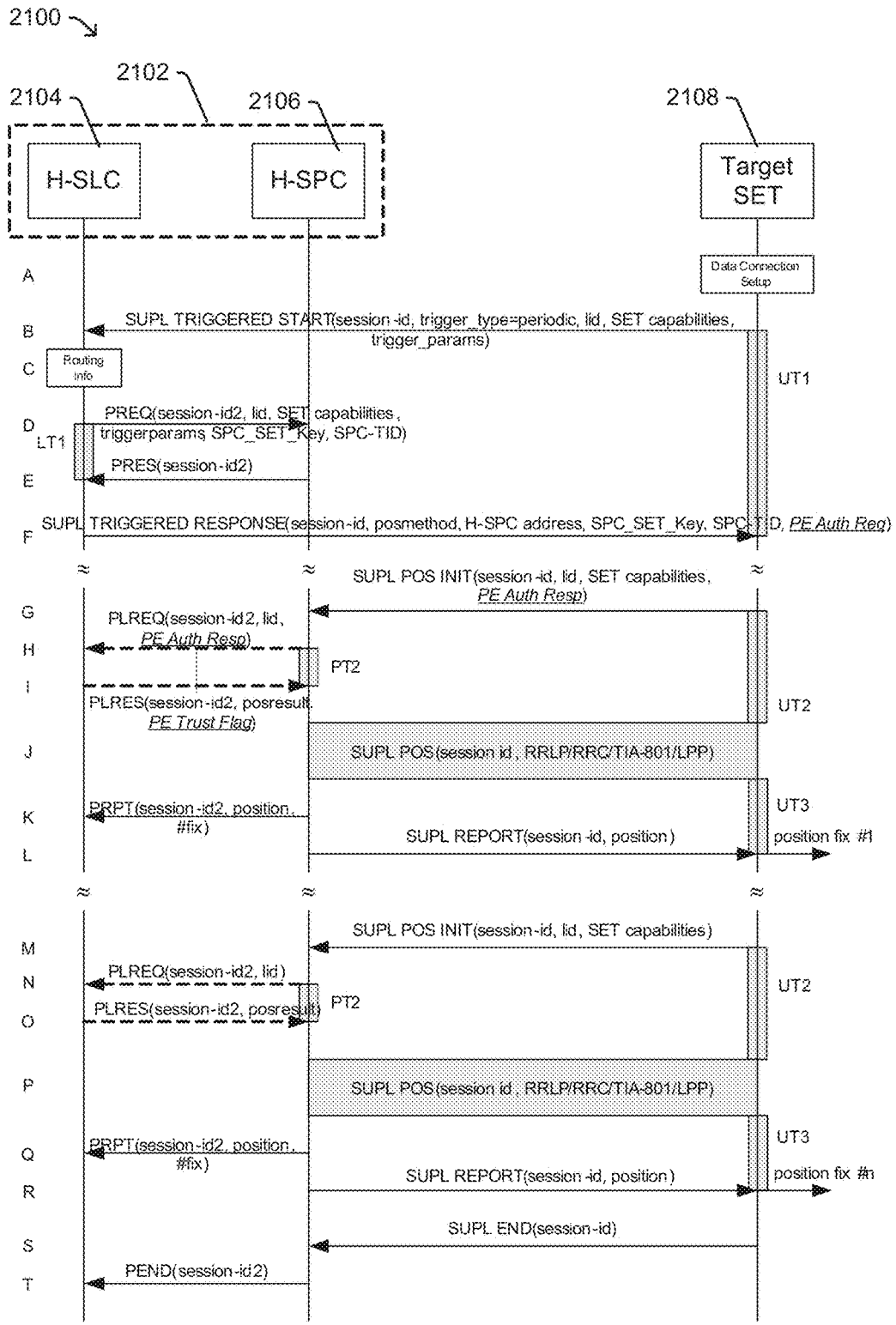

FIG. 21 is a diagram illustrating an example message flow 2100 for a SUPL 2.1 SI Non-Proxy Non-Roaming Periodic Triggered session, in accordance with an implementation. Here, for example, an H-SLP 2102 (e.g., which may comprise an H-SLC 2104 and an H-SPC 2106) and a target SET 2108 are shown. In this example, a PE Auth Req IE may be sent by H-SLC 2104 to SET 2108 at step F and a PE Auth Resp IE may be returned by SET 2108 to H-SPC 2106 at event G. H-SPC 2106 may forward the PE Auth Resp IE to H-SLC 2104 at step H which may enable H-SLC 2104 to authenticate the PE provider for SET 2108. H-SLC 2104 may then send a PE trust flag IE to H-SPC 2106 at step I which may indicate whether the PE provider for SET 2108 is trusted and authorized to receive PPAD from H-SPC 2106—e.g. at step J and/or at step P.

Figure 22:
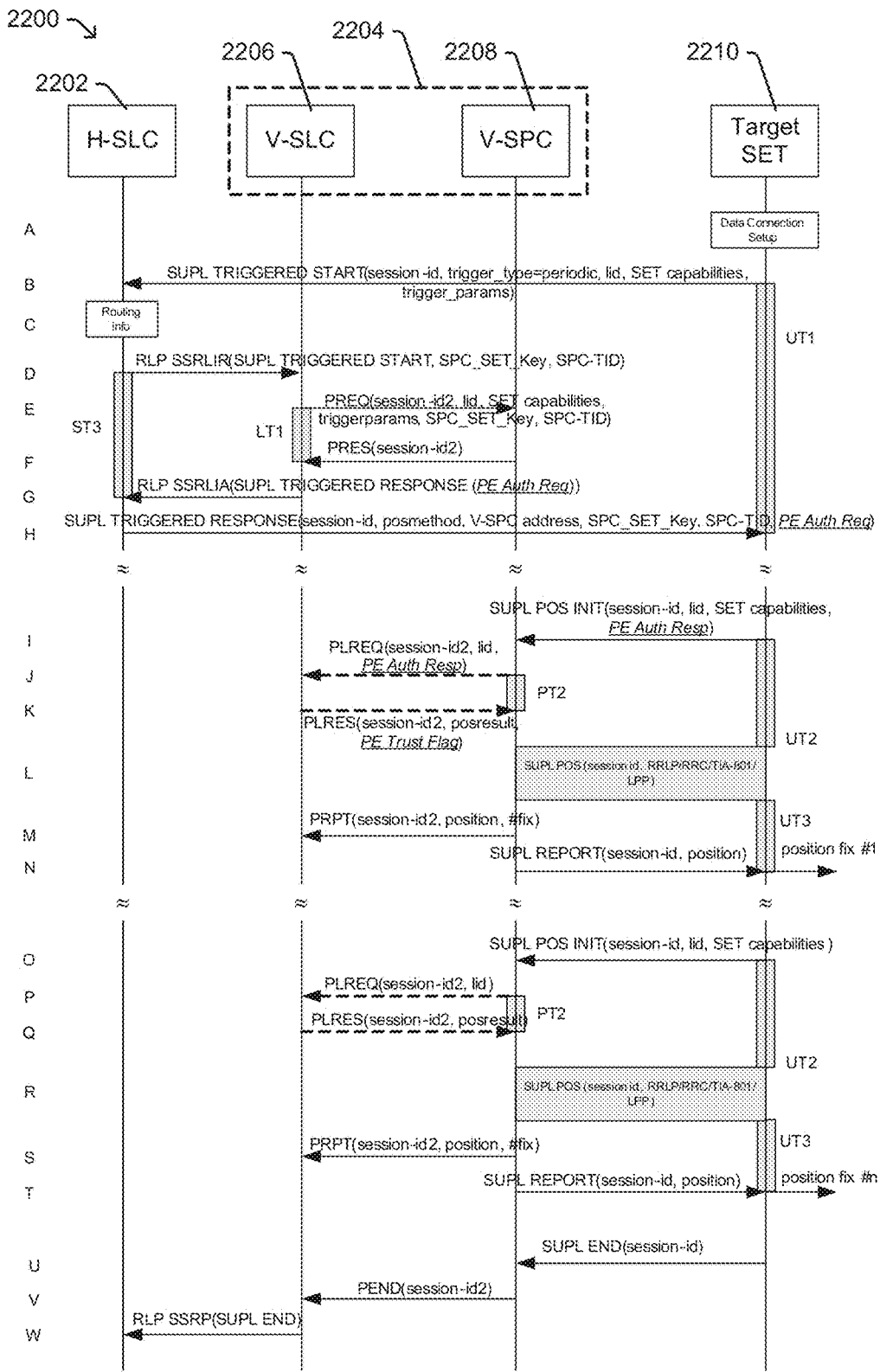

FIG. 22 is a diagram illustrating an example message flow 2200 for a SUPL 2.1 SI Non-Proxy Roaming Periodic Triggered session, in accordance with an implementation. Here, for example, an H-SLC 2202, a V-SLP 2204 (e.g., which may comprise a V-SLC 2206 and V-SPC 2208), and a target SET 2210 are shown. In this example, V-SLC 2206 may obtain and authenticate the PE provider ID for SET 2210 by sending a PE Auth Req IE to H-SLC 2202 at step G. H-SLC 2202 may forward the PE Auth Req IE to SET 2210 at step H. SET 2210 may return a PE Auth Resp IE to V-SPC 2208 at step I and V-SPC 2208 may forward the PE Auth Resp IE to V-SLC 2206 at step J. V-SLC 2206 may then authenticate the PE provider for SET 2210 using the information in the PE Auth Resp IE received at step J and may then send a PE Trust IE to V-SPC 2208 at step K indicating whether the PE for SET 2210 is considered as trusted. If the PE is indicated as trusted in step K, V-SPC 2208 may provide PPAD (e.g. AP locations) to SET 2210 at step L and/or at step R.

Figure 23:
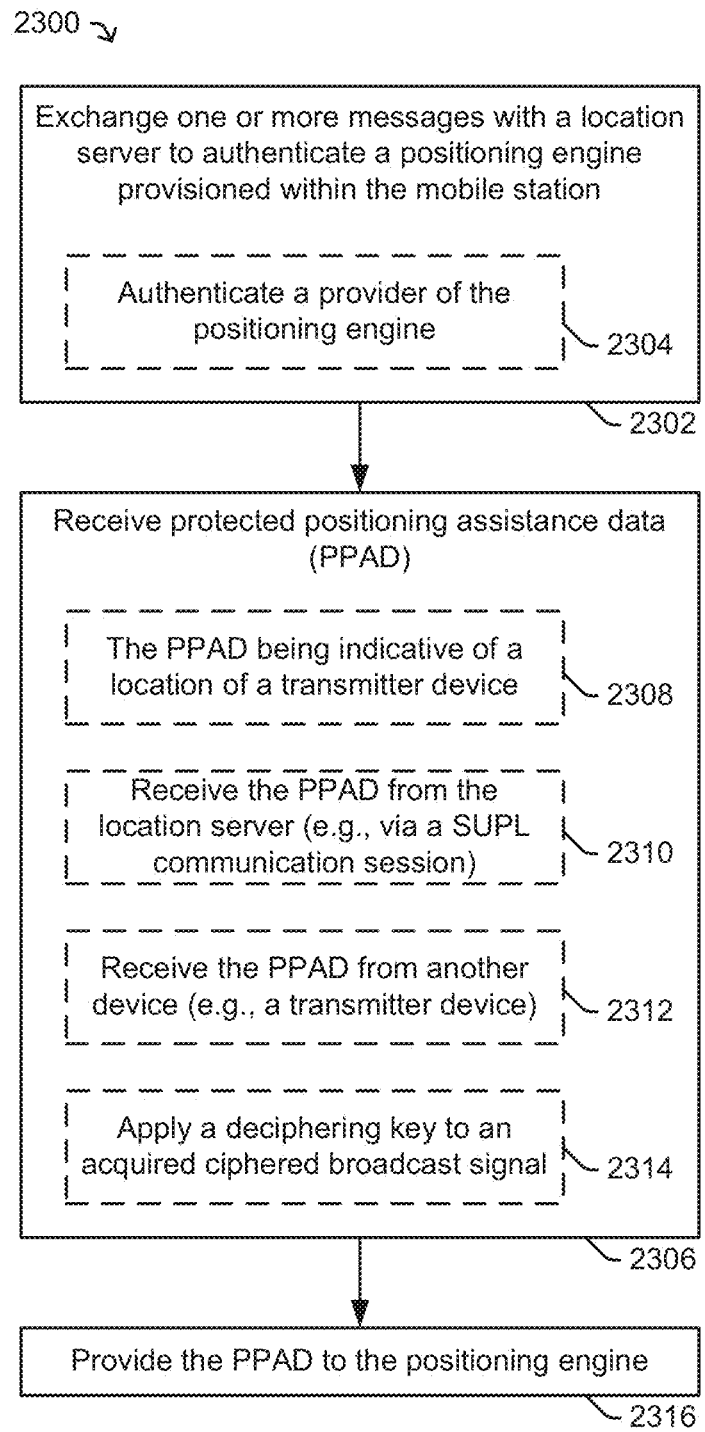
FIG. 23 is a flow diagram illustrating an example process that may be implemented in a mobile station (e.g., a UE) to obtain and provide protected positioning assistance data to a PE provisioned within the mobile station, in accordance with an example implementation.

FIG. 23 is a flow diagram illustrating an example process 2300 that may be implemented in a mobile station (e.g., a UE) or in a PE within a mobile station to obtain protected positioning assistance data (PPAD) at a PE provisioned within the mobile station, in accordance with an example implementation. At example block 2302, one or more messages may be exchanged with a location server to authenticate a positioning engine provisioned within the mobile station. In certain instances, at example block 2304 a provider of the positioning engine may be authenticated.

At example block 2306, and based on authentication of the PE at example block 2304, PPAD may be received (e.g., following authentication via block 2302). In certain implementations, at block 2308, the PPAD may be indicative of a location of a transmitter device (e.g., such as an AP). In certain instances, at block 2310, PPAD may be received from a location server (e.g., via a SUPL communication session). In certain instances, at block 2312, PPAD may be received from another device, e.g., a (non-mobile) transmitter device. In some implementations, at block 2314, a deciphering key may be obtained from the location server and applied to an acquired ciphered broadcast signal to obtain PPAD.

At example block 2316, the PPAD obtained at block 2306 may be provided to and/or used by the positioning engine.

Figure 24:
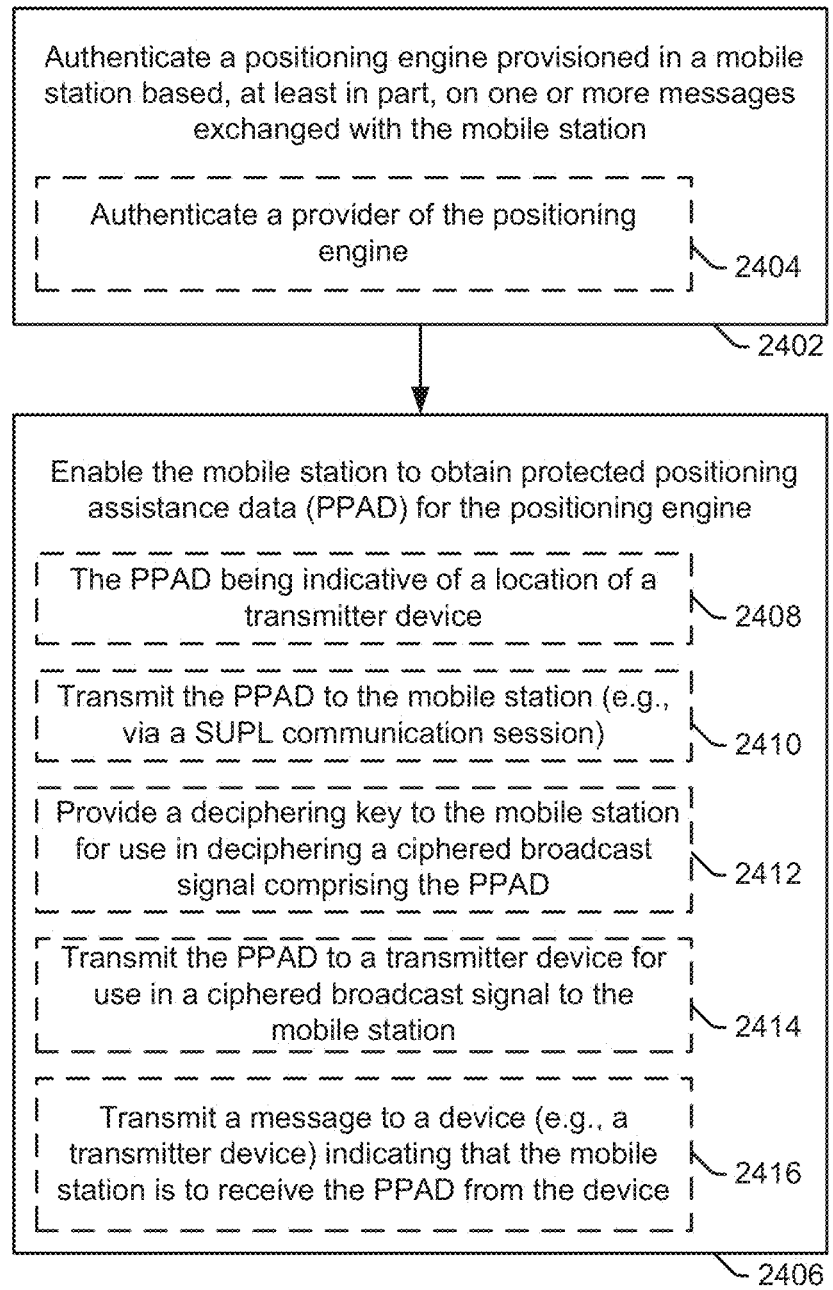
FIG. 24 is a flow diagram illustrating an example process that may be implemented in a computing device (e.g., a location server) to enable a mobile station to obtain protected positioning assistance data for use by a PE provisioned within the mobile station, in accordance with an example implementation.

FIG. 24 is a flow diagram illustrating an example process 2400 that may be implemented in a computing device (e.g., a location server) to enable a mobile station or a PE within the mobile station to obtain protected positioning assistance data (PPAD) for use by a PE provisioned within the mobile station, in accordance with an example implementation. At example block 2402, a positioning engine provisioned in a mobile station may be authenticated based, at least in part, on one or more messages exchanged with the mobile station (or with the PE). In certain instances, at block 2404, a provider of the PE may be authenticated.

At example block 2406, and based on authentication of the PE provider in example block 2404, the mobile station may be enabled to obtain PPAD for the positioning engine. In certain implementations, at block 2408, the PPAD may be indicative of a location of a transmitter device. In certain instances, at block 2410 the PPAD may be transmitted by the location server to the mobile station or to the PE (e.g., via a SUPL communication session). In some implementations, at block 2412, a deciphering key may be provided to the mobile station for use in deciphering a ciphered broadcast signal comprising the PPAD. In certain implementations, at block 2414 the PPAD may be transmitted by the location server to a transmitter device for use in a ciphered broadcast signal transmitted to one or more mobile stations. In certain implementations, at block 2416, a message may be transmitted to a device, e.g., a (non-mobile) transmitter device) indicating that a particular mobile station is to receive the PPAD from the device.

Figure 25:
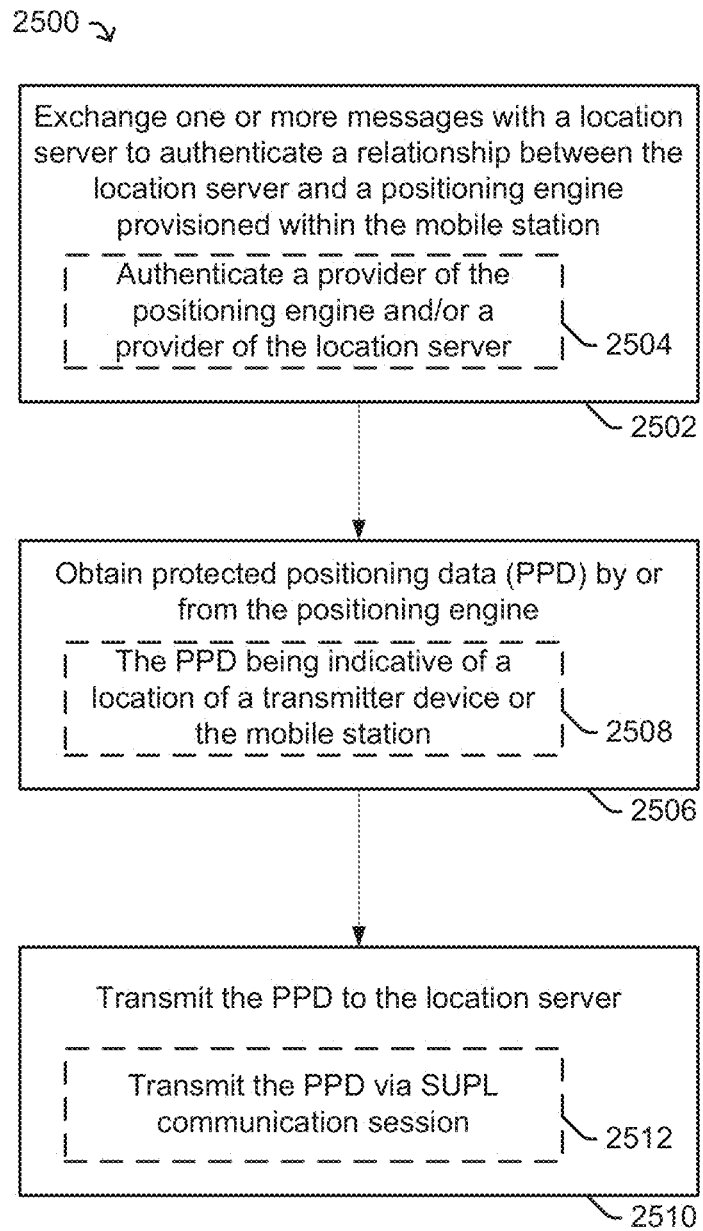
FIG. 25 is a flow diagram illustrating an example process that may be implemented in a mobile station (e.g., a UE) to provide protected positioning data from a PE to a location server, in accordance with an example implementation.

FIG. 25 is a flow diagram illustrating an example process 2500 that may be implemented in a mobile station (e.g., a UE) or in a PE within a mobile station to provide protected positioning data (PPD) from a PE to a location server, in accordance with an example implementation. At example block 2502, one or more messages may be exchanged with a location server to authenticate a relationship between the location server and a positioning engine provisioned within the mobile station. In certain implementations, at block 2504, a provider of the positioning engine and/or a provider of the location server may be authenticated.

At example block 2506, and based on the authentication at block 2504, PPD may be obtained by or from the positioning engine. In certain instances, at block 2508, the PPD may be indicative of a location of a transmitter device and/or a location of the mobile station.

At example block 2510, the PPD may be transmitted to the location server. In certain implementations, at block 2512, the PPD may be transmitted via SUPL communication session.

Figure 26:
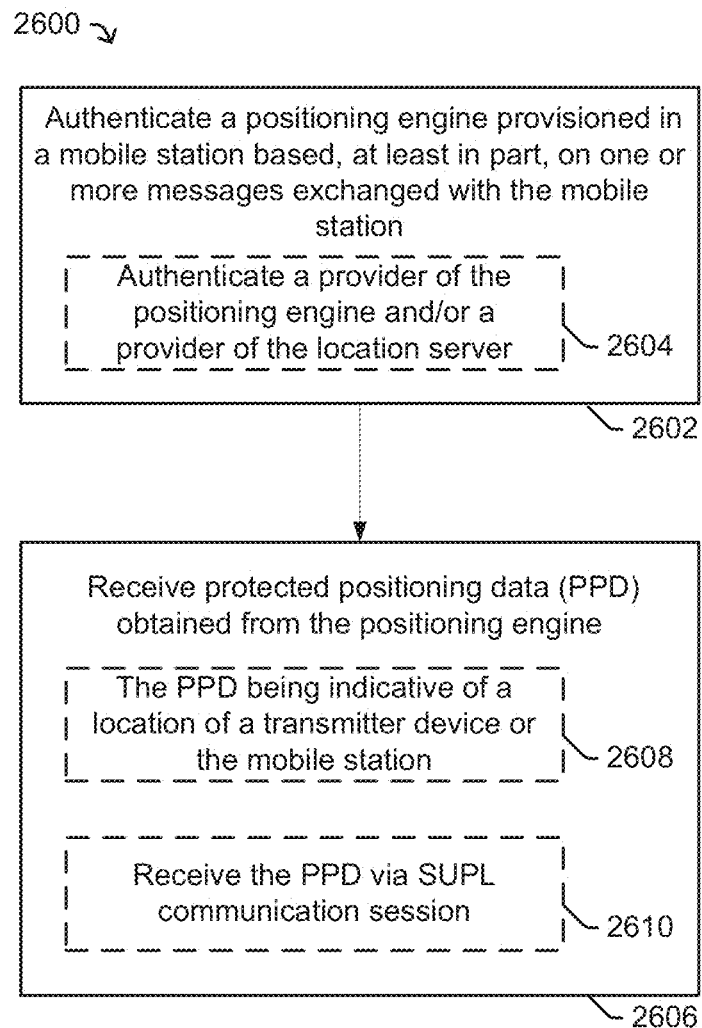
FIG. 26 is a flow diagram illustrating an example process that may be implemented in a computing device (e.g., a location server) to obtain protected positioning data from a PE provisioned within a mobile station, in accordance with an example implementation.

FIG. 26 is a flow diagram illustrating an example process 2600 that may be implemented in a computing device (e.g., a location server) to obtain protected positioning data (PPD) from a PE provisioned within a mobile station, in accordance with an example implementation. At example block 2602 a positioning engine provisioned in a mobile station may be authenticated based, at least in part, on one or more messages exchanged with the mobile station. In certain instances, at block 2604, a provider of the positioning engine and/or a provider of the location server may be authenticated.

At example block 2606, PPD may be received from the positioning engine. In certain implementations, at block 2608, the PPD may be indicative of a location of a transmitter device and/or a location of the mobile station. In certain instances, at block 2610, the PPD may be received via a SUPL communication session.

Figure 27:
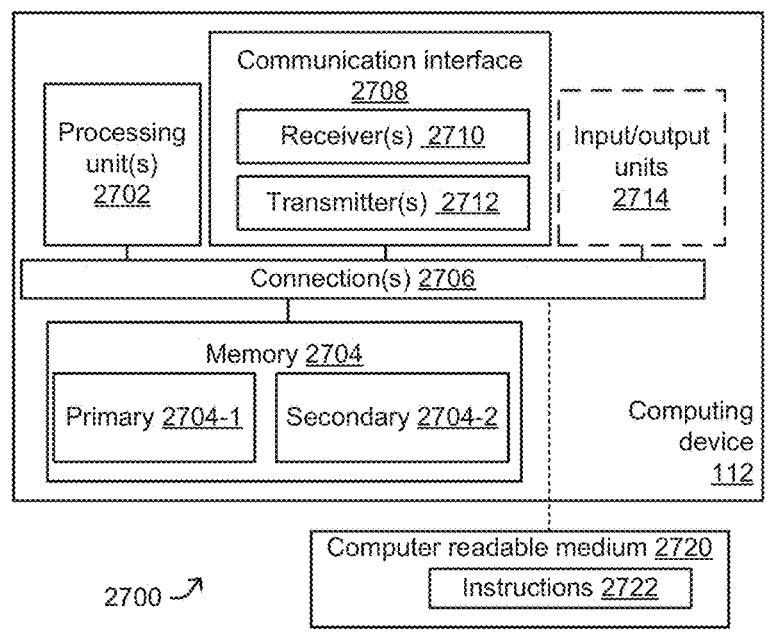
FIG. 27 is a schematic diagram illustrating certain features of an example special purpose computing platform that may be provisioned within a computing device (e.g., a location server) to enable a mobile station to obtain protected positioning assistance data for use by a PE provisioned within the mobile station and/or to obtain protected positioning data from a PE provisioned within a mobile station, in accordance with certain example implementations.

FIG. 27 is a schematic diagram illustrating certain features of an example special purpose computing platform 2700 that may be provisioned within a computing device 112 (e.g., a location server) to enable a mobile station to obtain protected positioning assistance data for use by a PE provisioned within the mobile station and/or to obtain protected positioning data from a PE provisioned within a mobile station, in accordance with certain example implementations. Computing platform 2700 may be representative of: Location Server 202 in FIG. 2; LS 302 and LS 304 in FIG. 3; LS 402 and LS 1 to LS N in FIG. 4; D/H-SLP 504 in FIG. 5; D/H-SLP 602 in FIG. 6; and each SLC, SPC and SLP referred to in FIGS. 7 through 22.

As illustrated computing platform 2700 may comprise one or more processing units 2702 (e.g., to perform data processing, etc., in accordance with certain techniques provided herein) coupled to memory 2704 via one or more connections 2706 (e.g., one or more electrical conductors, one or more electrically conductive paths, one or more buses, one or more fiber-optic paths, one or more circuits, one or more buffers, one or more transmitters, one or more receivers, etc.). Processing unit(s) 2702 may, for example, be implemented in hardware or a combination of hardware and software. Processing unit(s) 2702 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 2704 may be representative of any data storage mechanism. Memory 2704 may include, for example, a primary memory 2704-1 and/or a secondary memory 2704-2. Primary memory 2704-1 may comprise, for example, a random access memory, read only memory, etc. While illustrated in this example as being separate from the processing units, it should be understood that all or part of a primary memory may be provided within or otherwise co-located and coupled with processing unit 2702 or other like circuitry within computing device 112. Secondary memory 2704-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 2720. Memory 2704 and/or non-transitory computer readable medium 2720 may comprise instructions 2722 for use in performing data processing and/or other functions, e.g., in accordance with the applicable techniques as provided herein.

Computing platform 2700 may, for example, further comprise a communication interface 2708. Communication interface 2708 may, for example, comprise one or more wired and/or wireless network interface units, radios, modems, etc., represented here by one or more receivers 2710 and one or more transmitters 2712. It should be understood that in certain implementations, communication interface 2708 may comprise one or more transceivers, and/or the like. Further, it should be understood that although not shown, communication interface 2708 may comprise one or more antennas and/or other circuitry as may be applicable given the communication interface capability.

In accordance with certain example implementations, communication interface 2708 may, for example, be enabled for use with various wired communication networks, e.g., such as telephone system, a local area network, a wide area network, a personal area network, an intranet, the Internet, etc.

In accordance with certain example implementations communication interface 2708 and/or 2808 (see FIG. 28) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, HRPD and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, 3GPP Long Term Evolution (LTE), 3GPP Advanced LTE, WiMAX, Ultra Mobile Broadband (UMB), and/or the like. Additionally, communication interface(s) 2708 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Computing device 112 may, for example, further comprise one or more input and/or output units 2714. Input and/or output units 2714 may represent one or more devices or other like mechanisms that may be used to obtain inputs from and/or provide outputs to one or more other devices and/or a user. Thus, for example, input and/or output units 2714 may comprise various buttons, switches, a touch pad, a trackball, a joystick, a touch screen, a keyboard, and/or the like, which may be used to receive one or more user inputs. In certain instances, input and/or output units 2714 may comprise various devices that may be used in producing a visual output, an audible output, and/or a tactile output for a user. For example, input and/or output units 2714 may be used to present a video display, graphical user interface, etc., on a display mechanism.

In certain instances, all or part of computing platform 2700 may be similarly be configured within a transmitter device 102 (see FIG. 1).

Figure 28:
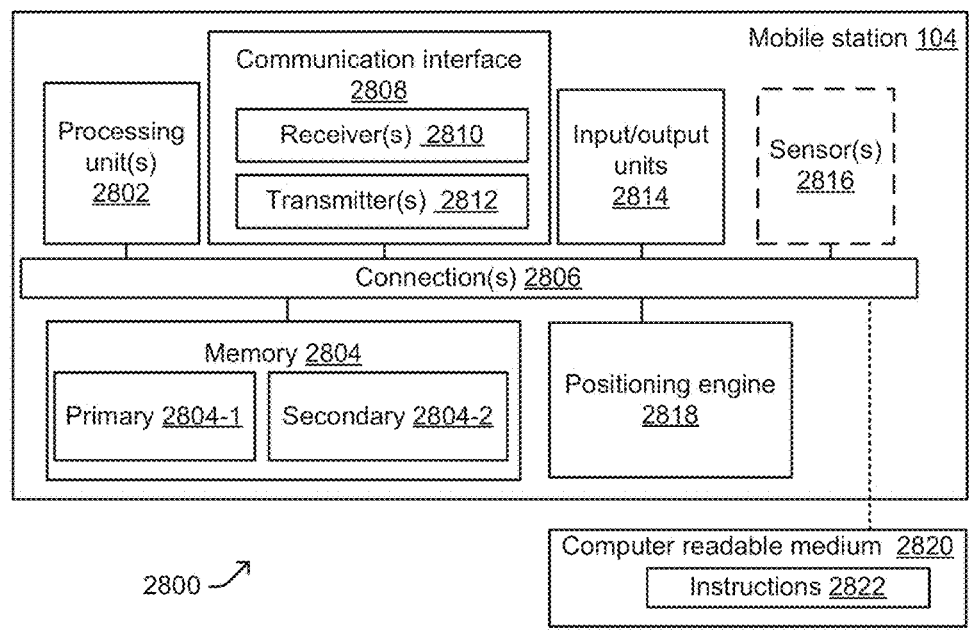
FIG. 28 is a schematic diagram illustrating certain features of an example special purpose computing platform that may be provisioned within a mobile station (e.g., a UE) to obtain and provide protected positioning assistance data to a PE provisioned within the mobile station and/or to provide protected positioning data from a PE to a location server, in accordance with certain example implementations.

FIG. 28 is a schematic diagram illustrating certain features of an example special purpose computing platform 2800 that may be provisioned within a mobile station (e.g., a UE) to obtain and provide protected positioning assistance data to a PE provisioned within the mobile station and/or to provide protected positioning data from a PE to a location server, in accordance with certain example implementations. Computing platform 2800 may be or may be representative of mobile station 104 in FIG. 1, UE 204 in FIG. 2, Target SET 506 in FIG. 5, Target SET 604 in FIG. 6 and each target SET referred to in FIGS. 7 through 22.

As illustrated computing platform 2800 may comprise one or more processing units 2802 (e.g., to perform data processing in accordance with certain techniques provided herein) coupled to memory 2804 via one or more connections 2806 (e.g., one or more electrical conductors, one or more electrically conductive paths, one or more buses, one or more fiber-optic paths, one or more circuits, one or more buffers, one or more transmitters, one or more receivers, etc.). Processing unit(s) 2802 may, for example, be implemented in hardware or a combination of hardware and software. Processing unit(s) 2802 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 2802 may, for example, perform computer implementable instructions corresponding to one or more applications(s) 152 (FIG. 1).

Memory 2804 may be representative of any data storage mechanism. Memory 2804 may include, for example, a primary memory 2804-1 and/or a secondary memory 2804-2. Primary memory 2804-1 may comprise, for example, a random access memory, read only memory, etc. While illustrated in this example as being separate from the processing units, it should be understood that all or part of a primary memory may be provided within or otherwise co-located and coupled with processing unit 2802 or other like circuitry within mobile station 104. Secondary memory 2804-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 2820. Memory 2804 and/or non-transitory computer readable medium 2820 may comprise instructions 2822 for use in performing data processing, e.g., in accordance with the applicable techniques as provided herein.

Computing platform 2800 may, for example, further comprise a communication interface 2808. Communication interface 2808 may, for example, comprise one or more wired and/or wireless network interface units, radios, modems, etc., represented here by one or more receivers 2810 and one or more transmitters 2812. It should be understood that in certain implementations, communication interface 2808 may comprise one or more transceivers, and/or the like. Further, it should be understood that although not shown, communication interface 2808 may comprise one or more antennas and/or other circuitry as may be applicable given the communication interface capability.

In accordance with certain example implementations, communication interface 2808 may, for example, be enabled for use with various wired communication networks, e.g., such as telephone system, a local area network, a wide area network, a personal area network, an intranet, the Internet, etc. Communication interface 2808 may also enable reception of GNSS satellite signals and/or signals from APs and base stations for use in making measurements related to the location of computing platform 2800.

Computing platform 2800 may, for example, further comprise one or more input and/or output units 2814. Input and/or output units 2814 may represent one or more devices or other like mechanisms that may be used to obtain inputs from and/or provide outputs to one or more other devices and/or a user. Thus, for example, input and/or output units 2814 may comprise various buttons, switches, a touch pad, a trackball, a joystick, a touch screen, a keyboard, a microphone, a camera, and/or the like, which may be used to receive one or more user inputs. In certain instances, input and/or output units 2814 may comprise various devices that may be used in producing a visual output, an audible output, and/or a tactile output for a user. For example, input and/or output units 2814 may be used to present a video display, graphical user interface, positioning and/or navigation related information, visual representations of electronic map, routing directions, etc., via a display mechanism and/or audio mechanism.

Computing platform 2800 may, for example, comprise one or more sensors 2816. For example, sensor(s) 2816 may represent one or more environmental sensors, such as, e.g., a magnetometer or compass, a barometer or altimeter, etc., and which may be useful for positioning. For example, sensor(s) 2816 may represent one or more inertial sensors, which may be useful in detecting certain movements of mobile station 104. Thus for example, sensor(s) 2816 may comprise one or more accelerometers, one or one or more gyroscopes. Further, in certain instances sensor(s) 2816 may comprise and/or take the form of one or more input devices such as a microphone, a camera, a light sensor, etc.

A positioning engine 2818 may be capable of acquiring and/or processing wireless signals, and/or otherwise providing/supporting positioning and/or navigation capabilities. Positioning engine 2818 may comprise an SPS receiver to process, in whole or in part, acquired wireless signals 134 for estimating a position and/or a motion of computing platform 2800. In certain instances, positioning engine 2818 may comprise local memory, and one or more processing unit(s) (not shown), e.g., one or more general purpose processors, one or more digital signal processors DSP(s), one or more specialized processors that may also be utilized to process acquired signals, in whole or in part, and/or calculate an estimated location of computing platform 2800. In certain implementations, all or part of such processing of acquired signals may be performed by other processing capabilities in computing platform 2800, e.g., processing unit(s) 2802, memory 2804, etc., in conjunction with positioning engine 2818. Storage of SPS or other signals for use in performing positioning operations may be performed in memory 2804 or secure storage registers (not shown) provisioned within the positioning engine. In some instances, sensor(s) 2816 may be part of positioning engine 2818. In some instances positioning engine 2818 may be a separate physical component of computing platform 2800 (e.g. a separate silicon chip) and may comprise one or more processors, memory, secure memory, one or more communication interfaces and software and/or firmware instructions (e.g. stored in memory on positioning engine 2818) for performing the various techniques described herein. In some instances positioning engine 2818 may not be a separate physical component of computing platform 2800 but may instead comprise software or firmware (e.g. configured for performing the various techniques described herein) running on other components of computing platform 2800 such as processing unit(s) 2802 or Digital Signal Processors (not shown in FIG. 28). Positioning engine 2818 may be or may be representative of PE 106 in FIG. 1, PE 206 in FIG. 2, PE 306 and PE 308 in FIG. 3, Provider B PE for each of UEs 1 through M in FIG. 4, and PEs contained in SETs referred to in association with techniques described in FIGS. 5 through 22.

In certain instances, sensor(s) 2816 may generate analog or digital signals that may be stored in memory 2804 and processed by DPS(s) (not shown) or processing unit(s) 2802 in support of one or more applications such as, for example, applications directed to positioning or navigation operations based, at least in part, on one or more positioning functions.

Processing unit(s) 2802 may comprise a dedicated modem processor or the like that may be capable of performing baseband processing of signals acquired and down converted at receiver(s) 2810 of communication interface 2808 or positioning engine 2809. Similarly, a modem processor or the like may perform baseband processing of signals to be up converted for transmission by (wireless) transmitter(s) 2812. In some implementations, a modem processor may be a separate physical component of computing platform 2800 (not shown in FIG. 28) and may contain its own processor(s), memory and communication interface. In some implementations, positioning engine 2818 may include or may be part of a modem processor that is a separate physical component (e.g. a separate silicon chip) of computing platform 2800. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile stations, transmitting devices, environments, position fix modes, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATS") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile stations may communicate with a femtocell via a code division multiple access ("CDMA") cellular communication protocol, for example, and the femtocell may provide the mobile station access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile station:
exchanging one or more messages with a location server to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine;
receiving said protected positioning assistance data from said location server in response to said authentication of said positioning engine,
providing said protected positioning assistance data to said positioning engine; and
obtaining an estimate of a position of said mobile station utilizing said protected positioning assistance data.

2. The method recited in claim 1, wherein, in authenticating said provider of said positioning engine, an identity for said provider of said positioning engine is authenticated and wherein said identity is associated with a provider with a trust relationship to said provider of said location server.

3. The method recited in claim 2, wherein said identity for said provider is authenticated, at least in part, applying at least one of Message Digest 5 (MD5), Hash Message Authentication Code (HMAC) and Cipher-based Message Authentication Code (CMAC).

4. The method as recited in claim 1 wherein at least one of said one or more messages comprises a Secure User Plane Location (SUPL) INIT, SUPL RESPONSE, SUPL POS INIT and SUPL TRIGGERED RESPONSE message.

5. The method as recited in claim 1, wherein said protected positioning assistance data is indicative of a location of a non-mobile transmitting device.

6. The method as recited in claim 5, wherein said non-mobile transmitting device comprises a wireless wide area network (WWAN) access point (AP), a wireless local area network (WLAN) AP, a wireless personal area network (WPAN) AP, a WiFi AP, a BlueTooth AP or a Femtocell, or a combination thereof.

7. The method as recited in claim 1, wherein said protected positioning assistance data is received via a Secure User Plane Location (SUPL) communication session.

8. The method as recited in claim 1, wherein said protected positioning assistance data is received from a non-mobile transmitting device.

9. The method as recited in claim 8, and further comprising, at said mobile station:
obtaining a deciphering key received from said location server;
acquiring a ciphered broadcast signal transmitted by said non-mobile transmitting device; and
applying said deciphering key to said ciphered broadcast signal to obtain said protected positioning assistance data.

10. The method as recited in claim 1, wherein said protected positioning assistance data corresponds to a trust level selected from a plurality of different trust levels.

11. The method as recited in claim 1, wherein at least one of said one or more messages is indicative of: an authentication request, an authentication response or a trust relationship, or a combination thereof.

12. An apparatus for use in a mobile station, the apparatus comprising:
means for exchanging one or more messages with a location server to authenticate a positioning engine provisioned within said mobile station, wherein said positioning engine is authenticated independently of an authentication of said mobile station, authentication of said positioning engine comprising a verification that a provider of said positioning engine and a provider of said location server agree to allow for provision of protected positioning assistance data from said location server for use by said positioning engine;
means for receiving said protected positioning assistance data from said location server in response to said authentication of said positioning engine;
means for providing said protected positioning assistance data to said positioning engine; and
means for obtaining an estimate of a position of said mobile station utilizing said protected positioning assistance data.

13. A mobile station comprising:
a positioning engine;
a communication interface; and
a processing unit configured to:
exchange one or more messages with a location server via said communication interface to authenticate said positioning engine, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine;
receive said protected positioning assistance data via said communication interface from said location server in response to said authentication of said positioning engine;
provide said protected positioning assistance data to said positioning engine; and
obtain an estimate of a position of said mobile station utilizing said protected positioning assistance data.

14. The mobile station as recited in claim 13, wherein, to authenticate said provider of said positioning engine, an identity for said provider of said positioning engine is authenticated and wherein said identity is associated with a provider with a trust relationship to said provider of said location server.

15. The mobile station as recited in claim 14, wherein said identity for said provider is authenticated, at least in part, via application of at least one of Message Digest 5 (MD5), Hash Message Authentication Code (HMAC) and Cipher-based Message Authentication Code (CMAC).

16. The mobile station as recited in claim 13, wherein at least one of said one or more messages comprises a Secure User Plane Location (SUPL) INIT, SUPL RESPONSE, SUPL POS INIT and SUPL TRIGGERED RESPONSE message.

17. The mobile station as recited in claim 13, wherein said protected positioning assistance data is indicative of a location of a non-mobile transmitting device.

18. The mobile station as recited in claim 17, wherein said non-mobile transmitting device comprises a wireless wide area network (WWAN) access point (AP), a wireless local area network (WLAN) AP, a wireless personal area network (WPAN) AP, a WiFi AP, a BlueTooth AP or a Femtocell, or a combination thereof.

19. The mobile station as recited in claim 13, wherein said protected positioning assistance data is received via said communication interface in a Secure User Plane Location (SUPL) communication session.

20. The mobile station as recited in claim 13, wherein said protected positioning assistance data is received from a non-mobile transmitting device via said communication interface.

21. The mobile station as recited in claim 20, said processing unit configured to further:
obtain a deciphering key received from said location server via said communication interface;
obtain a ciphered broadcast signal transmitted by said non-mobile transmitting device via said communication interface; and
apply said deciphering key to said ciphered broadcast signal to obtain said protected positioning assistance data.

22. The mobile station as recited in claim 13, wherein said protected positioning assistance data corresponds to a trust level selected from a plurality of different trust levels.

23. The mobile station as recited in claim 13, wherein at least one of said one or more messages is indicative of: an authentication request, an authentication response or a trust relationship, or a combination thereof.

24. An article comprising:
a non-transitory computer readable medium having stored therein computer implementable instructions executable by a processing unit in a mobile station, comprising:

code to participate in an exchange of one or more messages with a location server to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine;

code to obtain said protected positioning assistance data received from the location server in response to said authentication of said positioning engine;

code to provide said protected positioning assistance data to said positioning engine; and code to obtain an estimate of a position of said mobile station utilizing said protected positioning assistance data.

25. A method comprising, at a location server:

exchanging one or more messages with a mobile station to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine;

in response to said authentication of said positioning engine, enabling said mobile station to obtain said protected positioning assistance data for said positioning engine by communicating said protected positioning assistance data to said mobile station, said mobile station utilizing said protected positioning assistance data to obtain an estimate of a location of said mobile station.

26. The method as recited in claim 25, and further comprising, at the location server:

authenticating said positioning engine based, at least in part, on authenticating an identity for said provider of said positioning engine and determining that said identity is associated with a provider with a trust relationship to said provider of said location server.

27. The method as recited in claim 26, wherein said authenticating said identity for said provider of said positioning engine comprises using at least one of: a Message Digest 5 (MD5), a Hash Message Authentication Code (HMAC), or a Cipher-based Message Authentication Code (CMAC).

28. The method as recited in claim 25, wherein at least one of said one or more messages comprises a Secure User Plane Location (SUPL) INIT message, a SUPL RESPONSE message, a SUPL POS INIT message, or a SUPL TRIGGERED RESPONSE message.

29. The method as recited in claim 25, wherein said protected positioning assistance data is indicative of a location of a non-mobile transmitting device.

30. The method as recited in claim 29, wherein said non-mobile transmitting device comprises: a wireless wide area network (WWAN) access point (AP), a wireless local area network (WLAN) AP, a wireless personal area network (WPAN) AP, a WiFi AP, a BlueTooth AP or a Femtocell, or a combination thereof.

31. The method as recited in claim 25, wherein said protected positioning assistance data is transmitted via a Secure User Plane Location (SUPL) communication session.

32. The method as recited in claim 25, wherein enabling said mobile station to obtain said protected positioning assistance data further comprises:

providing a deciphering key to said mobile station, said deciphering key for use in deciphering a ciphered broadcast signal comprising said protected positioning assistance data.

33. The method as recited in claim 32, wherein said ciphered broadcast signal is acquired by said mobile station from a non-mobile transmitting device.

34. The method as recited in claim 33, wherein enabling said mobile station to obtain said protected positioning assistance data further comprises:

transmitting said protected positioning assistance data to said non-mobile transmitting device for use in said ciphered broadcast signal.

35. The method as recited in claim 34, wherein said protected positioning assistance data has been ciphered by said location server.

36. The method as recited in claim 25, wherein enabling said mobile station to obtain said protected positioning assistance data further comprises:

transmitting a message to a device, said message indicating that said mobile station is to receive said protected positioning assistance data from said device.

37. The method as recited in claim 36, wherein said device comprises a non-mobile transmitting device.

38. The method as recited in claim 25, wherein said protected positioning assistance data corresponds to a trust level selected from a plurality of different trust levels.

39. The method as recited in claim 25, wherein at least one of said one or more messages is indicative of: an authentication request, an authentication response or a trust relationship, or a combination thereof.

40. An apparatus for use in a location server, the apparatus comprising:

means for exchanging one or more messages with a mobile station to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine; and means for enabling said mobile station to obtain said protected positioning assistance data for said positioning engine, in response to said authentication of said positioning engine, by transmitting said protected positioning assistance data to said mobile station, said mobile station utilizing said protected positioning assistance data to obtain an estimate of a location of said mobile station.

41. A location server comprising:

a communication interface; and a processing unit configured to:

initiate an exchange of one or more messages with a mobile station, via said communication interface, to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine; and in response to said authentication of said positioning engine, enable said mobile station to obtain said protected positioning assistance data for said positioning engine and initiate transmission of said protected positioning assistance data, via said communication interface, to said mobile station, wherein said mobile station to utilize said protected positioning assistance data to obtain an estimate of a location of said mobile station.

42. The location server as recited in claim 41, said processing unit configured to further:

authenticate said positioning engine based, at least in part, on authenticating an identity for said provider of said positioning engine and determining that said identity is associated with a provider with a trust relationship to said provider of said location server.

43. The location server as recited in claim 42, said processing unit further configured to authenticate said identity of said positioning engine based, at least in part, on at least one of: a Message Digest 5 (MD5), a Hash Message Authentication Code (HMAC), or a Cipher-based Message Authentication Code (CMAC).

44. The location server as recited in claim 41, wherein at least one of said one or more messages comprises a Secure User Plane Location (SUPL) INIT message, a SUPL RESPONSE message, a SUPL POS INIT message, or a SUPL TRIGGERED RESPONSE message.

45. The location server as recited in claim 41, wherein said protected positioning assistance data is indicative of a location of a non-mobile transmitting device.

46. The location server as recited in claim 44, wherein said non-mobile transmitting device comprises: a wireless wide area network (WWAN) access point (AP), a wireless local area network (WLAN) AP, a wireless personal area network (WPAN) AP, a WiFi AP, a BlueTooth AP or a Femtocell, or a combination thereof.

47. The location server as recited in claim 41, wherein said protected positioning assistance data is transmitted via said communication interface in a Secure User Plane Location (SUPL) communication session.

48. The location server as recited in claim 41, said processing unit to:

provide a deciphering key to said mobile station via said communication interface, said deciphering key for use in deciphering a ciphered broadcast signal comprising said protected positioning assistance data.

49. The location server as recited in claim 48, wherein said ciphered broadcast signal is acquired by said mobile station from a transmitter device.

50. The location server as recited in claim 49, said processing unit to:

initiate transmission of said protected positioning assistance data, via said communication interface, to said transmitter device for use in said ciphered broadcast signal.

51. The location server as recited in claim 50, wherein said protected positioning assistance data has been ciphered by said location server.

52. The location server as recited in claim 41, said processing unit to:

initiate transmission of a message to a device, via said communication interface, said message indicating that said mobile station is to receive said protected positioning assistance data from said device.

53. The location server as recited in claim 52, wherein said device comprises a transmitter device.

54. The location server as recited in claim 41, wherein said protected positioning assistance data corresponds to a trust level selected from a plurality of different trust levels.

55. The location server as recited in claim 41, wherein at least one of said one or more messages is indicative of: an authentication request, an authentication response or a trust relationship, or a combination thereof.

56. An article comprising:

a non-transitory computer readable medium having stored therein computer implementable instructions executable by a processing unit in a location server, to:

initiate an exchange of one or more messages with a mobile station to authenticate a positioning engine provisioned within said mobile station, wherein said positioning engine is authenticated independently of an authentication of said mobile station, authentication of said positioning engine comprising verification that a provider of said positioning engine and a provider of said location server agree to allow for provision of protected positioning assistance data from said location server for use by said positioning engine; and enable said mobile station to obtain said protected positioning assistance data for said positioning engine, in response to said authentication of said positioning engine by transmitting said protected positioning assistance data to said mobile station, wherein said mobile station to utilize said protected positioning assistance data to obtain an estimate of a location of said mobile station.

57. A method comprising, at a mobile station:

exchanging one or more messages with a location server to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station;

obtaining protected positioning data generated by or from said positioning engine; and transmitting said protected positioning data to said location server.

58. The method as recited in claim 57, wherein at least one of said one or more messages is configured to authenticate an identity of said provider of said positioning engine, an identity of said provider of said location server, or a combination thereof.

59. The method as recited in claim 57, wherein said protected positioning data is indicative of at least one of a location of a non-mobile transmitting device or a location of said mobile station.

60. The method as recited in claim 57, wherein said protected positioning data is transmitted via a Secure User Plane Location (SUPL) communication session.

61. The method as recited in claim 57, wherein at least one of said one or more messages is indicative of an authentication request, an authentication response, a trust relationship, or some combination thereof.

62. An apparatus for use in a mobile station, the apparatus comprising:

means for exchanging one or more messages with a location server to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station;

means for obtaining protected positioning data generated by or from said positioning engine; and means for transmitting said protected positioning data to said location server.

63. A mobile station comprising:
a positioning engine;
a communication interface; and
a processing unit configured to:
exchange one or more messages with a location server to authenticate a relationship between a provider of said location server and a provider of said positioning engine, said provider of said positioning engine being different from a provider of said mobile station and wherein said authentication of said relationship between said provider of said location server and said provider of said positioning engine is independent of an authentication of said mobile station;
obtain protected positioning data generated by or from said positioning engine; and
transmit said protected positioning data to said location server via said communication interface.

64. The mobile station as recited in claim 63, wherein at least one of said one or more messages is configured to authenticate an identity of said provider of said positioning engine, an identity of said provider of said location server, or a combination thereof.

65. The mobile station as recited in claim 63, wherein said protected positioning data is indicative of at least one of a location of a non-mobile transmitting device or a location of said mobile station.

66. The mobile station as recited in claim 63, wherein said protected positioning data is transmitted via a Secure User Plane Location (SUPL) communication session.

67. The mobile station as recited in claim 63, wherein at least one of said one or more messages is indicative of an authentication request, an authentication response, a trust relationship, or some combination thereof.

68. An article comprising:
a non-transitory computer readable medium having stored therein computer implementable instructions executable by a processing unit in a mobile station, comprising:
code to exchange one or more messages with a location server to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station;
code to obtain protected positioning data generated by or from said positioning engine; and
code to initiate transmission of said protected positioning data to said location server.

69. A method comprising, at a location server:
exchanging one or more messages with a mobile station to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station; and
receiving protected positioning data obtained from said positioning engine.

70. The method as recited in claim 69, wherein at least one of said one or more messages is configured to authenticate an identity of said provider of said positioning engine, an identity of said provider of said location server, or a combination thereof.

71. The method as recited in claim 69, wherein said protected positioning data is indicative of at least one of a location of a non-mobile transmitting device, or a location of said mobile station.

72. The method as recited in claim 69, wherein said protected positioning data is received via a Secure User Plane Location (SUPL) communication session.

73. The method as recited in claim 69, wherein at least one of said one or more messages is indicative of: an authentication request, an authentication response or a trust relationship, or a combination thereof.

74. An apparatus for use in a location server, the apparatus comprising:
means for exchanging one or more messages with a mobile station to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station; and
means for receiving protected positioning data obtained from said positioning engine.

75. A location server comprising:
a communication interface; and
a processing unit configured to:
initiate an exchange of one or more messages with a mobile station, via said communication interface, to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station; and
obtain protected positioning data received from said positioning engine via said communication interface.

76. The location server as recited in claim 75, wherein at least one of said one or more messages is configured to authenticate an identity of said provider of said positioning engine, an identity of said provider of said location server, or a combination thereof.

77. The location server as recited in claim 75, wherein said protected positioning data is indicative of at least one of a location of a non-mobile transmitting device, or a location of said mobile station.

78. The location server as recited in claim 75, wherein said protected positioning data is received via a Secure User Plane Location (SUPL) communication session.

79. The location server as recited in claim 75, wherein at least one of said one or more messages is indicative of: an authentication request, an authentication response or a trust relationship, or combination thereof.

80. An article comprising:

a non-transitory computer readable medium having stored therein computer implementable instructions executable by a processing unit in a location server, comprising:

code to provide an exchange of one or more messages with a mobile station to authenticate a relationship between a provider of said location server and a provider of a positioning engine provisioned within said mobile station, said provider of said positioning engine being different from a provider of said mobile station and wherein said authentication of said relationship between said provider of said location server and said provider of said positioning engine is independent of an authentication of said mobile station; and code to obtain protected positioning data received from said positioning engine.

* * * * *